United States Patent
Tomita et al.

(10) Patent No.: US 12,522,603 B2
(45) Date of Patent: Jan. 13, 2026

(54) INHIBITORS OF GAS FOR TREATING AUTOINFLAMMATORY DISEASES AND CANCER METASTASIS

(71) Applicants: The Rockefeller University, New York, NY (US); Memorial Sloan-Kettering Cancer Center, New York, NY (US)

(72) Inventors: Daisuke Tomita, Harrison, NY (US); Lodoe Lama, New York, NY (US); Thomas Tuschl, New York, NY (US); Dinshaw Patel, New York, NY (US); J. Fraser Glickman, New York, NY (US); Taku Kamei, Kanagawa (JP); Michael Miller, Scotch Plains, NJ (US); Yasutomi Asano, Kanagawa (JP); Rei Okamoto, Kanagawa (JP); Shogo Hashizume, Kanagawa (JP); Jumpei Aida, Kanagawa-ken (JP); Toshihiro Imaeda, Kawagawa (JP); Mayako Michino, New York, NY (US); Takanobu Kuroita, Tokushima (JP)

(73) Assignees: The Rockefeller University, New York, NY (US); Memorial Sloan-Kettering Cancer Center, New York, NY (US)

( * ) Notice: Subject to any disclaimer, the term of this patent is extended or adjusted under 35 U.S.C. 154(b) by 982 days.

(21) Appl. No.: 17/437,974

(22) PCT Filed: Mar. 12, 2020

(86) PCT No.: PCT/US2020/022334
§ 371 (c)(1),
(2) Date: Sep. 10, 2021

(87) PCT Pub. No.: WO2020/186027
PCT Pub. Date: Sep. 17, 2020

(65) Prior Publication Data
US 2022/0185812 A1 Jun. 16, 2022

Related U.S. Application Data

(60) Provisional application No. 62/817,759, filed on Mar. 13, 2019.

(51) Int. Cl.
| | |
|---|---|
| C07D 471/14 | (2006.01) |
| A61P 29/00 | (2006.01) |
| A61P 35/04 | (2006.01) |
| C07D 471/04 | (2006.01) |
| C07D 487/04 | (2006.01) |

(52) U.S. Cl.
CPC ......... *C07D 471/14* (2013.01); *C07D 471/04* (2013.01); *C07D 487/04* (2013.01)

(58) Field of Classification Search
CPC .. C07D 471/14; C07D 471/04; C07D 487/04; Y02A 50/30; A61P 29/00; A61P 35/04
See application file for complete search history.

(56) References Cited

U.S. PATENT DOCUMENTS

| | | |
|---|---|---|
| 2009/0239854 A1 | 9/2009 | Hung et al. |
| 2013/0023524 A1 | 1/2013 | Alisi et al. |
| 2013/0131054 A1 | 5/2013 | Hung et al. |
| 2017/0204095 A1 | 7/2017 | Guzzo et al. |

FOREIGN PATENT DOCUMENTS

| | | |
|---|---|---|
| WO | 2016176222 A1 | 11/2016 |
| WO | 2017176812 A1 | 10/2017 |
| WO | 2019153002 A1 | 8/2019 |

OTHER PUBLICATIONS

RN1787739-76-7, registry database compound, 2015.*
RN1790427-44-9, registry database compound, 2015.*
RN2323975-12-6, registry database compound, 2019.*
RN2323975-12-6, registry database compound, properties, 2019.*
RN1787739-76-7, registry database compound properties, 2015.*
Shen et a., 2025, 18:40, Journal of Hematology and Oncology.*
Govindarajule et al., 2023, Interntional Journal of Molecular Sciences, 24, 8151.*
CAS RN 2124449-05-2, Methanone, (tetrahydro-5,5-dimethyl-2-furanyl) (1,3,4,5-tetrahydro-2H-pyrido [4,3-b] indol-2-yl), 1 page. Sep. 3, 2017.
CAS RN1987670-75-6, Methanone, (7-fluoro-1,3,4,5-tetrahydro-2H-pyrido [4,3-b] indol-2-yl) (tetrahydro-2-furanyl), 1 page. Sep. 6, 2016.
CAS RN 1985762-63-7, Methanone, (7-chloro-1,3,4,5-tetrahydro-2H-pyrido [4,3-b] indol-2-yl) (tetrahydro-2-furanyl), 1 page. Sep. 4, 2016.
CAS RN 1985384-44-8, Methanone, (tetrahydro-2-furanyl) (1,3,4,5-tetrahydro-7-methyl-2H-pyrido [4,3-b] indol-2-yl), 1 page. Sep. 2, 2016.

(Continued)

*Primary Examiner* — Sun Jae Yoo
(74) *Attorney, Agent, or Firm* — Heslin Rothenberg Farley & Mesiti P.C.

(57) ABSTRACT

Tri-cyclyl nitrogen-containing heterocyclic compounds

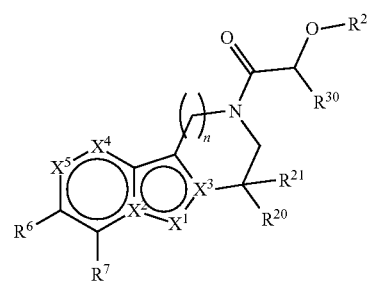

are disclosed. The compounds are inhibitors of human cGAS in interferon-producing cell types. They are thus useful as therapeutic agents for treating cGAS-related autoimmune diseases in humans.

20 Claims, No Drawings

(56) References Cited

OTHER PUBLICATIONS

CAS RN 1985091-99-3, Methanone, (tetrahydro-2-furanyl) (1,3,4,5-tetrahydro-8-methyl-2H-pyrido [4, 3-b] indol-2-yl), 1 page. Sep. 2, 2016.
CAS RN 1941861-56-8, 3-Morpholinone, 4-methyl-5-(1-methyl-1H-pyrazol-4-yl) -6-[1,3,4,5-tetrahydro-2H-pyrido [4,3-b] indol-2-yl) carbonyl]-, (5R, 6R), 1 page. Jun. 29, 2016.
CAS RN 1790725-20-0, Methanone, (tetrahydro-2-furanyl) (1,3,4,5-tetrahydro-6-methoxy-2H-pyrido [4,3-b] indol-2-yl). 1 page. Jun. 29, 2015.
CAS RN 1790711-40-8, Methanone, (tetrahydro-2-furanyl) (1,4,5,6-tetrahydro-9-methylazepino [4,5-b] indol-3 (2H)-yl), 1 page. Jun. 29, 2015.
CAS RN 1790427-44-9, Ethanone, 2-(2-methoxyethoxy)-1-(1,4,5,6-tetrahydroazepine [4,5-b] indol-3(2H)-yl, 1 page. Jun. 28, 2015.
CAS RN 1789664-58-9, Ethanone, 2-methoxy-1-(1,4,5,6-tetrahydroazepino [4,5-b] indol-3(2H)-yl), 1 page. Jun. 26, 2015.
CAS RN 1789226-87-4, Ethanone, 2-(2-methoxyethoxy)-1-(1,4,5,6-tetrahydro-9-methylazepino [4,5-b] indol-3(2H)-yl), 1 page. Jun. 26, 2015.
CAS RN 1789225-10-0, Ethanone, 2-methoxy-1-(1,4,5,6-tetrahydro-9-methylazepino[4,5-b] indol-3(2H)-yl, 1 page. Jun. 26, 2015.
CAS RN 1788619-65-7, Methanone, (1,4,5,6-tetrahydroazepino [4,5-b] indol-3(2H)-yl (tetrahydro-2-furanyl), 1 page. Jun. 25, 2015.
CAS RN 1787739-76-7, Ethanone, 2-(2-methoxyethoxy)-1-(1,3,4,5-tetrahydro-2H-pyrido [4,3-b] indol-2-yl), 1 page. Jun. 24, 2015.
CAS RN 1710373-80-0, Ethanone, 2-(1-methylethoxy)-1-(1,3,4,5-tetrahydro-2H-pyrido[1,3-b] indol-2-yl), 1 page. May 22, 2015.
CAS RN 1648498-52-5, Methanone, (4,5-dihydro-3-phenyl-5-isoxazolyl)(8-fluoro-1,3,4,5-tetrahydro-2H-pyrido [4,3-b] indol-2-yl), 1 page. Feb. 16, 2015.
CAS RN 1646706-68-4, Methanone, [3-(-fluorophenyl)-4,5-dihydro-5-isoxazolyl] (8-fluoro-1,3,4,5-tetrahydro-2H-pyrido [4,3-b] indol-2-yl), 1 page. Feb. 12, 2015.
CAS RN 1638348-13-6, Methanone, (8-chloro-1,3,4,5-tetrahydro-2H-pyrido [4,3-b] indol-2-yl) [4,5-dihydro-3-(1-methylethyl)-5-isoxazolyl], 1 page. Dec. 10, 2014.
CAS RN 1427700-96-6, Methanone, [3-(5-chloro-2-thienyl)-4,5-dihydro-5-isoxazolyl] (1,3,4,5-tetrahydro-2H-pyrido [4,3-b] indol-2-yl), 1 page. Apr. 10, 2013.
CAS RN 1308148-80-2, Methanone, 2-morpholinyl (1,3,4,5-tetrahydro-2H-pyrido [4,3-b] indol-2-yl), 1 page. Jun. 9, 2011.
CAS RN 1163296-07-8, Ethanone, 1-(5-ethyl-8-fluoro-1,3,4,5-tetrahydro-2H-pyrido [4,3-b] indol-2-yl)-2-methoxy, 1 page. Jul. 15, 2009.
CAS RN 1119253-29-0, Ethanone, 1-(8-bromo-1,3,4,5-tetrahydro-2H-pyrido [4,3-b] indol-2-yl)-2-methoxy, 1 page. Mar. 11, 2009.
CAS RN 1090595-40-6, Ethanaone, 2-ethoxy-1-(1,3,4,5-tetrahydro-2H-pyrido [4, 3-b] indol-2-yl), 1 page. Dec. 28, 2008.
CAS RN 1090536-53-0, 1H-Pyrido [4,3-b] indole-8-carboxylic acid, 2,3,4,5-tetrahydro-2-[(tetrahydro-2-furanyl) carbonyl]-, methyl ester, 1 page. Dec. 28, 2008.
CAS RN 1088174-58-6, Methanone, (tetrahydro-2-furanyl) (1,3,4,5-tetrahydro-2H-pyrido [4,3-b] indol-2-yl), 1 page. Dec. 22, 2008.
CAS RN 1082039-88-0, Ethanone, 2-methoxy-1-(1,3,4,5-tetrahydro-5-methyl-2H-pyrido [4,3-b] indol-2-yl), 1 page. Dec. 8, 2008.
CAS RN 1081134-82-8, Methanone, (8-chloro-1,3,4,5-tetrahydro-2H-pyrido [4,3-b] indol-2-yl) (tetrahydro-2-furanyl), 1 page. Dec. 7, 2008.
CAS RN 1040698-71-2, Methanone, (tetrahydro-2-furanyl) (1,3,4,5-tetrahydro-8-methoxy-2H-pyrido [4,3-b] indol-2-yl), 1 page. Aug. 13, 2008.
CAS RN 1040694-57-2, Ethanone, 2-methoxy-1-(1,3,4,5-tetrahydro-8-methoxy-2H-pyrido [4,3-b] indol-2-yl), 1 page. Aug. 13, 2008.
CAS RN 1040693-89-7, Ethanone, 1-(8-chloro-1,3,4,5-tetrahydro-2H-pyrido [4,3-b] indol-2-yl)-2-methoxy, 1 page. Aug. 13, 2008.
CAS RN 1010906-10-1, Methanone, (8-fluoro-1,3,4,5-tetrahydro-2H-pyrido [4,3-b] indol-2-yl)(tetrahydro-2-furanyl), 1 page. Mar. 30, 2008.
CAS RN 1010894-28-6, Ethanone, 2-methoxy-1-(1,3,4,5-tetrahydro-2H-pyrido [4,3-b] indol-2-yl), 1 page. Mar. 30, 2008.
CAS RN 1010873-47-8, Ethanone, 1-(8-fluoro-1,3,4,5-tetrahydro-2H-pyrido [4,3-b] indol-2-yl)-2-methoxy, 1 page. Mar. 30, 2008.
Supplementary European Search Report in EP 20769554, 10 pages. Oct. 13, 2022.
CAS RN 2127318-14-1, Methanone, 1,4-dioxan-2-yl (8-f,uoro-1,3,4,5-tetrahydro-2H-pyrido[4,3-b] indol-2-yl), 1 page. Sep. 14, 2017.
CAS RN 1992753-08-8, Methanone, [8-(1, 1-dimethylethyl)-1,3,4,5-tetrahydro-2H-pyrido [4,3-b] indol-2-yl] (tetrahydro-2-furanyl), 1 page. Sep. 13, 2016.
CAS RN 1990922-64-9, Methanone, (tetrahydro-2-furanyl) [1,3,4,5-tetrahydro-8-(1-methylethyl)-2H-pyrido [4,3-b] indol-2-yl]methanone, 1 page. Sep. 11, 2016.
CAS RN 1988352-91-5, Methanone, (tetrahydro-2-furanyl) (1,3,4,5-tetrahydro-5-methyl-2H-pyrido [4,3-b] indol-2-yl) methanone, 1 page. Sep. 7, 2016.
CAS RN 1915900-64-9, Ethanone, 2-propoxy-1-(1,3,4,5-tetrahydro-2H-pyrido [4,3-b] indol-2-yl), 1 page. May 23, 2016.
International Search Report and Written Opinion issued in PCT/US2020/022334 and mailed Jul. 1, 2020.

\* cited by examiner

INHIBITORS OF cGAS FOR TREATING AUTOINFLAMMATORY DISEASES AND CANCER METASTASIS

CROSS REFERENCE TO RELATED APPLICATIONS

This application is a U.S. National Phase filing under 35 U.S.C. § 371 of International Application No. PCT/US2020/022334, filed on Mar. 12, 2020, and published as WO 2020/186027 A1 on Sep. 17, 2020. PCT/US2020/0223 claims priority to U.S. Provisional Application No. 62/817,759, filed on Mar. 13, 2019. The entire contents of each of these prior applications are hereby incorporated herein by reference.

FIELD OF THE INVENTION

The invention relates to tri-cyclyl nitrogen-containing heterocyclic compounds that are inhibitors of human cGAS in major interferon-producing cell types. They are thus useful as therapeutic agents for treating cGAS-related autoimmune diseases, chronic inflammatory diseases, and cancer metastasis in humans.

BACKGROUND OF THE INVENTION

Innate immunity is considered a first line cellular stress response defending the host cell against invading pathogens and initiating signaling to the adaptive immunity system. These processes are triggered by conserved pathogen-associated molecular patterns (PAMPs) through sensing by diverse pattern recognition receptors (PRRs) and subsequent activation of cytokine and type I interferon gene expression. The major antigen-presenting cells, such as monocytes, macrophages, microglia, and dendritic cells produce interferons and are critical for eliciting adaptive T- and B-cell immune system responses. The major PRRs detect aberrant, i.e. mislocalized, immature, or unmodified nucleic acids on either the cell surface, the inside of lysosomal membranes, or the cytosol.

Cyclic GMP-AMP synthase (cGAS/MB21D1) is the predominant sensor for cytosolic dsDNA originating from pathogens or mislocalization of nuclear or mitochondrial self-dsDNA. Binding of dsDNA to cGAS activates the synthesis of c[G(2',5')pA(3',5')p], a diffusible cyclic dinucleotide referred to as cGAMP, which travels to and activates the endoplasmic reticulum membrane-anchored adaptor protein, Stimulator of interferon genes (STING/TMEM173). Activated STING recruits and activates TANK binding kinase 1 (TBK1), which in turn phosphorylates the transcription factor family of interferon regulatory factors (IRFs) inducing cytokine and type I interferon mRNA expression. Type I interferons are expressed from over ten IFNA genes and one IFNB1 gene.

The critical role of cGAS in dsDNA sensing has been established in different pathogenic bacteria, viruses, and retroviruses. Additionally, cGAS is essential in various other biological processes such as cellular senescence and recognition of ruptured micronuclei in the surveillance of potential cancer cells.

While the cGAS pathway is important for host defense against invading pathogens, cellular stress and genetic factors may also cause accumulation of self-dsDNA in the cytosol, e.g. from nuclear or mitochondrial leakage. This can trigger autoinflammatory responses. Aicardi-Goutières syndrome (AGS), a lupus-like severe autoinflammatory immune-mediated disorder, arises from loss-of-function mutation in TREX1, a primary DNA exonuclease responsible for degrading aberrant DNA in cytosol. Knockout of cGAS in TREX1-deficient mice prevented otherwise lethal autoimmune responses, supporting cGAS as a drug target and driver of interferonopathies. Likewise, embryonic lethality caused by deficiency of DNase II, an endonuclease responsible for degradation of excessive DNA in lysosomes during endocytosis, is completely rescued by additional knockout of STING or cGAS. Inhibition of cGAS, therefore, constitutes an important therapeutic strategy for preventing autoinflammatory diseases whose etiology involves anti-dsDNA antibodies. Systemic lupus erythematosus (SLE) may be one such disease [Pisetsky, Nat Rev Rheumatol 12, 102-110 (2016)].

Consequently, cGAS and STING have attracted the interest of structural biologists and medicinal chemists for identification of inhibitors and/or activators. An in silico screening effort using murine cGAS-DNA crystal structure led to the identification of a well-characterized small-molecule anti-malarial drug, quinacrine, as a potential cGAS inhibitor [An et al., J. Immunol. 194, 4089-4093 (2015)]. However, quinacrine, a known DNA intercalator, was found to indirectly affect the cGAS activity through disruption of dsDNA conformation failing to activate the enzyme instead of directly binding and inhibiting the enzyme. Additionally, considerable off-target effect was observed through its interference with RIG-I pathway.

Small molecule inhibitors that are specific for cGAS would be of great value in treating diseases that arise from inappropriate cGAS activity and the resulting undesired type I interferon activity. Examples of such autoimmune diseases include Aicardi-Goutières syndrome (AGS) and systemic lupus erythematosus (SLE), a complex chronic systemic autoimmune disease that afflicts over 1.5 million Americans. Current treatments for SLE involve immuno-suppressive regimens associated with debilitating adverse side effects. Other possible utilities related to the suppression of undesired type I interferon activity would include treating inflammatory bowel disease (IBD). Furthermore, suppressing of the non-canonical cGAS-pathway-dependent NF-kB signaling may interfere with the process of cancer metastasis [Bakhoum et al., Nature 553, 467-472 (2018)].

Recent studies revealed that cGAS-pathway mediates ageing-associated chronic inflammation. Senescent cells accumulate in the body as we age. It has been acknowledged that senescent cells secrete a variety of substances such as chemokines, pro-inflammatory cytokines, growth factors, and proteases into the tissue environment. The phenomenon is called senescence-associated secretory phenotype (SASP) and is thought to be involved in etiology of a range of age-associated diseases such as Parkinson's disease and Alzheimer's disease [Chinta et al., Cell Reports 22, 930-940, 23, 2018]. As genetic ablation of cGAS abrogated SASP induced by a variety of stimuli ranging from irradiation to chromatin fragment, DNA sensing by cGAS is regarded as the central mediator of signaling to SASP formation, thus can be considered as plausible therapeutic target for age-associated neurodegenerative diseases.

SUMMARY OF THE INVENTION

It has now been found that tri-cyclyl nitrogen-containing heterocyclic compounds are potent and specific inhibitors for human cGAS and are active in interferon-producing cell types including primary human macrophages.

In one aspect, the invention relates to compounds of Formula I:

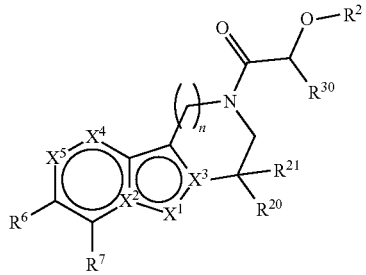

wherein:
the structure

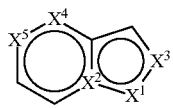

represents a fused 6,5 ring system wherein both rings are aromatic and all backbone atoms are $sp^2$-hybridized;

$X^1$ is N or N—$R^1$;
$X^2$ is C or N;
$X^3$ is N or C;
$X^4$ is C—$R^4$ or N;
$X^5$ is C—$R^5$ or N;
with the proviso that at least one of $X^1$, $X^2$, $X^3$, $X^4$, and $X^5$ is N;
$R^1$ is hydrogen, $(C_1-C_3)$alkyl, $CH_2CH_2$—$OR^{3a}$, or fluoro$(C_1-C_3)$alkyl;
$R^2$ is hydrogen, $(C_1-C_3)$alkyl, or $CH_2CH_2$—$OR^{3b}$, or, taken together along with the atoms to which they are attached, $R^2$ and $R^{30}$ may form a 4- to 6-membered oxygen-containing non-aromatic heterocyclic ring;
$R^{3a}$ is hydrogen or $(C_1-C_3)$alkyl;
$R^{3b}$ is hydrogen or $(C_1-C_3)$alkyl;
$R^4$ is chosen from optionally substituted monocyclic heterocyclyl, hydrogen, halogen, $(C_1-C_6)$alkyl, $(C_1-C_6)$alkoxy, fluoro$(C_1-C_6)$alkyl, fluoro$(C_1-C_6)$alkoxy, $(C_3-C_6)$cycloalkyl, fluoro$(C_3-C_6)$cycloalkyl, $(C_3-C_6)$cycloalkyloxy, fluoro$(C_3-C_6)$cycloalkyloxy, cyano, optionally substituted phenyl, optionally substituted bicyclic heterocyclyl, amino$(C_1-C_3)$alkyl, $(C_1-C_3)$alkylamino$(C_1-C_3)$alkyl, $(C_1-C_3)$dialkylamino$(C_1-C_3)$alkyl, $(C_1-C_3)$alkoxy$(C_1-C_3)$alkyl, $(C_1-C_6)$hydrocarbyl, heterocyclyl$(C_1-C_3)$alkyl, benzyl, heterocyclyl-substituted benzyl, $(C_1-C_3)$alkylaminocarbonyl, and $(C_1-C_3)$acylamino;
$R^5$ is chosen from hydrogen, $(C_1-C_6)$alkoxy, halogen, $(C_1-C_6)$alkyl, fluoro$(C_1-C_6)$alkyl, fluoro$(C_1-C_6)$alkoxy, $(C_3-C_6)$cycloalkyl, fluoro$(C_3-C_6)$cycloalkyl, $(C_3-C_6)$cycloalkyloxy, fluoro$(C_3-C_6)$cycloalkyloxy, optionally substituted monocyclic heterocyclyl, cyano, optionally substituted phenyl, optionally substituted bicyclic heterocyclyl, amino$(C_1-C_3)$alkyl, $(C_1-C_3)$alkylamino$(C_1-C_3)$alkyl, $(C_1-C_3)$dialkylamino$(C_1-C_3)$alkyl, $(C_1-C_3)$alkoxy$(C_1-C_3)$alkyl, $(C_1-C_6)$hydrocarbyl, heterocyclyl$(C_1-C_3)$alkyl, benzyl, heterocyclyl-substituted benzyl, $(C_1-C_3)$alkylaminocarbonyl, and $(C_1-C_3)$acylamino;

wherein:
said optionally substituted monocyclic heterocyclyl may be substituted with one or more substituents chosen from: $(C_1-C_3)$alkyl, amino, cyano, $(C_1-C_3)$alkylamino, $(C_1-C_3)$alkoxy, oxo, fluoro$(C_1-C_3)$alkyl, halogen, hydroxy, and hydroxy$(C_1-C_3)$alkyl;

said optionally substituted phenyl may be substituted with one or more substituents chosen from: amino, $(C_1-C_3)$alkylamino, $(C_1-C_3)$dialkylamino, $(C_1-C_3)$alkoxy, hydroxy, halogen, cyano, aminocarbonyl, methylenedioxy, ethylenedioxy, $(C_1-C_3)$acylamino, fluoro$(C_1-C_3)$acylamino, and hydroxy$(C_1-C_3)$alkylaminosulfonyl; and said optionally substituted bicyclic heterocyclyl may be substituted with one or more substituents chosen from: $(C_1-C_3)$alkyl, hydroxy, and oxo;

$R^6$ and IC are independently chosen from halogen, hydrogen, cyano, —CH=$CH_2$, $(C_1-C_3)$alkyl, $(C_1-C_3)$alkoxy, fluoro$(C_1-C_3)$alkyl, fluoro$(C_1-C_3)$alkoxy, $(C_3-C_4)$cycloalkyl, and fluoro$(C_3-C_4)$cycloalkyl;

$R^{20}$ is hydrogen or $(C_1-C_3)$alkyl, or, taken together with the carbon to which they are attached, $R^{20}$ and $R^{21}$ may form a 3- to 5-membered aliphatic carbocyclic ring;

$R^{21}$ is hydrogen or $(C_1-C_3)$alkyl, or, taken together with the carbon to which they are attached, $R^{21}$ and $R^{20}$ may form a 3- to 5-membered aliphatic carbocyclic ring;

$R^{30}$ is hydrogen, or, taken together along with the atoms to which they are attached, $R^{30}$ and $R^2$ may form a 4- to 6-membered oxygen-containing non-aromatic heterocyclic ring; and n is 1 or 2;

In one aspect, the invention relates to a method or medicament for inhibiting an inflammatory response in a patient with a compound as described herein.

In another aspect, the invention relates to a method or medicament for inhibiting dsDNA-triggered interferon expression in a patient with a compound as described herein.

In another aspect, the invention relates to a method or medicament for treating Aicardi Goutières Syndrome, Parkinson's disease, Alzheimer's disease, or Systemic lupus erythematosus in a patient with a compound as described herein.

In another aspect, the invention relates to a method or medicament for treating cancer metastasis in a patient with a compound as described herein.

In another aspect, the invention relates to a method or medicament for inhibiting cGAS in a patient with a compound as described herein.

In another aspect, the invention relates to pharmaceutical compositions comprising a pharmaceutically acceptable carrier and a compound as described herein.

DETAILED DESCRIPTION OF THE INVENTION

In a composition aspect, the invention relates to compounds of Formula I:

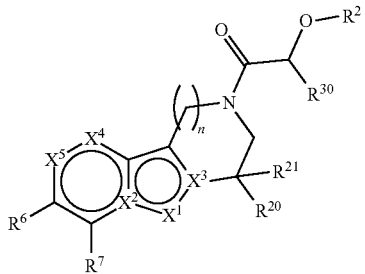

I as described above.

In some embodiments, $X^1$ is N. In other embodiments, $X^1$ is N—$R^1$. It will be understood by those having ordinary skill in the art that $X^1$ may only be N in embodiments wherein one of $X^2$ or $X^3$ is N and, conversely, $X^2$ or $X^3$ may not be N without $X^1$ being N.

In some embodiments when $X^1$ is N—$R^1$, $R^1$ is hydrogen. In other embodiments when $X^1$ is N—$R^1$, $R^1$ is a $(C_1-C_3)$ alkyl group, in particular, methyl. In yet other embodiments when $X^1$ is N—$R^1$, $R^1$ is $CH_2CH_2$—$OR^{3a}$, wherein $R^{3a}$ is chosen from hydrogen and $(C_1-C_3)$alkyl. In still other embodiments when $X^1$ is N—$R^1$, $R^1$ is a fluoro$(C_1-C_3)$alkyl group.

In some embodiments, at least one of $X^2$, $X^3$, $X^4$ and $X^5$ is N. In one subgenus, $X^1$ is N and $X^3$ is N:

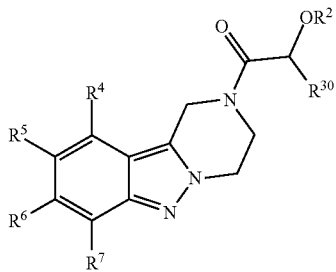

In one subgenus, $X^1$ is $NR^1$ and $X^5$ is N:

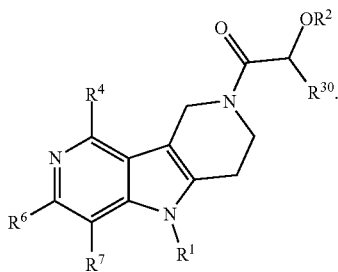

In another subgenus, $X^1$ is $NR^1$ and $X^4$ is N:

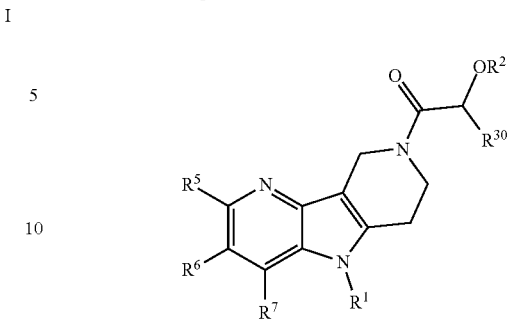

In some embodiments, $X^2$ is C. In other embodiments, $X^2$ is N.

In some embodiments, $X^3$ is C. In other embodiments, $X^3$ is N.

In some embodiments, $X^4$ is C—$R^4$. In other embodiments, $X^4$ is N.

In some embodiments when $X^4$ is C—$R^4$, $R^4$ is hydrogen. In other embodiments when $X^4$ is C—$R^4$, $R^4$ is halogen. In yet other embodiments when $X^4$ is C—$R^4$, $R^4$ is $(C_1-C_6)$alkoxy. In still other embodiments when $X^4$ is C—$R^4$, $R^4$ is $(C_1-C_6)$alkyl.

In some embodiments when $X^4$ is C—$R^4$, $R^4$ is fluoro$(C_1-C_6)$alkyl. In other embodiments when $X^4$ is C—$R^4$, $R^4$ is fluoro$(C_1-C_6)$alkoxy. In yet other embodiments when $X^4$ is C—$R^4$, $R^4$ is $(C_3-C_6)$cycloalkyl. In still other embodiments when $X^4$ is C—$R^4$, $R^4$ is fluoro$(C_3-C_6)$cycloalkyl.

In some embodiments when $X^4$ is C—$R^4$, $R^4$ is $(C_3-C_6)$cycloalkyloxy. In other embodiments when $X^4$ is C—$R^4$, $R^4$ is fluoro$(C_3-C_6)$cycloalkyloxy. In yet other embodiments when $X^4$ is C—$R^4$, $R^4$ is cyano. In still other embodiments when $X^4$ is C—$R^4$, $R^4$ is an amino$(C_1-C_3)$alkyl group.

In some embodiments when $X^4$ is C—$R^4$, $R^4$ is $(C_1-C_3)$alkylamino$(C_1-C_3)$alkyl. In other embodiments when $X^4$ is C—$R^4$, $R^4$ is $(C_1-C_3)$dialkylamino$(C_1-C_3)$alkyl. In yet other embodiments when $X^4$ is C—$R^4$, $R^4$ is $(C_1-C_3)$alkoxy$(C_1-C_3)$alkyl. In still other embodiments when $X^4$ is C—$R^4$, $R^4$ is $(C_1-C_6)$hydrocarbyl.

In some embodiments when $X^4$ is C—$R^4$, $R^4$ is heterocyclyl$(C_1-C_3)$alkyl. In other embodiments when $X^4$ is C—$R^4$, $R^4$ is benzyl. In yet other embodiments when $X^4$ is C—$R^4$, $R^4$ is heterocyclyl-substituted benzyl. In still other embodiments when $X^4$ is C—$R^4$, $R^4$ is $(C_1-C_3)$alkylaminocarbonyl. In some embodiments when $X^4$ is C—$R^4$, $R^4$ is $(C_1-C_3)$acylamino.

For some embodiments where $R^4$ is $(C_1-C_6)$alkoxy, said $(C_1-C_6)$alkoxy is chosen from methoxy, ethoxy, propoxy, and butoxy.

For some embodiments where $R^4$ is $(C_3-C_6)$cycloalkyloxy, said $(C_3-C_6)$cycloalkyloxy is chosen from cyclopropyloxy, and cyclobutyloxy.

In some embodiments when $X^4$ is C—$R^4$, $R^4$ is an optionally substituted monocyclic heterocyclyl. In other embodiments when $X^4$ is C—$R^4$, $R^4$ is an optionally substituted phenyl. In yet other embodiments when $X^4$ is C—$R^4$, $R^4$ is an optionally substituted bicyclic heterocyclyl.

For some embodiments where $R^4$ is an optionally substituted monocyclic heterocyclyl, said optional substituents are chosen from one or more of: a $(C_1-C_3)$alkyl, an amino group, a cyano substituent, a $(C_1-C_3)$alkylamino group, a $(C_1-C_3)$alkoxy group, an oxo substituent, a fluoro$(C_1-C_3)$alkyl group (i.e., a $(C_1-C_3)$alkyl that is further substituted with one or more fluorines), a halogen substituent, a hydroxy substituent, and a hydroxy$(C_1-C_3)$alkyl group.

For some embodiments where $R^4$ is an optionally substituted monocyclic heterocyclyl, said optional substituents are chosen from one or more of: a methyl group, an ethyl group, a difluoromethyl group, a trifluoromethyl group, a fluoro substituent, a chloro substitutent, a bromo substitutent, a methoxy group, and an ethoxy group.

For some embodiments where $R^4$ is an optionally substituted monocyclic heterocyclyl, the monocyclic heterocyclyl is chosen from furanyl, thiophenyl, pyrrolyl, pyrazolyl oxazolyl, oxadiazolyl thiazolyl, isoxazolyl, isothiazolyl, imidazolyl, triazolyl, pyridinyl pyrimidinyl pyrazinyl, pyridazinyl, dihydropyranyl, tetrahydropyranyl, tetrahydrofuranyl, oxetanyl, and azetidinyl.

For some embodiments where $R^4$ is an optionally substituted monocyclic heteroaryl, the monocyclic heteroaryl is chosen from furanyl, thiophenyl, pyrrolyl, pyrazolyl, oxazolyl, oxadiazolyl, thiazolyl, isoxazolyl, isothiazolyl, imidazolyl, triazolyl, pyridinyl, pyrimidinyl, pyrazinyl, and pyridazinyl.

For the embodiments where $R^4$ is an optionally substituted phenyl, said optional substituents are chosen from one or more of: an amino substituent, a $(C_1-C_3)$alkylamino group, a $(C_1-C_3)$dialkylamino group, a $(C_1-C_3)$alkoxy group (in particular, methoxy), a hydroxy substituent, a halogen substituent (in particular fluoro), a cyano substituent, an aminocarbonyl group, a 1,2-methylenedioxy ring, a 1,2-ethylenedioxy ring, a $(C_1-C_3)$acylamino group, a fluoro$(C_1-C_3)$acylamino group, and a hydroxy$(C_1-C_3)$alkylaminosulfonyl group.

For the embodiments where $R^4$ is an optionally substituted bicyclic heterocyclyl, said optional substituents are chosen from one or more of: a $(C_1-C_3)$alkyl group, a hydroxy substituent, and an oxo substituent.

For some embodiments where $R^4$ is an optionally substituted bicyclic heterocyclyl, the bicyclic heterocyclyl is chosen from: indolyl, isoindolyl, benzimidazolyl, benzofuranyl, benzothiophenyl, benzooxadiazolyl, benzothiazolyl, pyrazolopyridinyl, quinolinyl, isoquinolinyl, quinazolinyl, quinoxalinyl, benzodioxolyl, dihydrobenzooxazinyl, and purinyl.

In some embodiments, $R^4$ is a $(C_1-C_3)$alkylamino$(C_1-C_3)$alkyl group. In other embodiments, $R^4$ is a $(C_1-C_3)$dialkylamino$(C_1-C_3)$alkyl group. In yet other embodiments, $R^4$ is a $(C_1-C_3)$alkoxy$(C_1-C_3)$alkyl group. In still other embodiments, $R^4$ is $(C_1-C_6)$hydrocarbyl group.

In some embodiments, $R^4$ is a heterocyclyl$(C_1-C_3)$alkyl group. In other embodiments, $R^4$ is a benzyl group. In yet other embodiments, $R^4$ is a heterocyclyl-substituted benzyl group. In still other embodiments, $R^4$ is a $(C_1-C_3)$alkylaminocarbonyl or a $(C_1-C_3)$acylamino group.

In some embodiments, $X^5$ is C—$R^5$. In other embodiments, $X^5$ is N.

In some embodiments when $X^5$ is C—$R^5$, $R^5$ is hydrogen. In other embodiments when $X^5$ is C—$R^5$, $R^5$ is halogen. In yet other embodiments when $X^5$ is C—$R^5$, $R^5$ is $(C_1-C_6)$alkoxy. In still other embodiments when $X^5$ is C—$R^5$, $R^5$ is $(C_1-C_6)$alkyl.

In some embodiments when $X^5$ is C—$R^5$, $R^5$ is fluoro$(C_1-C_6)$alkyl. In other embodiments when $X^5$ is C—$R^5$, $R^5$ is fluoro$(C_1-C_6)$alkoxy. In yet other embodiments when $X^5$ is C—$R^5$, $R^5$ is $(C_3-C_6)$cycloalkyl. In still other embodiments when $X^5$ is C—$R^5$, $R^5$ is fluoro$(C_3-C_6)$cycloalkyl.

In some embodiments when $X^5$ is C—$R^5$, $R^5$ is $(C_3-C_6)$cycloalkyloxy. In other embodiments when $X^5$ is C—$R^5$, $R^5$ is fluoro$(C_3-C_6)$cycloalkyloxy. In yet other embodiments when $X^5$ is C—$R^5$, $R^5$ is cyano. In still other embodiments when $X^5$ is C—$R^5$, $R^5$ is an amino$(C_1-C_3)$alkyl group.

In some embodiments when $X^5$ is C—$R^5$, $R^5$ is $(C_1-C_3)$alkylamino$(C_1-C_3)$alkyl. In other embodiments when $X^5$ is C—$R^5$, $R^5$ is $(C_1-C_3)$dialkylamino$(C_1-C_3)$alkyl. In yet other embodiments when $X^5$ is C—$R^5$, $R^5$ is $(C_1-C_3)$alkoxy$(C_1-C_3)$alkyl. In still other embodiments when $X^5$ is C—$R^5$, $R^5$ is $(C_1-C_6)$hydrocarbyl.

In some embodiments when $X^5$ is C—$R^5$, $R^5$ is heterocyclyl$(C_1-C_3)$alkyl. In other embodiments when $X^5$ is C—$R^5$, $R^5$ is benzyl. In yet other embodiments when $X^5$ is C—$R^5$, $R^5$ is heterocyclyl-substituted benzyl. In still other embodiments when $X^5$ is C—$R^5$, $R^5$ is $(C_1-C_3)$alkylaminocarbonyl. In some embodiments when $X^5$ is C—$R^5$, $R^5$ is $(C_1-C_3)$acylamino.

In some embodiments when $X^5$ is C—$R^5$, $R^5$ is an optionally substituted monocyclic heterocyclyl. In other embodiments when $X^5$ is C—$R^5$, $R^5$ is an optionally substituted phenyl ring. In yet other embodiments when $X^5$ is C—$R^5$, $R^5$ is an optionally substituted bicyclic heterocyclyl.

For some embodiments where $R^5$ is an optionally substituted monocyclic heterocyclyl, said optional substituents are chosen from one or more of: a $(C_1-C_3)$alkyl, an amino group, a cyano substituent, a $(C_1-C_3)$alkylamino group, a $(C_1-C_3)$alkoxy group, an oxo substituent, a fluoro$(C_1-C_3)$alkyl group, a halogen substituent, a hydroxy substituent, and a hydroxy$(C_1-C_3)$alkyl group.

For some embodiments where $R^5$ is an optionally substituted monocyclic heterocyclyl, said optional substituents are chosen from one or more of: a methyl group, a ethyl group, a difluoromethyl group, a trifluoromethyl group, a fluoro substituent, a chloro substitutent, a bromo substitutent, a methoxy group, and a ethoxy group.

For some embodiments where $R^5$ is an optionally substituted monocyclic heterocyclyl, the monocyclic heterocyclyl is chosen from furanyl, thiophenyl, pyrrolyl, pyrazolyl oxazolyl, oxadiazolyl thiazolyl, isoxazolyl, isothiazolyl, imidazolyl, triazolyl, pyridinyl pyrimidinyl pyrazinyl, pyridazinyl, dihydropyranyl, tetrahydropyranyl, tetrahydrofuranyl, oxetanyl, and azetidinyl.

For some embodiments where $R^5$ is an optionally substituted monocyclic heteroaryl, the monocyclic heteroaryl is chosen from furanyl, thiophenyl, pyrrolyl, pyrazolyl, oxazolyl, oxadiazolyl, thiazolyl, isoxazolyl, isothiazolyl, imidazolyl, triazolyl, pyridinyl, pyrimidinyl, pyrazinyl, and pyridazinyl.

For the embodiments where $R^5$ is an optionally substituted phenyl ring, said optional substituents are chosen from one or more of: an amino substituent, a $(C_1-C_3)$alkylamino group, a $(C_1-C_3)$dialkylamino group, a $(C_1-C_3)$alkoxy group (in particular, methoxy), a hydroxy substituent, a halogen substituent (in particular fluoro), a cyano substituent, an aminocarbonyl group, a 1,2-methylenedioxy ring, a 1,2-ethylenedioxy ring, a $(C_1-C_3)$acylamino group, a fluoro$(C_1-C_3)$acylamino group, and a hydroxy$(C_1-C_3)$alkylaminosulfonyl group.

For the embodiments where $R^5$ is an optionally substituted bicyclic heterocyclyl, said optional substituents are chosen from one or more of: a $(C_1-C_3)$alkyl group, a hydroxy substituent, and an oxo substituent.

For some embodiments where $R^5$ is an optionally substituted bicyclic heterocyclyl, the bicyclic heterocyclyl is chosen from: indolyl, isoindolyl, benzimidazolyl, benzofuranyl, benzothiophenyl, benzooxadiazolyl, benzothiazolyl, pyrazolopyridinyl, quinolinyl, isoquinolinyl, quinazolinyl, quinoxalinyl, benzodioxolyl, dihydrobenzooxazinyl, and purinyl.

In some embodiments, $R^5$ is a $(C_1-C_3)$alkylamino$(C_1-C_3)$alkyl group. In other embodiments, $R^5$ is a $(C_1-C_3)$dialkylamino($C_1$-$C_3$)alkyl group. In yet other embodiments, $R^5$ is a ($C_1$-$C_3$)alkoxy($C_1$-$C_3$)alkyl group. In still other embodiments, $R^5$ is ($C_1$-$C_6$)hydrocarbyl group.

In some embodiments, $R^5$ is a heterocyclyl($C_1$-$C_3$)alkyl group. In other embodiments, $R^5$ is a benzyl group. In yet other embodiments, $R^5$ is a heterocyclyl-substituted benzyl group. In still other embodiments, $R^5$ is a ($C_1$-$C_3$)alkylaminocarbonyl or a ($C_1$-$C_3$)acylamino group.

In some embodiments, $R^2$ is hydrogen. In other embodiments, $R^2$ is a ($C_1$-$C_3$)alkyl group, in particular, methyl. In yet other embodiments, $R^2$ is $CH_2CH_2$—$OR^{3b}$, wherein $R^{3b}$ is chosen from hydrogen and ($C_1$-$C_3$)alkyl. In still other embodiments, $R^2$ and $R^{30}$, along with the atoms to which they are attached, form a 4- to 6-membered oxygen-containing non-aromatic heterocyclic ring.

In some embodiments, $R^6$ is hydrogen. In other embodiments, $R^6$ is a halogen substituent, in particular, bromo, chloro or fluoro. In yet other embodiments, $R^6$ is a cyano substituent. In still other embodiments, $R^6$ is chosen from a —C≡CH, —CH=$CH_2$, ($C_1$-$C_3$)alkyl, ($C_1$-$C_3$)alkoxy, fluoro($C_1$-$C_3$)alkyl, fluoro($C_1$-$C_3$)alkoxy, ($C_3$-$C_4$)cycloalkyl, and fluoro($C_3$-$C_4$)cycloalkyl.

In some embodiments, $R^7$ is hydrogen. In other embodiments, $R^7$ is a halogen substituent, in particular, bromo, chloro or fluoro. In yet other embodiments, $R^7$ is a cyano substituent. In still other embodiments, $R^7$ is chosen from a —C≡CH, —CH=$CH_2$, ($C_1$-$C_3$)alkyl, ($C_1$-$C_3$)alkoxy, fluoro($C_1$-$C_3$)alkyl, fluoro($C_1$-$C_3$)alkoxy, ($C_3$-$C_4$)cycloalkyl, and fluoro($C_3$-$C_4$)cycloalkyl.

In some embodiments, $R^{20}$ is hydrogen. In other embodiments, $R^{20}$ is a ($C_1$-$C_3$)alkyl group, in particular methyl. In some embodiments, $R^{21}$ is hydrogen. In other embodiments, $R^{21}$ is a ($C_1$-$C_3$)alkyl group, in particular methyl. In some embodiments, $R^{20}$ and $R^{21}$, together with the carbon to which they are attached form a 3- to 5-membered aliphatic carbocyclic ring.

In some embodiments, $R^{30}$ is hydrogen. In other embodiments, $R^{30}$ and $R^2$, along with the atoms to which they are attached, form a 4- to 6-membered oxygen-containing non-aromatic heterocyclic ring.

In some embodiments, n is 1. In other embodiments, n is 2.

In summary, the invention relates to:

[1] A compound of formula I.
[2] A compound according to [1] above wherein $R^1$ is hydrogen.
[3] A compound according to [1] above wherein $R^1$ is ($C_1$-$C_3$)alkyl.
[4] A compound according to [1] above wherein $R^1$ is $CH_2CH_2$—$OR^{3a}$ and $R^{3a}$ is chosen from hydrogen and ($C_1$-$C_3$)alkyl.
[5] A compound according to [1] above wherein $R^1$ is a fluoro($C_1$-$C_3$)alkyl group.
[6] A compound according to any of [1] through [5] above wherein $R^2$ is hydrogen.
[7] A compound according to any of [1] through [5] above wherein $R^2$ is ($C_1$-$C_3$)alkyl.
[8] A compound according to any of [1] through [5] above wherein $R^2$ is $CH_2CH_2$—$OR^{3b}$ and $R^{3b}$ is chosen from hydrogen and ($C_1$-$C_3$)alkyl.
[9] A compound according to any of [1] through [8] above wherein $R^4$ is hydrogen.
[10] A compound according to any of [1] through [8] above wherein $R^4$ is halogen.
[11] A compound according to any of [1] through [8] above wherein $R^4$ is ($C_1$-$C_6$)alkoxy.
[12] A compound according to any of [1] through [8] above wherein $R^4$ is cyano.
[12a] A compound according to any of [1] through [8] above wherein $R^4$ is ($C_3$-$C_6$)cycloalkyloxy
[12b] A compound according to any of [1] through [8] above wherein $R^4$ is fluoro($C_3$-$C_6$)cycloalkyloxy
[13] A compound according to any of [1] through [8] above wherein $R^4$ is an optionally substituted monocyclic heterocyclyl, said optional substituents are chosen from one or more of: a ($C_1$-$C_3$)alkyl group, amino group, a cyano substituent, a ($C_1$-$C_3$)alkylamino group, a ($C_1$-$C_3$)alkoxy group, an oxo substituent, a fluoro($C_1$-$C_3$)alkyl group, a halogen substituent, a hydroxy substituent, and a hydroxy($C_1$-$C_3$)alkyl group.
[14] A compound according to any of [1] through [8] above wherein $R^4$ is an optionally substituted phenyl ring, said optional substituents are chosen from one or more of: an amino substituent, a ($C_1$-$C_3$)alkylamino group, a ($C_1$-$C_3$)dialkylamino group, a ($C_1$-$C_3$)alkoxy group (in particular methoxy), a hydroxy substituent, a halogen substituent (in particular fluoro), an cyano substituent, an aminocarbonyl group, a 1,2-methylenedioxy ring, a 1,2-ethylenedioxy ring, a ($C_1$-$C_3$)acylamino group, a fluoro($C_1$-$C_3$)acylamino group, and a hydroxy($C_1$-$C_3$)alkylaminosulfonyl group.
[15] A compound according to any of [1] through [8] above wherein $R^4$ is an optionally substituted bicyclic heterocyclyl, said optional substituents are chosen from one or more of: a ($C_1$-$C_3$)alkyl group, a hydroxy substituent, and an oxo substituent.
[16] A compound according to any of [1] through [8] above wherein $R^4$ is an amino($C_1$-$C_3$)alkyl group.
[17] A compound according to any of [1] through [8] above wherein $R^4$ is an optionally substituted monocyclic heteroaryl, said optional substituents are chosen from one or more of: an amino substituent, a halogen substituent, a methyl group, a difluoromethyl group, a methoxy group, and a cyano substituent.
[18] A compound according to any of [1] through [8], [13], and [17] above wherein $R^4$ is an optionally substituted monocyclic heteroaryl chosen from furanyl, thiophenyl, pyrrolyl, pyrazolyl, oxazolyl, oxadiazolyl, thiazolyl, isoxazolyl, isothiazolyl, imidazolyl, triazolyl, pyridinyl, pyrimidinyl, pyrazinyl, and pyridazinyl.
[18a] A compound according to any of [1] through [8], [13], and [17] above wherein $R^4$ is an optionally substituted monocyclic heterocyclyl chosen from furanyl, thiophenyl, pyrrolyl, pyrazolyl, oxazolyl, oxadiazolyl, thiazolyl, isoxazolyl, isothiazolyl, imidazolyl, triazolyl, pyridinyl, pyrimidinyl, pyrazinyl, pyridazinyl, dihydropyran, tetrahydropyran, tetrahydrofuranyl, oxetane, and azetidinyl.
[19] A compound according to any of [1] through [8], [13], and [17]-[18] above wherein $R^4$ is

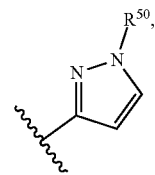

wherein $R_{50}$ is ($C_1$-$C_3$)alkyl or fluoro($C_1$-$C_3$)alkyl.
[20] A compound according to any of [1] through [8], [13], and [17]-[18] above wherein $R^4$ is

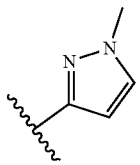

[21] A compound according to any of [1] through [8] above wherein $R^4$ is a $(C_1-C_3)$alkylamino$(C_1-C_3)$alkyl group.
[22] A compound according to any of [1] through [8] above wherein $R^4$ is a $(C_1-C_3)$dialkylamino$(C_1-C_3)$alkyl group.
[23] A compound according to any of [1] through [8] above wherein $R^4$ is a $(C_1-C_3)$alkoxy$(C_1-C_3)$alkyl group.
[24] A compound according to any of [1] through [23] above wherein $R^5$ is hydrogen.
[25] A compound according to any of [1] through [23] above wherein $R^5$ is a halogen substituent.
[26] A compound according to any of [1] through [23] above wherein $R^5$ is a $(C_1-C_3)$alkyl group.
[27] A compound according to any of [1] through [23] above wherein $R^5$ is a $(C_1-C_3)$alkoxy group.
[28] A compound according to any of [1] through [23] above wherein $R^5$ is a fluoro$(C_1-C_3)$alkyl group.
[29] A compound according to any of [1] through [23] above wherein $R^5$ is a fluoro$(C_1-C_3)$alkoxy group.
[30] A compound according to any of [1] through [23] above wherein $R^5$ is a cyano substituent.
[31] A compound according to any of [1] through [30] above wherein $R^6$ is hydrogen.
[32] A compound according to any of [1] through [30] above wherein $R^6$ is bromo, fluoro or chloro.
[33] A compound according to any of [1] through [30] above wherein $R^6$ is a cyano substituent.
[34] A compound according to any of [1] through [33] above wherein $R^7$ is hydrogen.
[35] A compound according to any of [1] through [33] above wherein $R^7$ is fluoro or chloro.
[36] A compound according to any of [1] through [33] above wherein $R^7$ is a cyano substituent.
[37] A compound according to any of [1] through [36] above wherein $R^{20}$ is a hydrogen.
[38] A compound according to any of [1] through [36] above wherein $R^{20}$ is a methyl group.
[39] A compound according to any of [1] through [36] above wherein $R^{21}$ is a hydrogen.
[40] A compound according to any of [1] through [36] above wherein $R^{21}$ is a methyl group.
[41] A compound according to any of [1] through [36] above wherein $R^{20}$ and $R^{21}$, together with the carbon to which they are attached, form a 3- to 5-membered aliphatic carbocyclic ring.
[42] A compound according to any of [1] through [41] above wherein $X^1$ is N—$R^1$.
[43] A compound according to any of [1] and [6] through [41] above wherein $X^1$ is N.
[44] A compound according to any of [1] through [43] above wherein $X^2$ is C.
[45] A compound according to any of [6] through [41], and [43] above wherein $X^2$ is N.
[46] A compound according to any of [1] through [45] above wherein $X^3$ is C.
[47] A compound according to any of [6] through [41], [43], and [44] above wherein $X^3$ is N.
[48] A compound according to any of [1] through [47] above wherein $X^4$ is C—$R^4$.
[49] A compound according to any of [1] through [8] and [24] through [48] above wherein $X^4$ is N.
[50] A compound according to any of [1] through [49] above wherein $X^5$ is C—$R^5$ with the proviso that at least one of $X^1$, $X^2$, $X^3$, and $X^4$ is N.
[51] A compound according to any of [1] through [23] and [31] through [50] above wherein $X^5$ is N.
[52] A compound according to any of [1] through [23] and [31] through [50] above wherein $X^1$ is N and $X^4$ is N
[53] A compound according to any of [1] through [23] and [31] through [50] above wherein $X^1$ is N—$R^1$ and $X^4$ is N
[54] A compound according to any of [1] through [23] and [31] through [50] above wherein $X^1$ is N and $X^5$ is N
[55] A compound according to any of [1] through [23] and [31] through [50] above wherein $X^1$ is N—$R^1$ and $X^5$ is N Throughout this specification the terms and substituents retain their definitions. The description provided herein uses certain terms known in the chemical arts. Unless otherwise specified throughout the description herein, terms retain their meaning as understood by one having ordinary skill in the art.

As used herein, the terms "comprising" and "including" or grammatical variants thereof are to be taken as specifying the stated features, integers, steps or components, but do not preclude the addition of one or more additional features, integers, steps, components or groups thereof. This term encompasses the terms "consisting of" and "consisting essentially of". The phrase "consisting essentially of" or grammatical variants thereof, when used herein, is to be taken as specifying the stated features, integers, steps or components, but does not preclude the addition of one or more additional features, integers, steps, components or groups thereof, but only if the additional features, integers, steps, components or groups thereof do not materially alter the basic and novel characteristics of the claimed composition or method.

As used herein, the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method that "comprises", "has", "includes" or "contains" one or more steps or elements possesses those one or more steps or elements, but is not limited to possessing only those one or more steps or elements.

"Hydrocarbon" (or "hydrocarbyl" when it is a residue) includes alkyl, cycloalkyl, polycycloalkyl, alkenyl, alkynyl, aryl and combinations thereof. Examples include benzyl, phenethyl, cyclohexylmethyl, adamantyl, camphoryl and naphthylethyl. Hydrocarbyl refers to any substituent comprised of hydrogen and carbon as the only elemental constituents. A prefix such as "$C_x-C_y$" or "$(C_x-C_y)$" indicates that the group following the prefix has from x to y carbon atoms. For example, a "$C_1$ to $C_{20}$ hydrocarbon" indicates a hydrocarbon having 1 to 20 carbon atoms. Aliphatic hydrocarbons are hydrocarbons that are not aromatic; they may be saturated or unsaturated, cyclic, linear or branched. Examples of aliphatic hydrocarbons include isopropyl, 2-butenyl, 2-butynyl, cyclopentyl, norbornyl, etc. Aromatic hydrocarbons include benzene (phenyl), naphthalene (naphthyl), anthracene, etc.

Unless otherwise specified, alkyl (or alkylene when divalent) is intended to include linear or branched saturated hydrocarbon structures and combinations thereof. Unless otherwise defined, "alkyl" refers to alkyl groups from 1 to 20 carbon atoms, preferably 1 to 10 carbon atoms, more preferably 1 to 6 carbon atoms. Examples of alkyl groups include methyl, ethyl, propyl, isopropyl, n-butyl, s-butyl, t-butyl and the like.

Cycloalkyl is a subset of hydrocarbon and includes cyclic hydrocarbon groups of from 3 to 8 carbon atoms. Examples of cycloalkyl groups include cyclopropyl, cyclobutyl, cyclopentyl, norbornyl and the like.

Unless otherwise specified, the term "carbocycle" is intended to include ring systems in which the ring atoms are all carbon but of any oxidation state. Thus ($C_3$-$C_{10}$) carbocycle refers to both non-aromatic and aromatic systems, including such systems as cyclopropane, benzene and cyclohexene; ($C_8$-$C_{12}$) carbopolycycle refers to such systems as norbornane, decalin, indane and naphthalene. Carbocycle, if not otherwise limited, refers to monocycles, bicycles and polycycles.

Heterocycle means an aliphatic or aromatic carbocycle residue in which from one to four carbons has been replaced by a heteroatom selected from the group consisting of N, O, and S. Unless otherwise specified, a heterocycle may be non-aromatic (heteroaliphatic) or aromatic (heteroaryl). Examples of heterocycles include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, tetrahydrofuran and the like. Examples of heterocyclyl residues include piperazinyl, piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, benzoxazolyl, tetrahydrofuryl, tetrahydropyranyl, thienyl (also historically called thiophenyl), benzothienyl, thiamorpholinyl, oxadiazolyl, triazolyl and tetrahydroquinolinyl.

Monocyclic heterocyclyl or monocyclic heterocycle means an aromatic or non-aromatic heterocycle composed of a single ring. Examples of monocyclic heterocycles include furan, thiophene, pyrrole, pyrazole, oxazole, oxadiazole, thiazole, isoxazole, isothiazole, imidazole, triazole, pyridine, pyrimidine, pyrazine, and pyridazine. Bicyclic heterocyclyl means an aromatic or non-aromatic heterocycle composed of two fused rings wherein one or both of the rings contain a heteroatom. Thus, bicyclic heterocyclyl includes fused bicyclic structures that have no heteroatom in one ring but contain one or more heteroatoms in the other ring. Neither ring need be aromatic but one or both rings may be aromatic. However, if at least one ring is aromatic, then the bicyclic heterocyclyl is considered aromatic. Examples of bicyclic heterocycles include indole, isoindole, benzimidazole, benzofuran, benzothiophene, benzooxadiazole, benzothiazole, pyrazolopyridine, quinoline, isoquinoline, quinazoline, quinoxaline, benzodioxole, dihydrobenzooxazine, and purine.

Hydrocarbyloxy refers to groups of from 1 to 20 carbon atoms, preferably 1 to 10 carbon atoms, more preferably 1 to 6 carbon atoms attached to the parent structure through an oxygen. Alkoxy is a subset of hydrocarbyloxy and includes groups of a straight or branched configuration. Examples include methoxy, ethoxy, propoxy, isopropoxy and the like. Lower-alkoxy refers to groups containing one to four carbons. The term "halogen" means fluorine, chlorine, bromine or iodine atoms.

Unless otherwise specified, acyl refers to formyl and to groups of 1, 2, 3, 4, 5, 6, 7 and 8 carbon atoms of a straight, branched, cyclic configuration, saturated, unsaturated and aromatic and combinations thereof, attached to the parent structure through a carbonyl functionality. Examples include acetyl, benzoyl, propionyl, isobutyryl and the like. Lower-acyl refers to groups containing one to four carbons.

As used herein, the term "optionally substituted" may be used interchangeably with "unsubstituted or substituted". The term "substituted" refers to the replacement of one or more hydrogen atoms in a specified group with a specified radical. For example, substituted alkyl, aryl, cycloalkyl, heterocyclyl etc. refer to alkyl, aryl, cycloalkyl, or heterocyclyl wherein one or more H atoms in each residue are replaced with halogen, haloalkyl, alkyl, acyl, alkoxyalkyl, hydroxy lower alkyl, carbonyl, phenyl, heteroaryl, benzenesulfonyl, hydroxy, lower alkoxy, haloalkoxy, oxaalkyl, carboxy, alkoxycarbonyl [—C(=O)O-alkyl], alkoxycarbonylamino [HNC(=O)O-alkyl], aminocarbonyl (also known as carboxamido) [—C(=O)NH$_2$], oxo [=O]alkylaminocarbonyl [—C(=O)NH-alkyl], cyano, acetoxy, nitro, amino, alkylamino, dialkylamino, (alkyl)(aryl)aminoalkyl, alkylaminoalkyl (including cycloalkylaminoalkyl), dialkylaminoalkyl, dialkylaminoalkoxy, heterocyclylalkoxy, mercapto, alkylthio, sulfoxide, sulfone, sulfonylamino, alkylsulfinyl, alkyl sulfonyl, acylaminoalkyl, acylaminoalkoxy, acylamino, amidino, aryl, benzyl, heterocyclyl, heterocyclylalkyl, phenoxy, benzyloxy, heteroaryloxy, hydroxyimino, alkoxyimino, oxaalkyl, aminosulfonyl, trityl, amidino, guanidino, ureido, benzyloxyphenyl, and benzyloxy. In one embodiment, 1, 2, or 3 hydrogen atoms are replaced with a specified radical. In the case of alkyl and cycloalkyl, more than three hydrogen atoms can be replaced by fluorine; indeed, all available hydrogen atoms could be replaced by fluorine.

Substituents R″ are generally defined when introduced and retain that definition throughout the specification and in all independent claims.

One or more compounds described herein contain up to two asymmetric centers and may thus give rise to enantiomers, diastereomers, and other stereoisomeric forms which may be defined in terms of absolute stereochemistry as (R)- or (S)-. The present invention is meant to include all such possible isomers as racemates, optically pure forms and intermediate mixtures. Optically active isomers may be prepared using homo-chiral synthons or homo-chiral reagents, or optically resolved using conventional techniques such as chiral chromatography. All tautomeric forms are intended to be included. The graphic representations of racemic, ambiscalemic and scalemic or enantiomerically pure compounds used herein are taken from Maehr *J. Chem. Ed.* 62, 114-120 (1985): simple, single bond lines convey connectivity only and no stereochemical implication; solid and broken wedges are used to denote the absolute configuration of a chiral element; wavy lines indicate explicit disavowal of any stereochemical implication which the bond it represents could generate; solid and broken bold lines are geometric descriptors indicating the relative configuration shown but do not denote absolute configurations; and wedge outlines and dotted or broken lines denote enantiomerically pure compounds of indeterminate absolute configuration. Enantiomerically pure means greater than 80 e.e., and preferably greater than 90 e.e.

For example, a generic structure depicting exemplary compounds of the invention is depicted as follows when $R^{21}$ is hydrogen:

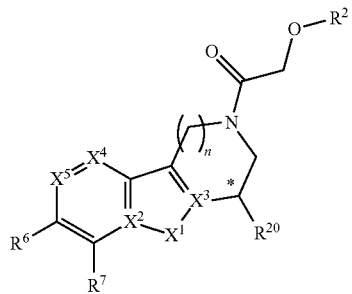

This structure contains a single asymmetric center (labeled with an asterisk). In one embodiment, this structure can be represented as:

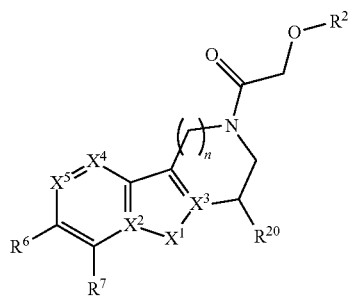

This depiction only indicates connectivity regarding the atoms bonded to the chiral center. The compound represented in this case may be any mixture of R and S enantiomers, from 100% R to 100% S, and any ratio between.

Individual enantiomers are drawn as follows:

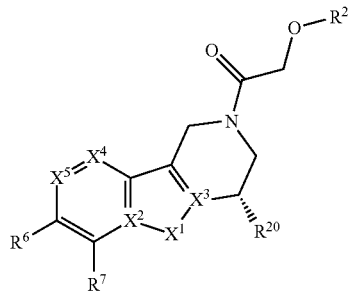

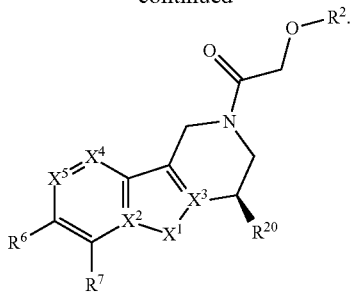

When $R^{20}$ is $(C_1-C_3)$alkyl, the structure on the left indicates that the compound is enantiomerically enriched with the S enantiomer (greater than 90:10 S:R or >80% e.e. S) and the structure on the right indicates that the compound is enantiomerically enriched with the R enantiomer (greater than 90:10 R:S or >80% e.e. R). For structures depicted using this convention, the absolute configuration is known to be as shown.

When the absolute stereochemistry is not known, but the compounds are known to be enantiomerically enriched (>80% e.e.), the structures are drawn as follows:

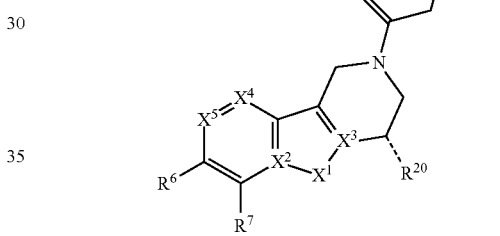

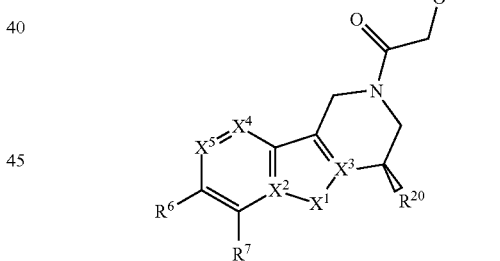

For these structures using this convention, the compounds are enantiomerically enriched (>80% e.e.), but the absolute stereochemistry is unknown. All that is known is that the major isomers are mirror images of each other at the specified e.e. This situation is typically the result of exposure to a chiral environment that leads to enantiomeric enrichment.

Therapeutic benefit includes eradication and/or amelioration of the underlying disorder being treated; it also includes the eradication and/or amelioration of one or more of the symptoms associated with the underlying disorder such that an improvement is observed in the subject, notwithstanding that the subject may still be afflicted with the underlying disorder. In some embodiments, "treatment" or "treating" includes one or more of the following: (a) inhibiting the disorder (for example, decreasing one or more symptoms resulting from the disorder, and/or diminishing the extent of the disorder); (b) slowing or arresting the development of one or more symptoms associated with the disorder (for example, stabilizing the disorder and/or delaying the worsening or progression of the disorder); and/or (c) relieving the disorder (for example, causing the regression of clinical symptoms, ameliorating the disorder, delaying the progression of the disorder, and/or increasing quality of life). A therapeutic benefit is achieved with the eradication or amelioration of one or more of the physiological systems associated with the underlying disorder such that an improvement is observed in the patient, notwithstanding that the patient may still be afflicted with the underlying disorder. In particular, in the case of treating SLE, one considers family predispositions. Thus, if there is a family with three children, two of whom have SLE and anti dsDNA antibodies, if the 3rd child displays dsDNA antibodies but hasn't yet disease symptoms, clinicians would treat the asymptomatic child because of the genetic background.

As used herein, and as would be understood by the person of skill in the art, the recitation of "a compound"—unless expressly further limited—is intended to include salts of that compound. In a particular embodiment, the term "compound of formula" refers to the compound or a pharmaceutically acceptable salt thereof.

The term "pharmaceutically acceptable salt" refers to salts prepared from pharmaceutically acceptable non-toxic acids or bases including inorganic acids and bases and organic acids and bases. When the compounds of the present invention are basic—as they are in most cases—salts may be prepared from pharmaceutically acceptable non-toxic acids including inorganic and organic acids. Preferable examples of salts with inorganic bases include alkali metal salts such as sodium salts, potassium salts and the like; alkali earth metal salts such as calcium salts, magnesium salts and the like; aluminum salts; and ammonium salts. Preferable examples of salts with organic bases include salts with trimethylamine, triethylamine, pyridine, picoline, ethanolamine, diethanolamine, triethanolamine, dicyclohexylamine, N,N-dibenzylethylenediamine and the like. Preferable examples of salts with inorganic acids include salts with hydrochloric acid, hydrobromic acid, nitric acid, sulfuric acid, phosphoric acid and the like. Preferable examples of salts with organic acids include salts with formic acid, acetic acid, trifluoroacetic acid, fumaric acid, oxalic acid, tartaric acid, maleic acid, citric acid, succinic acid, malic acid, methanesulfonic acid, benzenesulfonic acid, p-toluenesulfonic acid and the like. Preferable examples of salts with basic amino acids include salts with arginine, lysine, ornithine and the like. Preferable examples of salts with acidic amino acids include salts with aspartic acid, glutamic acid and the like.

The salt of compound (I) is preferably a salt with an inorganic acid (preferably, hydrochloric acid) or an organic acid (preferably, trifluoroacetic acid).

Suitable pharmaceutically acceptable acid addition salts for the compounds of the present invention include acetic, adipic, alginic, ascorbic, aspartic, benzenesulfonic (besylate), benzoic, boric, butyric, camphoric, camphorsulfonic, carbonic, citric, ethanedisulfonic, ethanesulfonic, ethylenediaminetetraacetic, formic, fumaric, glucoheptonic, gluconic, glutamic, hydrobromic, hydrochloric, hydroiodic, hydroxynaphthoic, isethionic, lactic, lactobionic, laurylsulfonic, maleic, malic, mandelic, methanesulfonic, mucic, naphthylenesulfonic, nitric, oleic, pamoic, pantothenic, phosphoric, pivalic, polygalacturonic, salicylic, stearic, succinic, sulfuric, tannic, tartaric acid, teoclatic, p-toluenesulfonic, and the like. When the compounds contain an acidic functionality (e.g. —$SO_3H$), suitable pharmaceutically acceptable base addition salts for the compounds of the present invention include, but are not limited to, metallic salts made from aluminum, calcium, lithium, magnesium, potassium, sodium and zinc or organic salts made from lysine, arginine, N,N'-dibenzylethylenediamine, chloroprocaine, choline, diethanolamine, ethylenediamine, meglumine (N-methylglucamine) and procaine. Further pharmaceutically acceptable salts include, when appropriate, nontoxic ammonium cations and carboxylate, sulfonate and phosphonate anions attached to alkyl having from 1 to 20 carbon atoms.

The compound of the present invention may be also used as a prodrug thereof, which is converted to the compound by a reaction such as oxidation, reduction, hydrolysis, and the like due to an enzyme, gastric acid etc. under the physiological condition in the living body. A prodrug of the compound of the present invention may be obtained by; subjecting an amino group in the compound to an acylation, alkylation or phosphorylation eicosanoylation, alanylation, pentylaminocarbonylation, (e.g. 5-methyl-2-oxo-1,3-dioxolen-4-yl)methoxycarbonylation, tetrahydrofuranylation, pyrrolidylmethylation, pivaloyloxymethylation and tert-butylation, etc.); subjecting a hydroxyl group in the compound to an acylation, alkylation, phosphorylation or boration (e.g. acetylation, palmitoylation, propanoylation, pivaloylation, succinylation, fumarylation, alanylation and dimethylaminomethylcarbonylation)); subjecting a carboxyl group in the compound to an esterification or amidation (e.g., an ethyl esterification, phenyl esterification, carboxymethyl esterification, dimethylaminomethyl esterification, pivaloyloxymethyl esterification, ethoxycarbonyloxyethyl esterification, phthalidyl esterification, (5-methyl-2-oxo-1,3-dioxolen-4-yl)methyl esterification, cyclohexyloxycarbonylethyl esterification and methylamidation) and the like. Any of these prodrugs of the compound of the present invention can be produced by a method known per se.

The compound of the present invention may be labeled with an isotope (e.g., $^2H$, $^3H$, $^{14}C$, $^{35}S$, $^{125}I$, $^{11}C$, $^{18}F$) and the like. The compound labeled with or substituted by an isotope can be used, for example, as a tracer used for Positron Emission Tomography (PET) (PET tracer), and is useful in the field of medical diagnosis and the like.

The compound of the present invention may be an anhydrate or a hydrate. The compound may be a solvate or a non-solvate. Furthermore, the compound may be a deuterated compound.

The compound of the present invention may be a crystal, and both a single crystal and crystal mixtures are encompassed in the compound. Crystals can be produced by crystallization according to crystallization methods known per se.

In addition, the compound may be a pharmaceutically acceptable cocrystal or cocrystal salt. Here, the cocrystal or cocrystal salt means a crystalline substance consisting of two or more particular substances which are solids at room temperature, each having different physical properties (e.g., structure, melting point, heat of melting, hygroscopicity, and stability). The cocrystal and cocrystal salt can be produced by cocrystallization method known per se.

The compound of the present invention, salt thereof, or a prodrug thereof (hereinafter sometimes to be simply abbreviated as the compound of the present invention) has low toxicity (e.g., acute toxicity, chronic toxicity, genetic toxicity, reproductive toxicity, cardiotoxicity, carcinogenicity), and can be used as it is or in the form of a pharmaceutical composition to mammals (e.g., human, mouse, rat, rabbit, dog, cat, bovine, horse, swine, monkey) as an agent for the prophylaxis or treatment of diseases as separately mentioned. A pharmaceutical composition comprising a compound of the present invention as disclosed above, together with one or more pharmaceutically carriers thereof and optionally one or more other therapeutic ingredients. The carrier(s) must be "acceptable" in the sense of being compatible with the other ingredients of the formulation and not deleterious to the recipient thereof.

As a pharmaceutically acceptable carrier here, common organic or inorganic carrier substances are used as formulation raw materials. Carriers are added as vehicles (e.g., lactose, sucrose, D-mannitol, D-sorbitol, starch, α-starch, dextrin, crystalline cellulose, low-substituted hydroxypropyl cellulose, sodium carboxymethylcellulose, gum Arabic, pullulan, light anhydrous silicic acid, synthetic aluminum silicate, and magnesium metasilicic aluminate), lubricants (e.g., magnesium stearate, calcium stearate, talc, colloidal silica, and the like), binders (e.g., α-starch, sucrose, gelatin, gum Arabic, methylcellulose, carboxymethylcellulose, sodium carboxymethylcellulose, crystalline cellulose, sucrose, D-mannitol, trehalose, dextrin, pullulan, hydroxypropylcellulose, hydroxypropyl methylcellulose, and polyvinylpyrrolidone) and disintegrants (e.g., lactose, sucrose, starch, carboxymethylcellulose, calcium carboxymethylcellulose, croscarmellose sodium, sodium carboxymethyl starch, light anhydrous silicic acid, and low-substituted hydroxypropylcellulose) in the solid formulations; and as solvents, solubilizing agents, suspending agents, isotonization agents, buffering agents, soothing agents etc. in the liquid formulations. If desired, formulation additives such as preservatives, antioxidants, colorants, sweeteners, etc. can be used.

The formulations include those suitable for oral, parenteral (including subcutaneous, intradermal, intramuscular, intravenous and intraarticular), rectal and topical (including dermal, buccal, sublingual and intraocular) administration. The most suitable route may depend upon the condition and disorder of the recipient. The formulations may conveniently be presented in unit dosage form and may be prepared by any of the methods well known in the art of pharmacy. All methods include the step of bringing into association a compound of formula I or a pharmaceutically acceptable salt thereof ("active ingredient") with the carrier which constitutes one or more accessory ingredients. In general, the formulations are prepared by uniformly and intimately bringing into association the active ingredient with liquid carriers or finely divided solid carriers or both and then, if necessary, shaping the product into the desired formulation.

Formulations of the present invention suitable for oral administration may be presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. The active ingredient may also be presented as a bolus, electuary or paste.

A tablet may be made by compression or molding, optionally with one or more accessory ingredients. Compressed tablets may be prepared by compressing in a suitable machine the active ingredient in a free-flowing form such as a powder or granules, optionally mixed with a binder, lubricant, inert diluent, lubricating, surface active or dispersing agent. Molded tablets may be made by molding in a suitable machine a mixture of the powdered compound moistened with an inert liquid diluent. The tablets may optionally be coated or scored and may be formulated so as to provide sustained, delayed or controlled release of the active ingredient therein.

Formulations for parenteral administration include aqueous and non-aqueous sterile injection solutions which may contain anti-oxidants, buffers, bacteriostats and solutes which render the formulation isotonic with the blood of the intended recipient. Formulations for parenteral administration also include aqueous and non-aqueous sterile suspensions, which may include suspending agents and thickening agents. The formulations may be presented in unit-dose of multi-dose containers, for example sealed ampoules and vials, and may be stored in a freeze-dried (lyophilized) condition requiring only the addition of a sterile liquid carrier, for example saline, phosphate-buffered saline (PBS) or the like, immediately prior to use. Extemporaneous injection solutions and suspensions may be prepared from sterile powders, granules and tablets of the kind previously described.

The content of the compound of the present invention in the formulation of the present invention varies based on the dosage forms, dosages of the compound of the present invention, and the like. For example, it is approximately about 0.1 to 100 wt %.

The dosage of the compound of the present invention varies depending on the administration subjects, administration routes, target diseases, symptoms, and the like. For example, for oral administration to adult patients with cancer, generally a single dose is about 0.01 to 100 mg/kg body weight, preferably 0.1 to 50 mg/kg body weight, further preferably 0.5 to 20 mg/kg body weight, and this dosage is preferably administered 1 to 3 times daily.

The compound of the present invention can be used as a prophylactic or therapeutic agent for autoimmune diseases such as Aicardi-Goutières Syndrome (AGS), systemic lupus erythematosus, lupus nephritis, rheumatoid arthritis, Sjogren's syndrome, psoriasis, ulcerative colitis, Crohn's disease, type 1 diabetes, myasthenia gravis, multiple sclerosis, idiopathic pulmonary fibrosis, cirrhosis, endomyocardial fibrosis, scleroderma/systemic sclerosis, and the like.

The compound of the present invention can be used as a prophylactic or therapeutic agent for central nervous system diseases. It is useful as a prophylactic or therapeutic agent for diseases such as (1) psychiatric diseases [e.g., depression, major depression, bipolar depression, dysthymic disorder, emotional disorder (seasonal affective disorder and the like), recurrent depression, postpartum depression, stress disorder, depression symptom, Tourette syndrome, bipolar disorder, neurosis, schizophrenia (e.g., positive symptom, negative symptom, cognitive impairment), psychotic major depression, refractory major depression, treatment-resistant depression], (2) neurodegenerative diseases [e.g., Alzheimer's disease, Alzheimer-type senile dementia, Parkinson's disease, Huntington's disease (Huntington chorea), multi-infarct dementia, frontotemporal dementia, frontotemporal dementia with Parkinsonism, progressive supranuclear palsy, Pick's syndrome, Niemann-Pick syndrome, corticobasal degeneration, vascular dementia, postencephalitic parkinsonism, dementia with Lewy body, HIV dementia, amyotrophic lateral sclerosis (ALS), motor neurogenesis disease (MND), progressive supranuclear palsy, multiple sclerosis, spinocerebellar degeneration (e.g., dentatorubural pallidoluysian atrophy)], ataxia-telangiectasia, (3) Down's syndrome, Hutchinson-Gilford Progeria Syndrome (Progeria, HGPS) (4) age-related cognition and memory disorders [e.g., age-related memory disorders, senile dementia], (5) epilepsy (e.g., Dravet syndrome), traumatic brain injury, diabetic neuropathy, obesity, diabetes, cardiac disease, inflammatory disease, allergic disease, immunodeficiency syndrome caused by HIV infection, immunodeficiency syndrome caused by stress, metabolic syndrome, irritable bowel syndrome, inflammatory bowel disease, ulcerative colitis, Crohn's disease, stress gastrointestinal disorder, stress vomiting, stress ulcer, and the like.

The compound of the present invention can be used as a prophylactic or therapeutic agent for cancer. Examples of the cancer include breast cancer, prostate cancer, pancreatic cancer, gastric cancer, lung cancer, colorectal cancer, rectal cancer, esophagus cancer, duodenal cancer, tongue cancer, pharyngeal cancer, brain tumor, schwannoma, non-small cell lung cancer, small cell lung cancer, liver cancer, kidney cancer, bile duct cancer, uterine body cancer, cervical cancer, ovarian cancer, urinary bladder cancer, skin cancer, hemangioma, malignant lymphoma, malignant melanoma, thyroid cancer, bone tumor, angiofibroma, retinoblastoma, penile cancer, childhood solid cancer, Kaposi's sarcoma, AIDS-related Kaposi's sarcoma, tumor of maxillary sinus, fibrous histiocytoma, leiomyosarcoma, rhabdomyosarcoma, and leukemia. Among these, the compound can be preferably used for prostate cancer, leukemia, and malignant lymphoma.

EXPERIMENTAL SECTION

In general, the production methods for the compounds of the present invention are explained with the following:

The starting materials and reagents used for each step in the following production methods, and the obtained compounds may each form a salt. Examples of the salts include those similar to the aforementioned salts of the compound of the present invention and the like.

When the compound obtained in each step is a free compound, it may be converted to a desired salt by a method known per se. Conversely, when the compound obtained in each step is a salt, it may be converted to a free form or a desired other kind of salt by a method known per se.

The compound obtained in each step may also be used for the next reaction as a reaction mixture thereof or after obtaining a crude product thereof. Alternatively, the compound obtained in each step may be isolated and/or purified from the reaction mixture by a separation means such as concentration, crystallization, recrystallization, distillation, solvent extraction, fractionation, chromatography and the like according to a conventional method.

When the starting materials and reagent compounds of each step are commercially available, the commercially available products are often used as is.

In the reaction of each step, while the reaction time varies depending on the reagents and solvents to be used, unless otherwise specified, it is generally 1 min-48 hr and preferably 10 min-8 hr.

In the reaction of each step, while the reaction temperature varies depending on the reagents and solvents to be used, unless otherwise specified, it is generally −78° C. to 300° C. and preferably −78° C. to 150° C.

In the reaction of each step, while the pressure varies depending on the reagents and solvents to be used, unless otherwise specified, it is generally 1 atm-20 atm and preferably 1 atm-3 atm.

In the reaction of each step, for example, microwave synthesizers such as INITIATOR manufactured by BIOTAGE and the like are sometimes used. While the reaction temperature varies depending on the reagents and solvents to be used, unless otherwise specified, it is generally room temperature to 300° C. and preferably 50° C. to 250° C. While the reaction time varies depending on the reagents and solvents to be used, unless otherwise specified, it is generally 1 min-48 hr and preferably 1 min-8 hr.

In the reaction of each step, unless otherwise specified, a reagent is used in 0.5 equivalent-20 equivalents and preferably 0.8 equivalent-5 equivalents, relative to the substrate. When a reagent is used as a catalyst, the reagent is used in 0.001 equivalent-1 equivalent, preferably 0.01 equivalent-0.2 equivalent, relative to the substrate. When the reagent is also a reaction solvent, the reagent is used in a solvent amount.

In the reaction of each step, unless otherwise specified, it is performed without solvent or by dissolving or suspending in a suitable solvent. Specific examples of the solvent include those described in Examples and the following:

alcohols: methanol, ethanol, tert-butyl alcohol, 2-methoxyethanol and the like;

ethers: diethyl ether, diphenyl ether, tetrahydrofuran, 1,2-dimethoxyethane and the like;

aromatic hydrocarbons: chlorobenzene, toluene, xylene and the like;

saturated hydrocarbons: cyclohexane, hexane and the like;

amides: N,N-dimethylformamide, N-methylpyrrolidone and the like;

halogenated hydrocarbons: dichloromethane, carbon tetrachloride and the like;

nitriles: acetonitrile and the like;

sulfoxides: dimethyl sulfoxide and the like;

aromatic organic bases: pyridine and the like;

acid anhydrides: acetic anhydride and the like;

organic acids: formic acid, acetic acid, trifluoroacetic acid and the like;

inorganic acids: hydrochloric acid, sulfuric acid and the like;

esters: ethyl acetate and the like;

ketones: acetone, methyl ethyl ketone and the like; and water.

Two or more kinds of the above-mentioned solvents may be used by mixing at an appropriate ratio.

When a base is used in the reaction of each step, for example, bases shown below or those described in Examples are used:

inorganic bases: sodium hydroxide, magnesium hydroxide, sodium carbonate, calcium carbonate, sodium hydrogen carbonate and the like;

organic bases: triethylamine, diethylamine, pyridine, 4-dimethylaminopyridine, N,N-dimethylaniline, 1,4-diazabicyclo[2.2.2]octane, 1,8-diazabicyclo[5.4.0]-7-undecene, imidazole, piperidine and the like;

metal alkoxides: sodium ethoxide, potassium tert-butoxide and the like;

alkali metal hydrides: sodium hydride and the like;

metal amides: sodium amide, lithium diisopropyl amide, lithium hexamethyl disilazide and the like; and organic lithiums: n-butyllithium and the like.

When an acid or acidic catalyst is used in the reaction of each step, for example, acids and acidic catalysts shown below or those described in Examples are used:

inorganic acids: hydrochloric acid, sulfuric acid, nitric acid, hydrobromic acid, phosphoric acid and the like;

organic acids: acetic acid, trifluoroacetic acid, citric acid, p-toluenesulfonic acid, 10-camphorsulfonic acid and the like; and Lewis acids: boron trifluoride diethyl ether complex, zinc iodide, anhydrous aluminum chloride, anhydrous zinc chloride, anhydrous iron chloride and the like.

Unless otherwise specified, the reaction of each step is performed according to a method known per se. For example, the methods described in Jikken Kagaku Kouza 5th edition, vol. 13-vol. 19 (The Chemical Society of Japan ed.); Shinjikken Kagaku Kouza (Courses in Experimental Chemistry), vol. 14-vol. 15 (The Chemical Society of Japan ed.); Fine Organic Chemistry rev. 2nd edition (L. F. Tietze, Th. Eicher, NANKODO); rev. Organic Name Reactions, Their Mechanism and Essence (Hideo Togo, Kodansha); ORGANIC SYNTHESES Collective Volume I-VII (John Wiley & Sons Inc); Modern Organic Synthesis in the Laboratory, A Collection of Standard Experimental Procedures (Jie Jack Li, OXFORD UNIVERSITY); Comprehensive Heterocyclic Chemistry III, Vol. 1-Vol. 14 (Elsevier Japan KK); Strategic Applications of Named Reactions in Organic Synthesis (translation supervisor Kiyoshi Tomioka, KAGAKUDOJIN); Comprehensive Organic Transformations (VCH Publishers Inc.), 1989 and the like, or the methods described in the Examples.

In each step, protection or deprotection of a functional group is performed by the method known per se, for example, the methods described in "Protective Groups in Organic Synthesis, 4th Ed." (Theodora W. Greene, Peter G. M. Wuts) Wiley-Interscience, 2007; "Protecting Groups 3rd Ed." (P. J. Kocienski) Thieme, 2004 and the like, or the methods described in the Examples.

Examples of the protecting group of the hydroxyl group of alcohol and the like and a phenolic hydroxyl group include ether protecting groups such as methoxymethyl ether, benzyl ether, tert-butyldimethylsilyl ether, tetrahydropyranyl ether and the like; carboxylate protecting groups such as acetate and the like; sulfonate ester protecting groups such as methanesulfonate ester and the like; carbonate ester protecting groups such as tert-butylcarbonate and the like, and the like.

Examples of the protecting group of the carbonyl group of aldehyde include acetal protecting groups such as dimethyl acetal and the like; cyclic acetal protecting groups such as 1,3-dioxane and the like, and the like.

Examples of the protecting group of the carbonyl group of ketone include ketal protecting groups such as dimethyl ketal and the like; cyclic ketal protecting groups such as 1,3-dioxane and the like; oxime protecting groups such as O-methyloxime and the like; hydrazone protecting groups such as N,N-dimethylhydrazone and the like.

Examples of the carboxyl protecting group include ester protecting groups such as methyl ester and the like; amide protecting groups such as N,N-dimethylamide and the like.

Examples of the thiol protecting group include ether protecting groups such as benzyl thioether and the like; ester protecting groups such as thioacetate ester, thiocarbonate, thiocarbamate and the like.

Examples of the protecting group of an amino group and an aromatic hetero ring such as imidazole, pyrrole, indole and the like include carbamate protecting groups such as benzyl carbamate and the like; amide protecting groups such as acetamide and the like; alkylamine protecting groups such as N-triphenylmethylamine and the like, sulfonamide protecting groups such as methanesulfonamide and the like.

The protecting group may be removed by a method known per se, for example, a method using acid, base, ultraviolet light, hydrazine, phenylhydrazine, sodium N-methyldithiocarbamate, tetrabutylammonium fluoride, palladium acetate, trialkylsilyl halide (e.g., trimethylsilyl iodide, trimethylsilyl bromide), a reduction method and the like.

When a reduction reaction is performed in each step, examples of the reducing agent to be used include metal hydrides such as lithium aluminum hydride, sodium triacetoxyborohydride, sodium cyanoborohydride, diisobutylaluminum hydride (DIBAL-H), sodium borohydride, tetramethylammonium triacetoxyborohydride and the like; boranes such as borane tetrahydrofuran complex and the like; Raney nickel; Raney cobalt; hydrogen; formic acid; triethylsilane and the like. When a carbon-carbon double bond or triple bond is reduced, a method using a catalyst such as palladium-carbon, Lindlar catalyst and the like.

When an oxidation reaction is performed in each step, examples of an oxidant to be used include peracids such as m-chloroperbenzoic acid (mCPBA), hydrogen peroxide, tert-butyl hydroperoxide and the like; perchlorates such as tetrabutylammonium perchlorate and the like; chlorates such as sodium chlorate and the like; chlorites such as sodium chlorite and the like; periodic acids such as sodium periodate and the like; high valent iodine reagents such as iodosylbenzene and the like; reagents containing manganese such as manganese dioxide, potassium permanganate and the like; leads such as lead tetraacetate and the like; reagents containing chrome such as pyridinium chlorochromate (PCC), pyridinium dichromate (PDC), Jones reagent and the like; halogen compounds such as N-bromosuccinimide (NBS) and the like; oxygen; ozone; sulfur trioxide pyridine complex; osmium tetraoxide; selenium dioxide; 2,3-dichloro-5,6-dicyano-1,4-benzoquinone (DDQ) and the like.

When a radical cyclization reaction is performed in each step, examples of the radical initiator to be used include azo compounds such as azobisisobutyronitrile (AIBN) and the like; water-soluble radical initiators such as 4-4'-azobis-4-cyanopentanoic acid (ACPA) and the like; triethylboron in the presence of air or oxygen; benzoyl peroxide and the like. In addition, examples of the radical reaction agent to be used include tributylstannane, tristrimethylsilylsilane, 1,1,2,2-tetraphenyldisilane, diphenylsilane, samarium iodide and the like.

When the Wittig reaction is performed in each step, examples of the Wittig reagent to be used include alkylidenephosphoranes and the like. Alkylidenephosphoranes may be prepared by a method known per se, for example, by reacting a phosphonium salt with a strong base.

When the Horner-Emmons reaction is performed in each step, examples of the reagent to be used include phosphonoacetic acid esters such as methyl dimethylphosphonoacetate, ethyl diethylphosphonoacetate and the like; and bases such as alkali metal hydrides, organic lithiums and the like.

When the Friedel-Crafts reaction is performed in each step, examples of the reagent to be used include Lewis acid and acid chloride or Lewis acid and alkylating agents (e.g., alkyl halides, alcohol, olefins and the like). Alternatively, an organic acid and an inorganic acid may also be used instead of the Lewis acid, and acid anhydride such as acetic anhydride and the like may also be used instead of acid chloride.

When an aromatic nucleophilic substitution reaction is performed in each step, a nucleophilic agent (e.g., amines, imidazole and the like) and a base (e.g., organic bases and the like) are used as the reagent.

When a nucleophilic addition reaction with carbanion, a nucleophilic 1,4-addition reaction with carbanion (Michael addition reaction) or a nucleophilic substitution reaction with carbanion is performed in each step, examples of the base to be used for developing carbanion include organic lithiums, metal alkoxides, inorganic bases, organic bases and the like.

When the Grignard reaction is performed in each step, examples of the Grignard reagent include aryl magnesium halides such as phenyl magnesium bromide and the like; and alkyl magnesium halides such as methyl magnesium bromide and the like. The Grignard reagent may be prepared by a method known per se, for example, by reacting alkyl halide or aryl halide with metal magnesium in ether or tetrahydrofuran as a solvent.

When the Knoevenagel condensation reaction is performed in each step, an active methylene compound (e.g., malonic acid, diethyl malonate, malononitrile and the like) and a base (e.g., organic bases, metal alkoxides, inorganic bases) held between two electron-withdrawing groups are used as the reagents.

When the Vilsmeier-Haack reaction is performed in each step, phosphoryl chloride and an amide derivative (e.g., N,N-dimethylformamide and the like) are used as the reagents.

When an azidation reaction of alcohols, alkylhalides or sulfonate esters is performed in each step, examples of the azidation agent to be used include diphenylphosphoryl azide (DPPA), trimethylsilylazide, sodium azide and the like. For example, when alcohols are azidated, a method using diphenylphosphoryl azide and 1,8-diazabicyclo[5,4,0]undec-7-ene (DBU), a method using trimethylsilylazide and the Lewis acid and the like may be employed.

When a reductive amination reaction is performed in each step, examples of the reducing agent to be used include sodium triacetoxyborohydride, sodium cyanoborohydride, hydrogen, formic acid and the like. When the substrate is an amine compound, examples of the carbonyl compound to be used besides para-formaldehyde include aldehydes such as acetaldehyde and the like, ketones such as cyclohexanone and the like. When the substrate is a carbonyl compound, examples of the amines to be used include primary amines such as ammonia, methylamine and the like; secondary amines such as dimethylamine and the like, and the like.

When the Mitsunobu reaction is performed in each step, azodicarboxylate esters (e.g., diethyl azodicarboxylate (DEAD), diisopropyl azodicarboxylate (DIAD) and the like) and triphenylphosphine are used as the reagents.

When an esterification reaction, amidation reaction or ureation reaction is performed in each step, examples of the reagent to be used include halogenated acyl forms such as acid chloride, acid bromide and the like; and activated carboxylic acids such as acid anhydride, active ester form, sulfuric acid ester form and the like. Examples of the carboxylic acid activator include carbodiimide condensing agents such as 1-ethyl-3-(3-dimethylaminopropyl)carbodiimide hydrochloride (WSCD) and the like; triazine condensing agents such as 4-(4,6-dimethoxy-1,3,5-triazin-2-yl)-4-methylmorpholinium chloride-n-hydrate (DMT-MM) and the like; carbonate ester condensing agents such as 1,1-carbonyldiimidazole (CDI) and the like; diphenylphosphoryl azide (DPPA); benzotriazol-1-yloxy-trisdimethylamino-phosphonium salt (BOP reagent); 2-chloro-1-methyl-pyridinium iodide (Mukaiyama reagent); thionyl chloride; lower alkyl haloformates such as ethyl chloroformate and the like; O-(7-azabenzotriazol-1-yl)-N,N,N',N'-tetramethyl-uronium hexafluorophosphate (HATU); sulfuric acid; a combination thereof and the like. When a carbodiimide condensing agent is used, additives such as 1-hydroxybenzotriazole (HOBt), N-hydroxysuccinimide (HOSu), dimethylaminopyridine (DMAP) and the like may be further added to the reaction.

When a coupling reaction is performed in each step, examples of the metal catalyst to be used include palladium compounds such as palladium(II) acetate, tetrakis(triphenylphosphine)palladium(0), dichlorobis(triphenylphosphine)palladium(II), dichlorobis(triethylphosphine)palladium(II), tris(dibenzylideneacetone)dipalladium(0), 1,1'-bis(diphenylphosphino)ferrocene palladium(II) chloride and the like; nickel compounds such as tetrakis(triphenylphosphine)nickel(0) and the like; rhodium compounds such as tris(triphenylphosphine)rhodium(III) chloride and the like; a cobalt compound; copper compounds such as copper oxide, copper(I) iodide and the like; a platinum compound and the like. A base may be further added to the reaction and examples of such base include inorganic bases and the like.

When a thiocarbonylation reaction is performed in each step, diphosphorus pentasulfide is representatively used as a thiocarbonylating agent. Besides diphosphorus pentasulfide, a reagent having a 1,3,2,4-dithiadiphosphetane-2,4-disulfide structure such as 2,4-bis(4-methoxyphenyl)-1,3,2,4-dithiadiphosphetane-2,4-disulfide (Lawesson reagent) and the like may also be used.

When the Wohl-Ziegler reaction is performed in each step, examples of the halogenating agent to be used include N-iodosuccinimide, N-bromosuccinimide (NBS), N-chlorosuccinimide (NCS), bromine, sulfuryl chloride and the like. Furthermore, the reaction may be accelerated by adding heat, light, radical initiators such as benzoyl peroxide, azobisisobutyronitrile and the like to the reaction.

When a halogenating reaction of a hydroxy group is performed in each step, examples of the halogenating agent to be used include acid halide of hydrohalic acid and inorganic acid; specifically, hydrochloric acid, thionyl chloride, phosphorus oxychloride and the like for chlorination, and 48% hydrobromic acid and the like for bromination. In addition, a method of obtaining a halogenated alkyl form from alcohol by reacting with triphenylphosphine and carbon tetrachloride or carbon tetrabromide, and the like may be used. Alternatively, a method of synthesizing a halogenated alkyl form via a two-step reaction including conversion of alcohol to sulfonic acid ester, and reacting same with lithium bromide, lithium chloride or sodium iodide may also be used.

When the Arbuzov reaction is performed in each step, examples of the reagent to be used include alkyl halides such as ethyl bromoacetate and the like; and phosphites such as triethyl phosphite, tri(isopropyl)phosphite and the like.

When a sulfonate esterification reaction is performed in each step, examples of the sulfonating agent to be used include methanesulfonyl chloride, p-toluenesulfonyl chloride, methanesulfonic anhydride, p-toluenesulfonic anhydride and the like.

When hydrolysis is performed in each step, an acid or a base is used as the reagent. In addition, when acid hydrolysis of tert-butyl ester is performed, formic acid, triethylsilane and the like are sometimes added to reductively trap the by-produced tert-butyl cation.

When a dehydrating reaction is performed in each step, examples of the dehydrating agent to be used include sulfuric acid, phosphorus pentaoxide, phosphorus oxychloride, N,N'-dicyclohexylcarbodiimide, alumina, polyphosphoric acid and the like.

The synthesis of exemplary compounds of the invention are shown below. The examples do not limit the present invention and the present invention can be modified within the scope of the present invention.

The "room temperature" in the following Examples is generally about 10° C. to about 35° C. The ratio for a mixed solvent is, unless otherwise specified, a volume mixing ratio and % means wt % unless otherwise specified.

In silica gel column chromatography, the indication of NH means use of aminopropylsilane-bonded silica gel. In HPLC (high performance liquid chromatography), the indication of C18 means use of octadecyl-bonded silica gel. Unless otherwise specified, the ratio of elution solvents is a volume mixing ratio.

In the following Examples, the following abbreviations are used.
mp: melting point
MS: mass spectrum
$[M+H]^+$, $[M-H]^-$: molecular ion peak
M: molar concentration
N: normality
$CDCl_3$: deuterated chloroform
DMSO-$d_6$: deuterated dimethyl sulfoxide
$^1$H NMR: proton nuclear magnetic resonance
LC/MS: liquid chromatography mass spectrometer
ESI: ElectroSpray Ionization
APCI: Atmospheric Pressure Chemical Ionization
THF: tetrahydrofuran
DMF: N,N-dimethylformamide
DMSO: dimethyl sulfoxide
TFA: trifluoroacetic acid
SFC: supercritical fluid chromatography
TEA: triethylamine
AA: acetic acid
DMAP: 4-dimethylaminopyridine
HATU: O-(7-azabenzotriazol-1-yl)-N,N,N',N'-tetramethyluronium hexafluorophosphate
Pd(PPh$_3$)$_4$: tetrakis(triphenylphosphine)palladium(0)
Cy$_2$NMe: N,N-Dicyclohexylmethylamine
Meerwein reagent (Meerwein's reagent): Trimethyloxonium tetrafluoroborate (Me$_3$OBF$_4$) or Triethyloxonium tetrafluoroborate (Et$_3$OBF$_4$)
Pd/C: Palladium on carbon
DCM: Dichloromethane
PTSA, p-TsOH: p-toluenesulfonic acid
CAN: Acetonitrile
DIPEA: N,N-diisopropylethylamine
EA: Ethyl acetate
PE: Petroleum ether
HBTU (3-[Bis(dimethylamino)methyliumyl]-3H-benzotriazol-1-oxide hexafluorophosphate)
DIAD: diisopropyl azodicarboxylate
DppONH$_2$: O-(diphenylphosphynyl)hydroxylamine
PMB: p-methoxybenzyl group
Boc: tert-butoxycarbonyl group $^1$H NMR was measured by Fourier-transform NMR. For the analyses, ACD/SpecManager (trade name) and the like were used. A peak showing very mild proton of hydroxyl group, amino group or the like is not described.

MS was measured by LC/MS. As the ionization method, ESI method or APCI method was used. The data indicates measured values (found). Generally, a molecular ion peak is observed. However, when a compound has a tert-butoxycarbonyl group, a peak free of a tert-butoxycarbonyl group or tert-butyl group may be observed as a fragment ion. When a compound has a hydroxyl group, a peak free of H$_2$O may be observed as a fragment ion. In the case of a salt, a molecular ion peak or a fragment ion peak of a free form is generally observed.

The unit of the sample concentration (c) in optical rotation ($[\alpha]_D$) is g/100 mL.

As the elemental analytical values (Anal.), Calculated (Calcd) and measured values (Found) are described.

Example 1 Synthesis

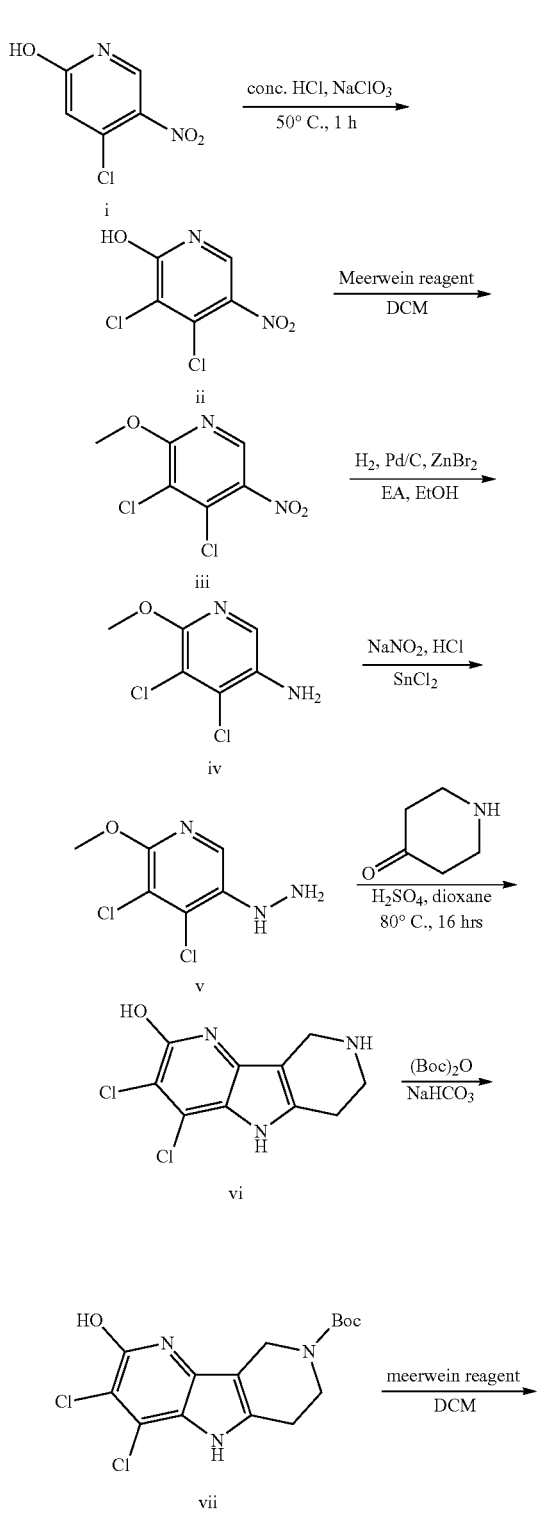

Example 1: 1-(3,4-Dichloro-2-methoxy-5,6,7,9-tetrahydro-8H-pyrrolo[3,2-b:4,5-c']dipyridin-8-yl)-2-hydroxyethan-1-one

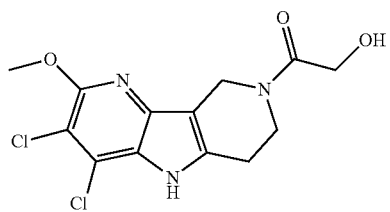 [SMILES: COc1nc2c3c([nH]c2c(Cl)c1Cl)CCN(C(=O)CO)C3]

A solution of 4-chloro-5-nitropyridin-2-ol (i) (3 g, 17.19 mmol, 1 eq) in hydrochloric acid (12 M, 12 mL, 8.38 eq) was stirred at 25° C. for 10 minutes. Then the mixture was heated to 50° C. and a solution of sodium chlorate (914.75 mg, 8.59 mmol, 0.5 eq) in water (4 mL) was added dropwise. The mixture was stirred at 50° C. for 50 minutes. Some solid was precipitated out. The suspension mixture was filtered and the cake was collected to give 3,4-dichloro-5-nitropyridin-2-ol (ii) (3 g, 14.35 mmol, 83.52% yield) as a yellow solid. $^1$H NMR (DMSO-d6, 400 MHz): δ 8.74 (s, 1H).

A solution of 3,4-dichloro-5-nitropyridin-2-ol (ii) (2.2 g, 10.53 mmol, 1 eq) in dichloromethane (50 mL) was treated with trimethyloxonium tetrafluoroborate (6.23 g, 42.11 mmol, 4 eq) at 0° C. The mixture was stirred at 25° C. for 16 hours. The reaction mixture was concentrated under reduced pressure to give a residue. The residue was purified by silica gel chromatography (Petroleum ether:Ethyl acetate=1:0 to 50:1) to give 3,4-dichloro-2-methoxy-5-nitropyridine (iii) (2.15 g, 9.64 mmol, 91.58% yield) as a white solid. $^1$H NMR (DMSO-d6, 400 MHz): δ 8.75 (s, 1H), 4.15 (s, 3H).

A solution of 3,4-dichloro-2-methoxy-5-nitropyridine (iii) (2.15 g, 9.64 mmol, 1 eq) in ethyl acetate (5 mL) and ethanol (5 mL) was treated with zinc bromide (1.09 g, 4.82 mmol, 241.23 uL, 0.5 eq) and Pd/C (400 mg, 10% purity, 1.0 eq) under nitrogen. The mixture was stirred under hydrogen (15 Psi) at 25° C. for 2 hours. The mixture was filtered and concentrated under reduced pressure to give a residue. The residue was purified by reverse phase flash chromatography (basic conditions) to give 4,5-dichloro-6-methoxypyridin-3-amine (iv) (1.4 g, 7.25 mmol, 75.23% yield) as a yellow solid. $^1$H NMR (CDCl$_3$, 400 MHz): δ7.65 (s, 1H), 3.96 (s, 3H), 3.77 (br.s, 2H).

A solution of 4,5-dichloro-6-methoxypyridin-3-amine (iv) (1.35 g, 6.99 mmol, 1 eq) in hydrochloric acid (12 M, 20 mL, 34.32 eq) was treated with a solution of sodium nitrite (579.04 mg, 8.39 mmol, 1.2 eq) in water (2 mL) at 0° C. The mixture was stirred at 0° C. for 1 hour. A solution of stannous chloride (3.16 g, 13.99 mmol, 2 eq) in water (4 mL) was added at 0° C. The mixture was stirred at 25° C. for 16 hours. The reaction mixture was diluted with sat'd sodium bicarbonate solution (200 mL) and extracted with ethyl acetate (100 mL*2). The combined organic layers were dried over sodium sulfate, filtered and concentrated under reduced pressure to give a residue. The residue was purified by silica gel chromatography (Petroleum ether:Ethyl acetate=50:1 to 0:1) to give 3,4-dichloro-5-hydrazineyl-2-methoxypyridine (v) (1 g, 4.81 mmol, 68.73% yield) as a white solid. $^1$H NMR (CDCl$_3$, 400 MHz): δ 7.96 (s, 1H), 5.38 (br.s, 1H), 3.99 (s, 3H), 3.67 (br.s, 2H).

A solution of 3,4-dichloro-5-hydrazineyl-2-methoxypyridine (v) (1 g, 4.81 mmol, 1 eq) in dioxane (10 mL) was treated with piperidin-4-one (782.09 mg, 5.77 mmol, 1.2 eq, HCl) and sulfuric acid (1.27 g, 12.93 mmol, 689.22 uL, 2.69 eq) at 0° C. The mixture was stirred at 80° C. for 16 hours. The mixture was poured onto ice and water (20 mL) and adjusted to pH=8 by a sat'd sodium bicarbonate solution. The result intermediate solution of 3,4-dichloro-6,7,8,9-tetrahydro-5H-pyrrolo[3,2-b:4,5-c']dipyridin-2-ol (vi) was treated with Boc$_2$O (1.47 g, 6.73 mmol, 1.55 mL, 1.4 eq) and tetrahydrofuran (50 mL), the mixture was stirred at 25° C. for 1 hour. The mixture was adjusted to pH=7 by hydrochloric acid (1M) and extracted with ethyl acetate (20 mL*2). The combined organic layers were dried over sodium sulfate, filtered and concentrated under reduced pressure to give a residue. The residue was purified by silica gel chromatography (petroleum ether:ethyl acetate=50:1 to 3:1) to give tert-butyl 3,4-dichloro-2-hydroxy-5,6,7,9-tetrahydro-8H-pyrrolo[3,2-b:4,5-c']dipyridine-8-carboxylate (vii) (1.5 g, 4.19 mmol, 87.21% yield) as a yellow solid. $^1$H NMR (DMSO-d6, 400 MHz): δ 12.31 (br.s, 1H), 11.62 (br.s, 1H), 4.40 (s, 2H), 3.63 (t, J=5.6 Hz, 2H), 2.72 (t, J=5.2 Hz, 2H), 1.42 (s, 9H).

A solution of tert-butyl 3,4-dichloro-2-hydroxy-5,6,7,9-tetrahydro-8H-pyrrolo[3,2-b:4,5-c']dipyridine-8-carboxylate (vii) (500 mg, 1.4 mmol, 1 eq) in dichloromethane (50 mL) was treated with trimethyloxonium tetrafluoroborate (825.79 mg, 5.58 mmol, 4 eq). The mixture was stirred at 25° C. for 16 hours. The intermediate 3,4-dichloro-2-methoxy-6,7,8,9-tetrahydro-5H-pyrrolo[3,2-b:4,5-c']dipyridine (viii) solution was treated with triethylamine (4.23 g, 41.78 mmol, 5.82 mL, 30 eq) and (2-chloro-2-oxo-ethyl) acetate (285.23 mg, 2.09 mmol, 224.59 uL, 1.5 eq) at 0° C. The reaction mixture was stirred at 25° C. for 16 hours. The mixture was diluted with water (40 mL) and extracted with dichloromethane (25 mL*2). The combined organic layers were dried over sodium sulfate, filtered and concentrated under reduced pressure to give a residue. The residue was purified by reverse phase flash chromatography (basic conditions) to give 2-(3,4-dichloro-2-methoxy-5,6,7,9-tetrahydro-8H-pyrrolo[3,2-b:4,5-c']dipyridin-8-yl)-2-oxoethyl acetate (ix) (200 mg, 537.34 umol, 38.58% yield) as a white solid. $^1$H NMR (CD$_3$OD, 400 MHz): δ 4.95 (d, J=5.2 Hz, 2H), 4.76 (s, 1H), 4.70 (s, 1H), 4.02-3.97 (m, 4H), 3.83 (t, J=5.6 Hz, 1H), 2.99 (t, J=5.6 Hz, 1H), 2.90 (t, J=6.4 Hz, 1H), 2.14 (d, J=5.6 Hz, 3H); MS: m/z 371.9 [M+H]$^+$.

A solution of 2-(3,4-dichloro-2-methoxy-5,6,7,9-tetrahydro-8H-pyrrolo[3,2-b:4,5-c']dipyridin-8-yl)-2-oxoethyl acetate (ix) (80 mg, 214.94 umol, 1 eq) in tetrahydrofuran (2 mL) was treated with lithium hydroxide monohydrate (27.06 mg, 644.81 umol, 3 eq) and water (0.5 mL). The mixture was stirred at 25° C. for 0.5 hour. The mixture was adjusted to pH=7 by trifluoroacetic acid solution (1M). The mixture was concentrated under reduced pressure to give a residue. The residue was purified by prep-HPLC (column: Gemini 150*25 5u; mobile phase: [water (0.05% ammonia hydroxide v/v)-ACN]; B %: 22%-52%, 12 min) to give 1-(3,4-dichloro-2-methoxy-5,6,7,9-tetrahydro-8H-pyrrolo[3,2-b:4,5-c']dipyridin-8-yl)-2-hydroxyethan-1-one (1) (41.3 mg, 119.49 umol, 55.59% yield, 95.527% purity) as an off-white solid. $^1$H NMR (DMSO-d6, 400 MHz): δ 11.68-11.65 (m, 1H), 4.70-4.63 (m, 2H), 4.54 (s, 1H), 4.22-4.18 (m, 2H), 3.95 (s, 3H), 3.85 (t, J=6.0 Hz, 1H), 3.69 (t, J=6.0 Hz, 1H), 2.89 (t, J=5.2 Hz, 1H), 2.80 (m, 1H); MS: m/z 330.1.

Examples 7-24 can be produced by employing a similar synthetic process and method as described in this Example 1 synthesis.

Example 2 Synthesis

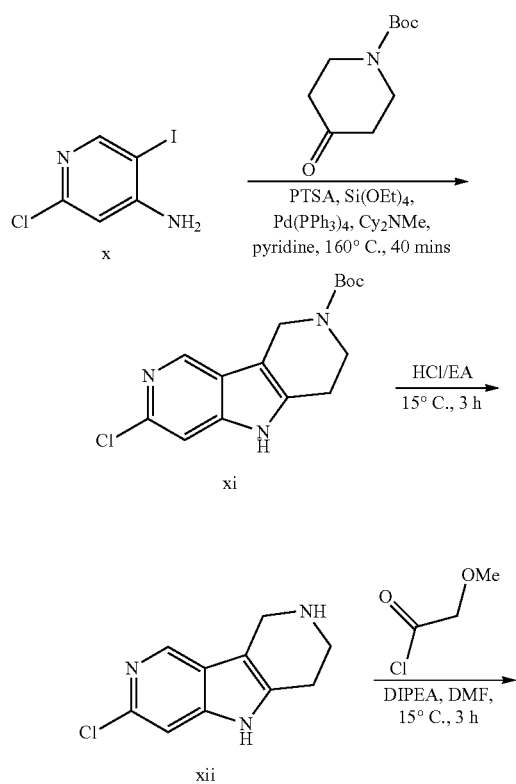

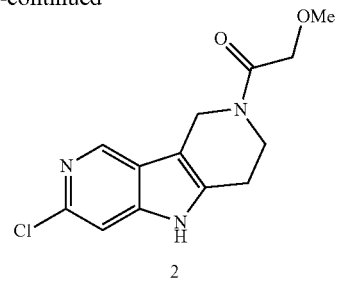

2

Example 2: 1-(7-Chloro-1,3,4,5-tetrahydro-2H-pyrrolo[3,2-c:4,5-c']dipyridin-2-yl)-2-methoxyethan-1-one

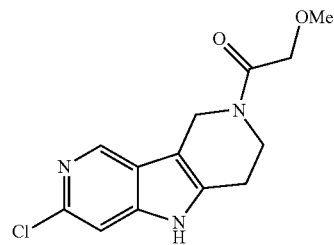 [SMILES: COCC(=O)N1CCc2[nH]c3cc(Cl)ncc3c2C1]

A mixture of 2-chloro-5-iodopyridin-4-amine (x) (200 mg, 785.99 μmol), tert-butyl 4-oxopiperidine-1-carboxylate (313.21 mg, 1.57 mmol), PTSA (27.07 mg, 157.20 μmol), Si(OEt)$_4$ (180.12 mg, 864.59 μmol), Pd(PPh$_3$)$_4$ (22.71 mg, 19.65 μmol) and Cy$_2$NMe (199.60 mg, 1.02 mmol) in pyridine (2 mL) was bubbled with N$_2$, and heated to 160° C. for 40 min under microwave. The mixture was concentrated. The residue was purified by prep-HPLC (TFA condition) to afford tert-butyl 7-chloro-1,3,4,5-tetrahydro-2H-pyrrolo[3,2-c:4,5-c']dipyridine-2-carboxylate (xi) (40 mg, 2.4% yield, 87% purity) as a yellow solid.

A mixture of tert-butyl 7-chloro-1,3,4,5-tetrahydro-2H-pyrrolo[3,2-c:4,5-c']dipyridine-2-carboxylate (xi) (40 mg, 129.97 umol) in HCl/EA (10 mL) was stirred at 15° C. for 3 h. The mixture was evaporated to give 7-chloro-2,3,4,5-tetrahydro-1H-pyrrolo[3,2-c:4,5-c']dipyridine (xii) (40 mg, crude, HCl) as a yellow solid. The material was treated with DIPEA (24.90 mg, 192.62 μmol) in DMF (2 mL) 2-methoxyacetyl chloride (20.90 mg, 192.62 μmol) was added at 15° C. The mixture was stirred at 15° C. for 3 h. The mixture was poured into water (10 mL) and extracted with EA (20 mL*3). The organic layer was dried over Na$_2$SO$_4$, filtered and concentrated. The residue was purified by preparative Thin-layer Chromatography (TLC) (EA:PE=1:1, Rf=0.5) to afford 1-(7-chloro-1,3,4,5-tetrahydro-2H-pyrrolo[3,2-c:4,5-c']dipyridin-2-yl)-2-methoxyethan-1-one (2) (12.6 mg, 23% yield, 98.9% purity) as a yellow solid. $^1$H NMR (CD$_3$OD, 400 MHz): δ 8.48-8.45 (m, 1H), 7.34 (s, 1H), 4.80 (s, 1H), 4.73 (s, 1H), 4.29 (s, 2H), 4.00 (t, J=5.8 Hz, 1H), 3.86 (t, J=5.7 Hz, 1H), 3.42 (d, J=3.5 Hz, 3H), 2.95-2.86 (m, 2H).

Examples 25-63 can be produced by employing a similar synthetic process and method as described in this Example 2 synthesis.

Example 3 Synthesis

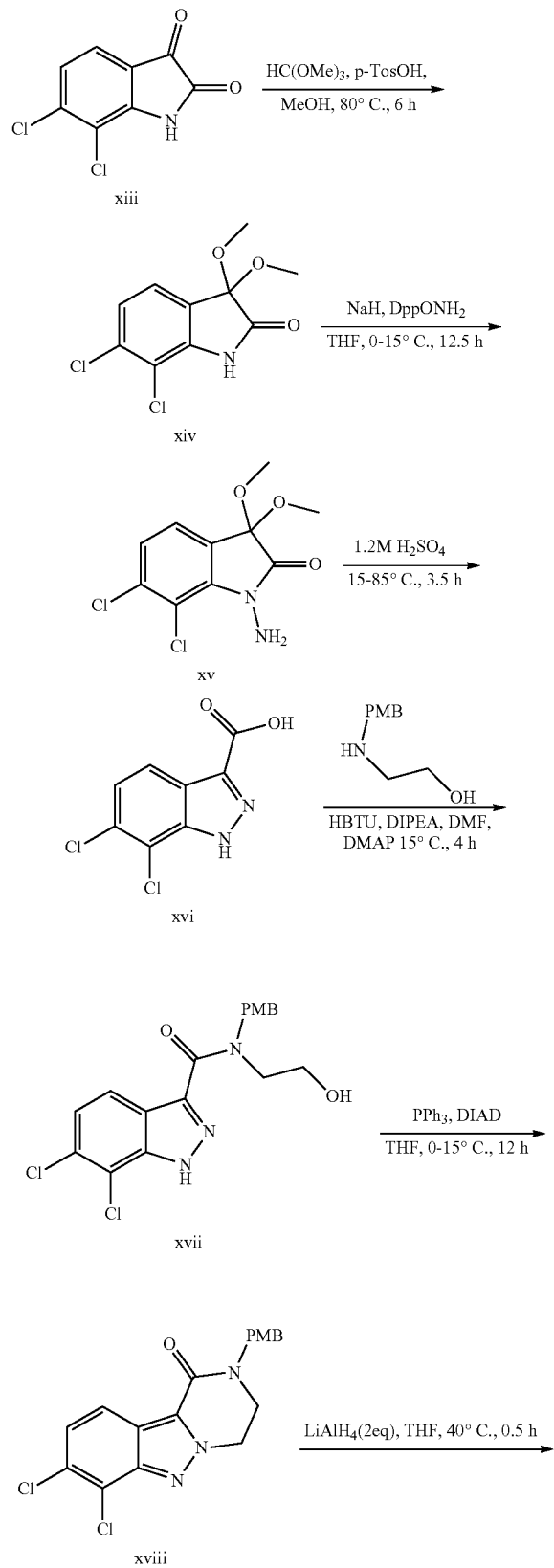

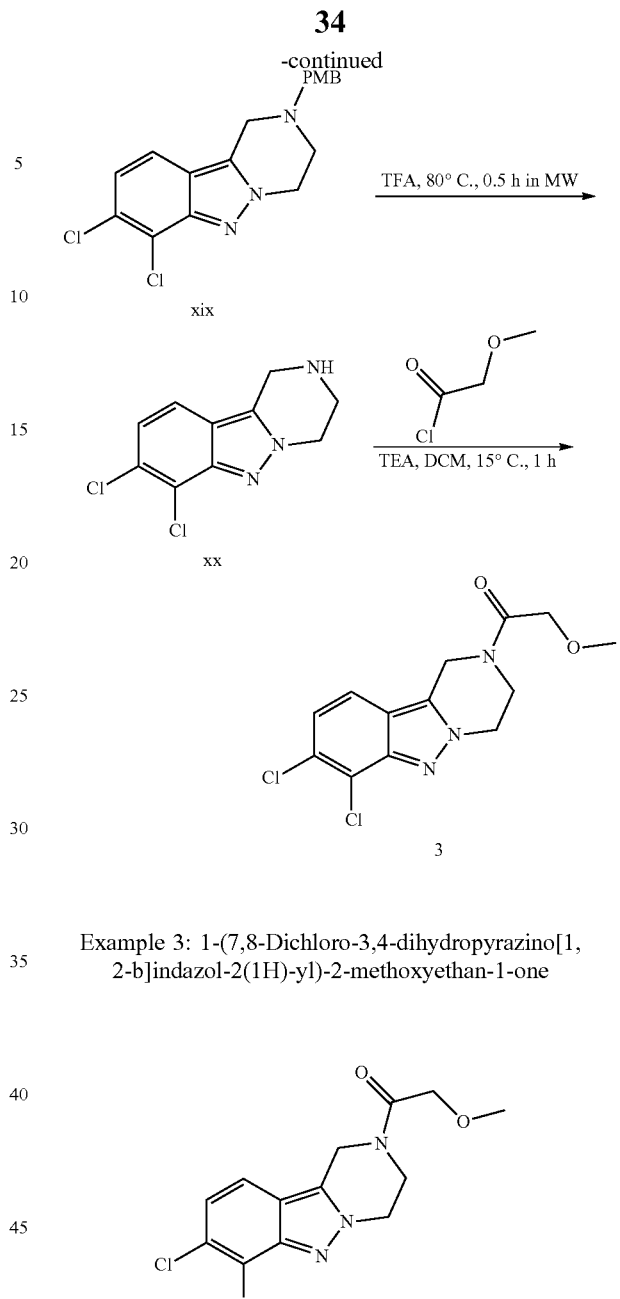

Example 3: 1-(7,8-Dichloro-3,4-dihydropyrazino[1,2-b]indazol-2(1H)-yl)-2-methoxyethan-1-one 6,7-Dichloroindoline-2,3-dione (xiii) (2 g, 9.26 mmol, 1 eq) was stirred as a suspension in anhydrous MeOH (20 mL). Trimethylorthoformate (1.18 g, 11.11 mmol, 1.22 ml, 1.2 eq) and p-toluenesulfonic acid monohydrate (88.05 mg, 462.92 umol, 0.05 eq) were added and the mixture was stirred at 80° C. for 6 h. The mixture was concentrated under reduced pressure. The residue was purified by flash column (PE/EA=10/1) to give 6,7-dichloro-3,3-dimethoxyindolin-2-one (xiv) (2 g, 6.49 mmol, 70.06% yield, 85% purity) as yellow solid. $^1$H NMR (DMSO-d6, 400 MHz): δ 11.23 (s, 1H), 7.41 (d, J=7.95 Hz, 1H), 7.30 (d, J=7.95 Hz, 1H), 3.41 (s, 6H).

6,7-Dichloro-3,3-dimethoxyindolin-2-one (xiv) (2.15 g, 8.20 mmol, 1 eq) was dissolved in THF (100 mL) and the solution was cooled to 0° C. NaH (492.15 mg, 12.30 mmol, 60% purity, 1.5 eq) was added, resulting in a rapid production of hydrogen gas. After 30 min, O-diphenyl-phosphorylhydroxylamine (2.30 g, 9.84 mmol, 1.2 eq) was added and the reaction was warmed to 15° C. and stirred at 15° C. for 12 h. The crude reaction mixture was filtered through a plug of celite (washed with EA until the filtrate was colorless) and evaporated to yield brown oil (2.02 g). The crude product was purified by flash chromatography using deactivated alumina and (PE/EA=20/1-3/1) as eluent to give 1-amino-6,7-dichloro-3,3-dimethoxyindolin-2-one (xv) (1.8 g, 6.50 mmol, 79.18% yield) as yellow solid.

To a suspension of 1-amino-6,7-dichloro-3,3-dimethoxyindolin-2-one (xv) (1.8 g, 6.50 mmol, 1 eq) in $H_2O$ (40 mL) was added $H_2SO_4$ (22.53 g, 225.13 mmol, 12.24 mL, 98% purity, 34.66 eq) drop-wise for 30 min. After stirring the resulting orange solution for 30 min at 15° C., the mixture was heated to 85° C. and stirred at that temperature for an additional 3 h. The reaction was then allowed to cool to 15° C. and then cooled to 0° C. in an ice/water bath. The resulting precipitate was collected by vacuum filtration and the filter cake was washed with $H_2O$ to give 6,7-dichloro-1H-indazole-3-carboxylic acid (xvi) (1.4 g, crude) as yellow-orange solid.

To a solution of 6,7-dichloro-1H-indazole-3-carboxylic acid (xvi) (700 mg, 3.03 mmol, 1 eq) in DMF (10 mL) was added HBTU (1.15 g, 3.03 mmol, 1 eq), DMAP (74.03 mg, 605.97 μmol, 0.2 eq), DIPEA (2.35 g, 18.18 mmol, 3.17 mL, 6 eq) and 4 A molecular sieves (5 g). The reaction mixture was maintained at 15° C. for 2 h under nitrogen and then 2-((4-methoxybenzyl)-amino)ethan-1-ol (549.10 mg, 3.03 mmol, 1 eq) was added. After 2 h, the solvent was removed under reduced pressure. The mixture was poured into water (100 mL) and extracted with ethyl acetate (50 mL*2). The combined organic phase was washed with brine (50 mL*2), dried with anhydrous $Na_2SO_4$, filtered and concentrated in vacuum. The residue was purified by silica gel chromatography (petroleum ether/ethyl acetate=5/1, 1/1) to give 6,7-dichloro-N-(2-hydroxyethyl)-N-(4-methoxybenzyl)-1H-indazole-3-carboxamide (xvii) (600 mg, crude) as yellow solid.

To a mixture of 6,7-dichloro-N-(2-hydroxyethyl)-N-(4-methoxybenzyl)-1H-indazole-3-carboxamide (xvii) (550 mg, 1.40 mmol, 1 eq) and $PPh_3$ (548.85 mg, 2.09 mmol, 1.5 eq) in THF (10 mL) was added DIAD (423.14 mg, 2.09 mmol, 406.86 uL, 1.5 eq) in one portion at 0° C. under $N_2$. The mixture was stirred at 15° C. for 12 h. The mixture was concentrated under reduced pressure. The residue was purified by flash column (PE/EA=10/1-2/1) to give 7,8-dichloro-2-(4-methoxybenzyl)-3,4-dihydropyrazino[1,2-b]indazol-1(2H)-one (xviii) (350 mg, crude) as yellow solid. $^1$H NMR (DMSO-d6, 400 MHz): δ 7.98 (d, J=8.77 Hz, 1H), 7.42 (d, J=8.77 Hz, 1H), 7.31 (br d, J=8.33 Hz, 2H), 6.91 (br d, J=8.33 Hz, H), 4.71 (br t, J=6.14 Hz, 2H), 4.67 (s, 2H), 3.81 (br t, J=6.14 Hz, 2H), 3.72 (s, 3H).

A solution of 7,8-dichloro-2-(4-methoxybenzyl)-3,4-dihydropyrazino[1,2-b]indazol-1(2H)-one (xviii) (350 mg, 930.27 umol, 1 eq) in anhydrous THF (10 mL) was treated with $LiAlH_4$ (70.62 mg, 1.86 mmol, 2 eq). This mixture was stirred 0.5 h at 40° C. The mixture was poured into ice-water (30 mL) and extracted with ethyl acetate (10 mL*2). The combined organic phase was washed with brine (10 mL*2), dried with anhydrous $Na_2SO_4$, filtered and concentrated in vacuum. The residue was purified by silica gel chromatography (petroleum ether/ethyl acetate=20/1, 2/1) to give 7,8-dichloro-2-(4-methoxybenzyl)-1,2,3,4-tetrahydropyrazino[1,2-b]indazole (xix) (250 mg, 621.11 umol, 66.77% yield, 90% purity) as yellow solid. $^1$H NMR (DMSO-d6, 400 MHz): δ 7.66 (d, J=8.77 Hz, 1H), 7.30 (d, J=8.77 Hz, 2H), 7.10 (d, J=8.77 Hz, 1H), 6.92 (d, J=8.33 Hz, 2H), 4.42 (t, J=5.26 Hz, 2H), 3.99 (s, 2H), 3.75-3.71 (m, 5H), 3.02 (t, J=5.48 Hz, 2H).

To 7,8-dichloro-2-(4-methoxybenzyl)-1,2,3,4-tetrahydropyrazino[1,2-b]indazole (xix) (100 mg, 276.05 umol, 1 eq) was added TFA (2 mL) in one portion at 15° C. under $N_2$. The mixture was stirred at 80° C. for 0.5 hour under MW. The mixture was poured into ice-water (w/w=1/1) (50 mL) and added $NaHCO_3$ solid until pH=8. The mixture was extracted with ethyl acetate (25 mL*2). The combined organic phase was washed with brine (20 mL*2), dried with anhydrous $Na_2SO_4$, filtered and concentrated in vacuum to give 7,8-dichloro-1,2,3,4-tetrahydro-pyrazino[1,2-b]indazole (xx) (45 mg, crude) as yellow solid.

To a mixture of 7,8-dichloro-1,2,3,4-tetrahydropyrazino[1,2-b]indazole (xx) (40 mg, 165.22 umol, 1 eq) and $Et_3N$ (25.08 mg, 247.83 umol, 34.49 uL, 1.5 eq) in DCM (5 mL) was added 2-methoxyacetyl chloride (21.52 mg, 198.26 umol, 18.08 uL, 1.2 eq) in one portion at 15° C. under $N_2$. The mixture was stirred at 15° C. for 1 h. The mixture was poured into water (20 mL) and extracted with DCM (10 mL*2). The combined organic phase was washed with brine (10 mL*2), dried with anhydrous $Na_2SO_4$, filtered and concentrated in vacuum. The residue was purified by prep-HPLC(HCl) to give 1-(7,8-dichloro-3,4-dihydropyrazino[1,2-b]indazol-2(1H)-yl)-2-methoxyethan-1-one (3) (35 mg, 96.02 umol, 58.12% yield, 96.19% purity, HCl) as white solid. $^1$H NMR (DMSO-d6, 400 MHz): δ 7.75 (d, J=8.82 Hz, 1H), 7.14 (d, J=8.60 Hz, 1H), 5.07 (s, 2H), 4.50 (br s, 2H), 4.24 (s, 2H), 4.05 (t, J=5.51 Hz, 2H), 3.34 (s, 3H).

Example 4 Synthesis

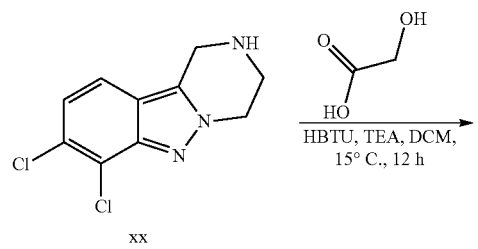

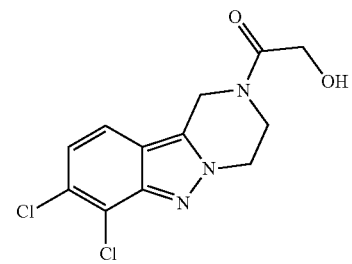

4

Example 4: 1-(7,8-Dichloro-3,4-dihydropyrazino[1,2-b]indazol-2(1H)-yl)-2-hydroxyethan-1-one

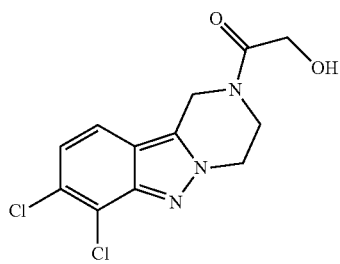 [SMILES: O=C(CO)N1CCn2nc3c(Cl)c(Cl)ccc3c2C1]

To a solution of 7,8-dichloro-1,2,3,4-tetrahydropyrazino[1,2-b]indazole (xx) (90 mg, 371.74 μm ol, 1 eq) and 2-hydroxyacetic acid (33.93 mg, 446.09 umol, 27.14 uL, 1.2 eq) in DMF (5 mL) was added Et$_3$N (112.85 mg, 1.12 mmol, 155.23 uL, 3 eq) and HBTU (211.47 mg, 557.61 umol, 1.5 eq). The mixture was stirred at 15° C. for 12 h. The reaction mixture was poured into 20 mL H$_2$O and extracted with EA (25 mL*3). The combined organic layers were washed with brine, dried over Na$_2$SO$_4$, filtered and concentrated under reduced pressure to give a residue. The residue was purified by prep-HPLC (HCl condition) to give 1-(7,8-dichloro-3,4-dihydropyrazino[1,2-b]indazol-2(1H)-yl)-2-hydroxyethan-1-one (4) (30 mg, 79.28 umol, 21.33% yield, 88.95% purity, HCl) as a white solid. $^1$H NMR (DMSO-d6, 400 MHz): δ 7.80-7.75 (m, 1H), 7.16 (d, J=8.8 Hz, 1H), 5.09 (s, 2H), 4.52 (br s, 2H), 4.28 (s, 2H), 4.07 (br t, J=5.3 Hz, 2H).

Examples 64-67 can be produced by employing similar synthesis process and method as described in these Example 3 synthesis and Example 4 synthesis.

Example 5 Synthesis

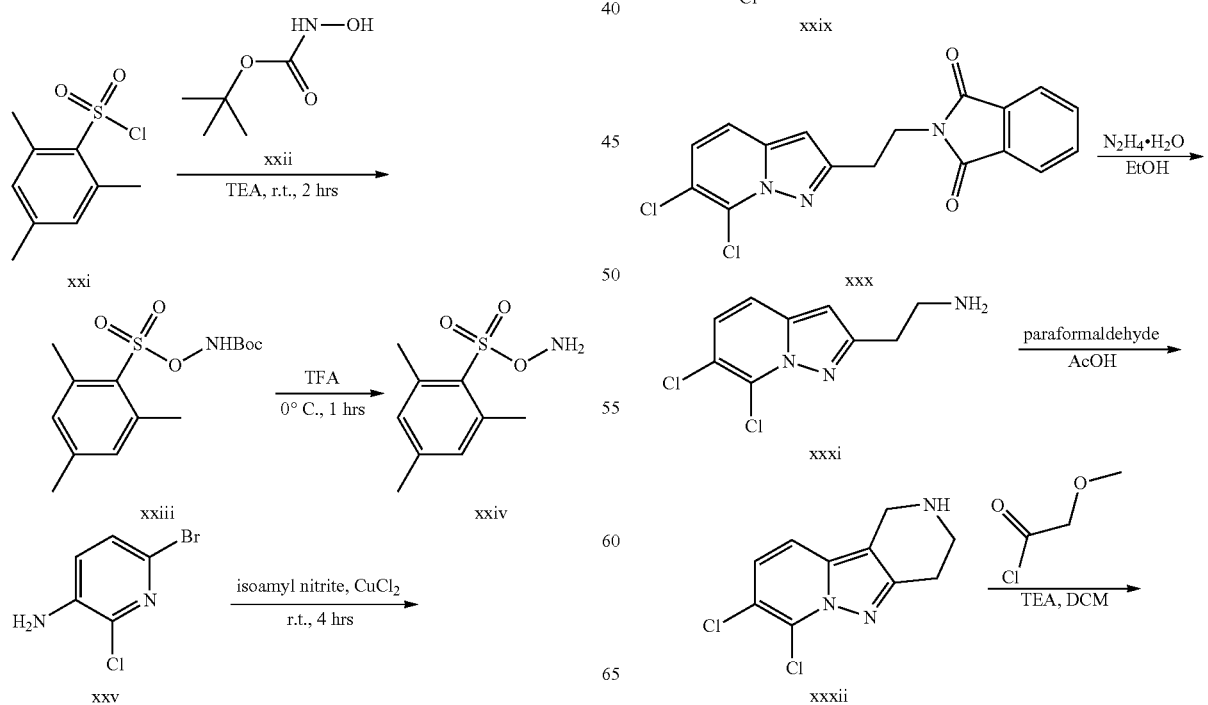

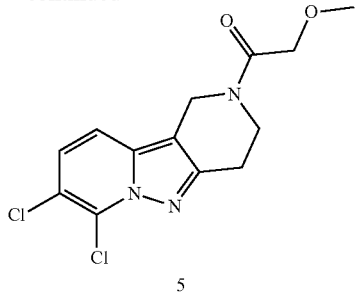

Example 5: 1-(7,8-Dichloro-3,4-dihydropyrazolo[1,5-a:4,3-c']dipyridin-2(1H)-yl)-2-methoxyethan-1-one

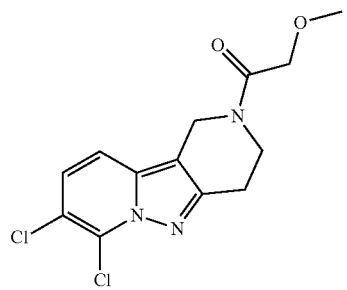 [SMILES: COCC(=O)N1CCc2nn3c(Cl)c(Cl)ccc3c2C1]

To a solution of 2,4,6-trimethylbenzenesulfonyl chloride (xxi) (30 g, 137.17 mmol, 1 eq) and tert-butyl hydroxycarbamate (xxii) (20.09 g, 150.89 mmol, 1.1 eq) in methyl tertbutylether (300 mL) was added triethylamine (15.27 g, 150.89 mmol, 21 mL, 1.1 eq) at 0° C. dropwise. The reaction mixture was stirred at 25° C. for 2 hours. The suspension mixture was filtered and washed with MTBE (50 mL). The filter was concentrated in vacuum to give tert-butyl ((mesitylsulfonyl)oxy)carbamate (xxiii) (40 g, crude) as yellow oil. $^1$H NMR (CDCl$_3$, 400 MHz): δ 7.61 (br.s, 1H), 6.99 (s, 2H), 2.68 (s, 3H), 2.33 (s, 3H), 1.36 (s, 9H).

The solution of tert-butyl ((mesitylsulfonyl)oxy)carbamate (xxiii) (36 g, 114.15 mmol, 1 eq) in trifluoroacetic acid (90 mL) was stirred at 0° C. for 1 hour. The reaction mixture was poured into ice/water (200 mL), the solid was collected by filtration and washed with water (200 mL) to give O-(mesitylsulfonyl)hydroxylamine (xxiv) (30 g, crude) as a white solid. $^1$H NMR (CDCl$_3$, 400 MHz): δ 7.00 (s, 2H), 2.65 (s, 6H), 2.33 (s, 3H).

To a solution of 6-bromo-2-chloropyridin-3-amine (xxv) (10 g, 48.2 mmol, 1 eq) in acetonitrile (100 mL) was added isoamyl nitrite (16.94 g, 144.61 mmol, 19.47 mL, 3 eq) and copper dichloride (12.96 g, 96.41 mmol, 2 eq) at 0° C. After addition, the mixture was stirred at 20° C. for 4 hours. Solvent was removed in vacuum to give residue. The residue was purified by silica gel chromatography (Petroleum ether) to give 6-bromo-2,3-dichloropyridine (xxvi) (8.3 g, 36.58 mmol, 75.89% yield) as a white solid. $^1$H NMR (DMSO-d6, 400 MHz): δ 8.11 (d, J=8.0 Hz, 1H), 7.77 (d, J=8.0 Hz, 1H).

To a solution of 6-bromo-2,3-dichloropyridine (xxvi) (8.3 g, 36.58 mmol, 1 eq) and but-3-yn-1-ol (3.85 g, 54.87 mmol, 4.15 mL, 1.5 eq) in tetrahydrofuran (150 mL) was added Pd(PPh$_3$)$_2$Cl$_2$ (2.57 g, 3.66 mmol, 0.1 eq), triethylamine (5.55 g, 54.87 mmol, 7.64 mL, 1.5 eq) and cuprous iodide (1.39 g, 7.32 mmol, 0.2 eq). The mixture was stirred at 20° C. for 3 hours under nitrogen. LCMS showed the reaction was worked well. The mixture was filtered and the filter was concentrated in vacuum to give a residue. The residue was purified by silica gel chromatography (Petroleum ether: Ethyl acetate=20:1 to 5:1) to give 4-(5,6-dichloropyridin-2-yl)but-3-yn-1-ol (xxvii) (6.5 g, 26.14 mmol, 71.46% yield, 86.9% purity) as a brown solid. $^1$H NMR (CDCl$_3$, 400 MHz): δ 7.71 (d, J=8.4 Hz, 1H), 7.28 (d, J=8.0 Hz, 1H), 3.86 (t, J=6.0 Hz, 2H), 2.72 (t, J=6.0 Hz, 2H), 2.15 (br.s, 1H).

To a solution of 4-(5,6-dichloropyridin-2-yl)but-3-yn-1-ol (xxvii) (6.5 g, 30.08 mmol, 1 eq) in dichloromethane (100 mL) was added O-(mesitylsulfonyl)hydroxylamine (xxiv) (32.38 g, 150.42 mmol, 5 eq) at 0° C., the reaction mixture was stirred at 30° C. for 16 hours. The reaction mixture was quenched with water (30 mL) and extracted with dichloromethane (100 mL*2), organic layers were collected, dried and concentrated to give xxviii (7.3 g, crude) as black oil.

To a solution of xxviii (7.3 g, 16.92 mmol, 1 eq) in N,N-dimethylformamide (80 mL) was added potassium carbonate (7.02 g, 50.77 mmol, 3 eq) at 0° C., the reaction mixture was stirred at 30° C. for 1 hour. The reaction mixture was filtered and the filter was concentrated in vacuum to give a residue. The residue was purified by silica gel chromatography (petroleum ether:ethyl acetate=20:1 to 5:1) to give 2-(6,7-dichloropyrazolo[1,5-a]pyridin-2-yl)ethan-1-ol (xxix) (1.6 g, 6.92 mmol, 40.91% yield) as yellow oil. $^1$H NMR (CDCl$_3$, 400 MHz): δ 7.39 (d, J=6.8 Hz, 2H), 7.18 (d, J=6.4 Hz, 1H), 6.53 (s, 1H), 4.02 (t, J=6.0 Hz, 2H), 3.13 (t, J=6.0 Hz, 2H).

To a solution of 2-(6,7-dichloropyrazolo[1,5-a]pyridin-2-yl)ethan-1-ol (xxix) (1.6 g, 6.92 mmol, 1 eq), isoindoline-1,3-dione (1.22 g, 8.31 mmol, 1.2 eq) and triphenylphosphine (2.18 g, 8.31 mmol, 1.2 eq) in tetrahydrofuran (30 mL) was added diisopropyl azodicarboxylate (1.68 g, 8.31 mmol, 1.62 mL, 1.2 eq) at 0° C. under nitrogen. The reaction mixture was stirred at 25° C. for 12 hours. The reaction mixture was poured into water (20 mL) and extracted with ethyl acetate (30 mL), organic layer was collected, dried and concentrated in vacuum to give a residue. The residue was purified by silica gel chromatography (petroleum ether:ethyl acetate=50:1 to 5:1) to give 2-(2-(6,7-dichloropyrazolo[1,5-a]pyridin-2-yl)ethyl)isoindoline-1,3-dione (xxx) (1.5 g, impure) as an off-white solid. $^1$H NMR (CDCl$_3$, 400 MHz): δ 7.70-7.68 (m, 2H), 7.67-7.65 (m, 2H), 7.47 (d, J=6.8 Hz, 1H), 7.15 (d, J=6.8 Hz, 1H), 4.15-4.12 (m, 2H), 3.31-3.30 (m, 2H).

To a solution of 2-(2-(6,7-dichloropyrazolo[1,5-a]pyridin-2-yl)ethyl)isoindoline-1,3-dione (xxx) (1.5 g, 4.16 mmol, 1 eq) in ethanol (20 mL) was added hydrazine hydrate (1.04 g, 20.41 mmol, 1.01 mL, 98% purity, 4.9 eq). The reaction mixture was stirred at 25° C. for 13 hours. The mixture was filtered and concentrated to give a residue. The residue was purified by reverse phase flash (TFA condition) to give 2-(6,7-dichloropyrazolo[1,5-a]pyridin-2-yl)ethan-1-amine (xxxi) (0.8 g, 2.32 mmol, 83.78% purity, 55.83% yield, TFA) as yellow oil. $^1$H NMR (CDCl$_3$, 400 MHz): δ 7.44 (d, J=5.6 Hz, 1H), 7.31-7.28 (m, 1H), 6.55 (s, 1H), 3.55-3.52 (m, 2H), 3.29-3.27 (m, 2H).

To a solution of 2-(6,7-dichloropyrazolo[1,5-a]pyridin-2-yl)ethan-1-amine (xxxi) (800 mg, 2.32 mmol, 1 eq, TFA) in acetic acid (8 mL) was added paraformaldehyde (372.56 mg, 4.14 mmol, 1.78 eq) at 25° C. The reaction mixture was stirred at 25° C. for 12 hours. Solvent was removed in vacuum to give a residue. The residue was purified by reverse phase flash (TFA condition) to give 7,8-dichloro-1,2,3,4-tetrahydropyrazolo[1,5-a:4,3-c']dipyridine (xxxii)

(0.25 g, 502.63 umol, 21.62% yield, 71.6% purity, TFA) as a yellow solid. $^1$H NMR (CD$_3$OD, 400 MHz): δ7.64 (d, J=9.2 Hz, 1H), 7.46 (d, J=9.2 Hz, 1H), 4.54 (s, 2H), 3.68 (t, J=6.4 Hz, 1H), 3.31-3.28 (m, 2H).

To a solution of 7,8-dichloro-1,2,3,4-tetrahydropyrazolo[1,5-a:4,3-c']dipyridine (xxxii) (0.1 g, 280.8 umol, 1 eq, TFA) and triethylamine (85.24 mg, 842.4 umol, 117.25 uL, 3 eq) in dichloromethane (3 mL) was added 2-methoxyacetyl chloride (45.71 mg, 421.2 umol, 38.41 uL, 1.5 eq) at 0° C. The reaction mixture was stirred at 25° C. for 5 minutes. Solvent was removed in vacuum to give a residue. The residue was purified by prep-HPLC (column: Phenomenex Synergi C18 150*25*10 um; mobile phase: [water (0.1% TFA)-ACN]; B %: 18%-48%, 10 min) to give an impure product (0.1 g). The impure product was further purified by prep-TLC (ethyl acetate) to give 1-(7,8-dichloro-3,4-dihydropyrazolo[1,5-a:4,3-c']dipyridin-2(1H)-yl)-2-methoxyethan-1-one (5) (14.7 mg, 43.98 umol, 15.72% yield, 98.52% purity) as an off white solid. $^1$H NMR (DMSO-d6, 400 MHz): δ7.71 (d, J=9.2 Hz, 1H), 7.38 (d, J=9.6 Hz, 1H), 4.75 (s, 2H), 4.20 (s, 2H), 3.83 (t, J=6.0 Hz, 2H), 3.34 (s, 3H), 2.97-2.95 (m, 2H).

Example 6 Synthesis

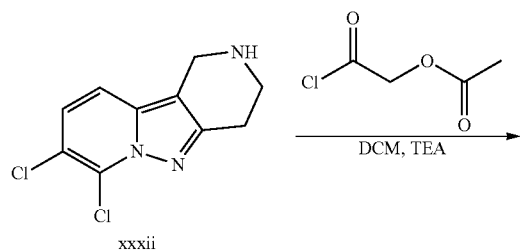

xxxii

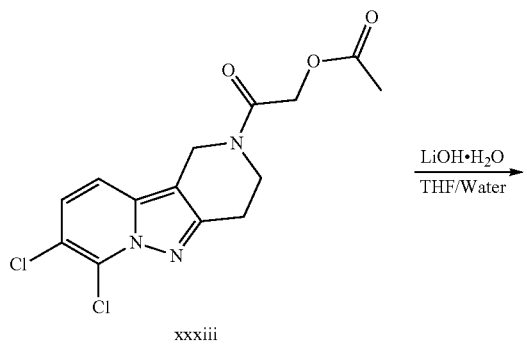

xxxiii

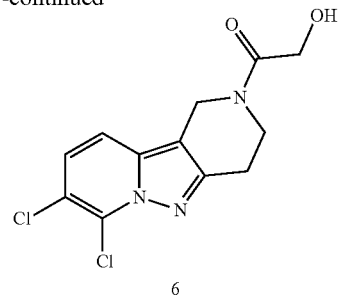

Example 6: 1-(7,8-Dichloro-3,4-dihydropyrazolo[1,5-a:4,3-c']dipyridin-2(1H)-yl)-2-hydroxyethan-1-one

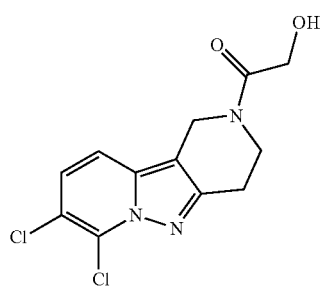 [SMILES: O=C(CO)N1CCc2nn3c(Cl)c(Cl)ccc3c2C1]

To a solution of 7,8-dichloro-1,2,3,4-tetrahydropyrazolo[1,5-a:4,3-c']dipyridine (xxxii) (100 mg, 280.80 umol, 1 eq, TFA) and triethylamine (85.24 mg, 842.4 umol, 117.25 uL, 3 eq) in dichloromethane (1 mL) was added 2-chloro-2-oxoethyl acetate (57.51 mg, 421.2 umol, 45.28 uL, 1.5 eq) at 0° C. The reaction mixture was stirred at 25° C. for 20 minutes. Solvent was removed in vacuum to give 2-(7,8-dichloro-3,4-dihydropyrazolo[1,5-a:4,3-c']dipyridin-2(1H)-yl)-2-oxoethyl acetate (xxxiii) (0.11 g, crude) as yellow oil.

To a solution of 2-(7,8-dichloro-3,4-dihydropyrazolo[1,5-a:4,3-c']dipyridin-2(1H)-yl)-2-oxoethyl acetate (xxxiii) (110 mg, 321.47 umol, 1 eq) in tetrahydrofuran (0.5 mL) and water (0.5 mL) was added lithium hydroxide monohydrate (40.47 mg, 964.41 umol, 3 eq). The reaction mixture was stirred at 25° C. for 0.5 hour. The reaction mixture was quenched with hydrochloric acid (2 mL) and extracted with ethyl acetate (5 mL), organic layer was collected and concentrated in vacuum to give a residue. The residue was purified by rep-HPLC (column: Phenomenex Synergi C18 150*25*10 um; mobile phase: [water (0.1% TFA)-ACN]; B %: 15%-45%, 10 min) to give 1-(7,8-dichloro-3,4-dihydropyrazolo[1,5-a:4,3-c']dipyridin-2(1H)-yl)-2-hydroxyethan-1-one (6) (7.7 mg, 25.01 umol, 7.79% yield) as a white solid. $^1$H NMR (CD$_3$OD, 400 MHz): δ7.60 (d, J=9.2 Hz, 1H), 7.36 (dd, J$_1$=2.0 Hz, J$_2$=9.2 Hz, 1H), 5.02-4.97 (m, 2H), 4.40-4.36 (m, 2H), 4.11 (t, J=6.0 Hz, 1H), 3.82 (t, J=5.8 Hz, 1H), 3.07-2.96 (m, 2H).

Examples 25 and 30 Synthesis
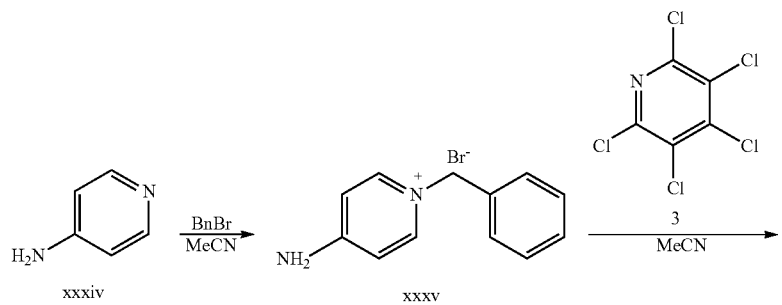
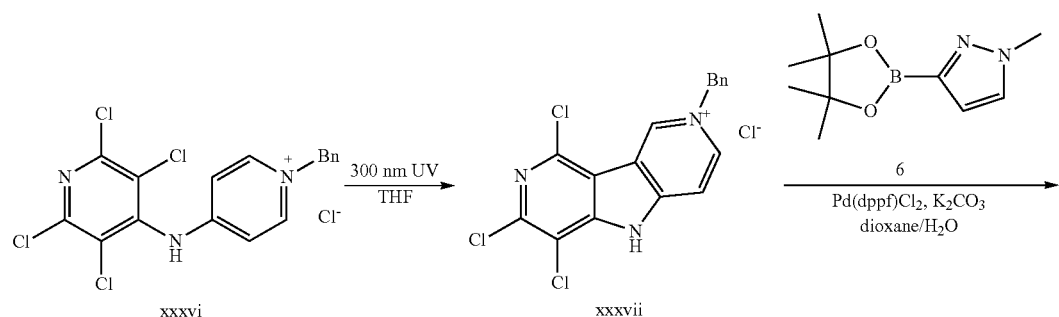
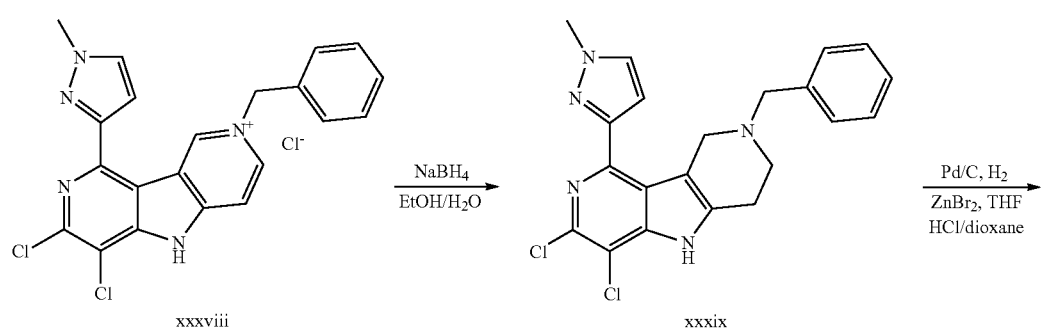
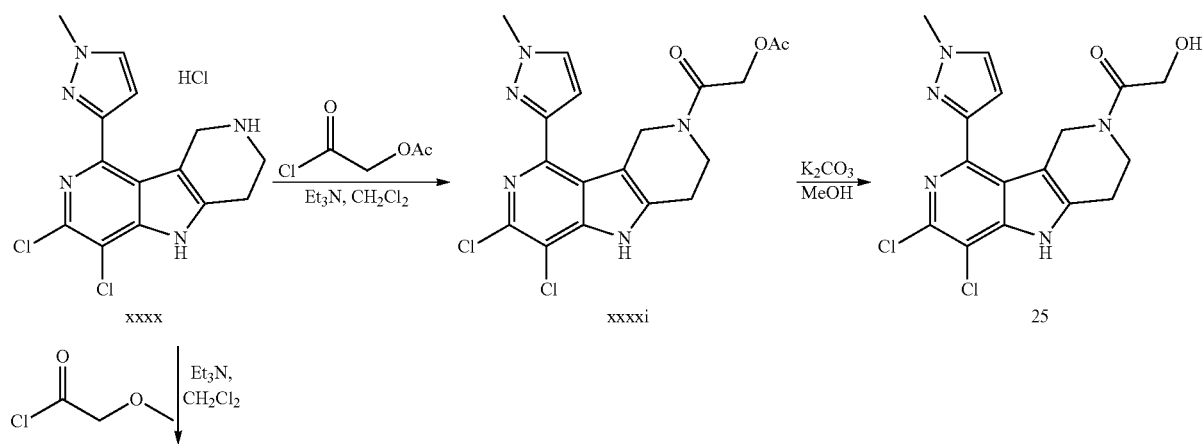

-continued

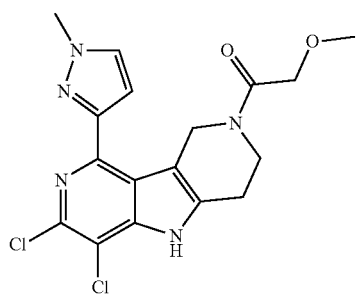

30

Example 25

1-[6,7-Dichloro-9-(1-methyl-1H-pyrazol-3-yl)-1,3,4,5-tetrahydro-2H-pyrrolo[3,2-c:4,5-c']dipyridin-2-yl]-2-hydroxyethan-1-one

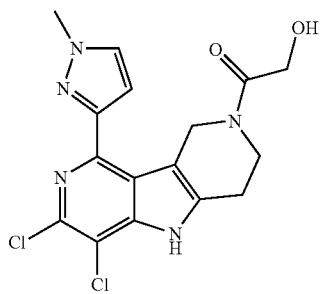 [SMILES: Cn1ccc(-c2nc(Cl)c(Cl)c3[nH]c4c(c23)CN(C(=O)CO)CC4)n1]

A mixture of pyridin-4-amine (xxxiv) (3.66 g, 38.9 mmol) and bromomethylbenzene (7.32 g, 42.8 mmol, 5.08 mL) in MeCN (50 mL) was stirred at 25° C. for 3 h. TLC (Petroleum ether/Ethyl acetate=2/1) showed the reaction was completed and a new spot was detected. The resultant precipitate solid was collected by filtration and dried in vacuo to afford 4-amino-1-benzylpyridin-1-ium bromide (xxxv) (9.60 g, 93% yield) as a white solid. $^1$H NMR (400 MHz, DMSO-$d_6$) δ 5.38 (2H, s), 6.87 (2H, d, J=7.2 Hz), 7.32-7.50 (5H, m), 8.19 (2H, brs), 8.31 (2H, d, J=7.2 Hz).

A mixture of 4-amino-1-benzylpyridin-1-ium bromide (xxxv) (9.60 g, 36.2 mmol), $K_2CO_3$ (12.5 g, 90.5 mmol) and perchloropyridine 3 (10.0 g, 39.8 mmol) in MeCN (150 mL) was stirred at 25° C. for 12 h. The reaction mixture was heated to 80° C. and stirred for 12 h. LCMS showed the reaction was completed and the desired m/z was detected. The reaction mixture was filtered to remove insoluble material. The fitrate was diluted with water (80 mL) at 25° C. and the mixture was extracted with EtOAc (60 mL*2). The combined organic phase was washed with brine (40 mL), dried with anhydrous $Na_2SO_4$, filtered and concentrated in vacuo. The residue was purified by column chromatography on silica gel (Petroleum ether/Ethyl acetate=10/1 to 2/1) to afford 1-benzyl-4-((perchloropyridin-4-yl)amino)pyridin-1-ium chloride (xxxvi) (10.5 g, 61% yield) as a yellow solid. $^1$H NMR (400 MHz, DMSO-$d_6$) δ 5.10 (2H, s), 6.06-6.22 (2H, m), 7.30-7.50 (5H, m), 7.65-7.77 (2H, m).

A mixture of 1-benzyl-4-((perchloropyridin-4-yl)amino)pyridin-1-ium chloride (xxxvi) (5.00 g, 11.5 mmol) in THF (60 mL) was stirred at 25° C. for 24 h under 300 nm UV light. LCMS showed the reaction was completed and the desired m/z was detected. The reaction mixture was concentrated in vacuo and the residue was triturated with EtOAc (10 mL). The resultant precipitate solid was collected by filtration and dried in vacuo to afford 2-benzyl-6,7,9-trichloro-5H-pyrrolo[3,2-c:4,5-c']dipyridin-2-ium chloride (xxxvii) (3.50 g, 69% yield) as a yellow solid. $^1$H NMR (400 MHz, DMSO-$d_6$) δ 6.06 (2H, s), 7.41-7.48 (4H, m), 7.52-7.62 (2H, m), 8.23 (1H, d, J=6.8 Hz), 9.03 (1H, d, J=6.4 Hz), 10.12 (1H, s).

A mixture of 2-benzyl-6,7,9-trichloro-5H-pyrrolo[3,2-c:4,5-c']dipyridin-2-ium chloride (xxxvii) (3.00 g, 6.77 mmol), 1-methyl-3-(4,4,5,5-tetramethyl-1,3,2-dioxaborolan-2-yl)-1H-pyrazole (1.55 g, 7.44 mmol), Pd(dppf)Cl$_2$ (495 mg, 0.68 mmol) and $K_2CO_3$ (2.80 g, 20.3 mmol) in dioxane (50 mL) and $H_2O$ (5 mL) was heated to 100° C. for 12 h under $N_2$. LCMS showed the reaction was completed and the desired m/z was detected. The reaction mixture was filtered to remove insoluble material. The filtrate was diluted with water (100 mL) at 25° C. and the mixture was extracted with EtOAc (50 mL*2). The combined organic phase was washed with brine (30 mL), dried with anhydrous $Na_2SO_4$, filtered and concentrated in vacuo. The residue was purified by column chromatography on silica gel (Dichloromethane/Methanol=50/1 to 20/1) to afford 2-benzyl-6,7-dichloro-9-(1-methyl-1H-pyrazol-3-yl)-5H-pyrrolo[3,2-c:4,5-c']dipyridin-2-ium chloride (xxxviii) (1.80 g, 59% yield) as a white solid. $^1$H NMR (400 MHz, DMSO-$d_6$) δ 4.05 (3H, s), 5.80 (2H, s), 6.98 (1H, d, J=2.4 Hz), 7.37-7.56 (6H, m), 7.81 (1H, d, J=7.2 Hz), 7.91 (1H, d, J=2.4 Hz), 8.57 (1H, d, J=7.2 Hz), 10.51 (1H, brs).

To a mixture of 2-benzyl-6,7-dichloro-9-(1-methyl-1H-pyrazol-3-yl)-5H-pyrrolo[3,2-c:4,5-c']dipyridin-2-ium chloride (xxxviii) (1.80 g, 4.05 mmol) in EtOH (30 mL) and $H_2O$ (30 mL) was added NaBH$_4$ (1.53 g, 40.5 mmol) at 0° C. under $N_2$. The reaction mixture was stirred at 100° C. for 3 h. LCMS showed the reaction was completed and the desired m/z was detected. The reaction mixture was poured into water (100 mL) at 25° C. and the mixture was extracted with EtOAc (50 mL*3). The combined organic phase was washed with brine (100 mL), dried with Na$_2$SO$_4$, filtered and the filtrate was concentrated in vacuo. The residue was purified by column chromatography on silica gel (Petroleum ether/Ethyl acetate=5/1 to 2/3) to afford 2-benzyl-6,7-dichloro-9-(1-methyl-1H-pyrazol-3-yl)-2,3,4,5-tetrahydro-1H-pyrrolo[3,2-c:4,5-c']dipyridine (xxxix) (1.30 g, 77% yield) as a white solid. $^1$H NMR (400 MHz, DMSO-$d_6$) δ 2.78-2.93 (4H, m), 3.67-3.80 (7H, m), 6.64 (1H, d, J=2.0 Hz), 7.21-7.45 (5H, m), 7.70 (1H, d, J=2.4 Hz), 11.96 (1H, brs).

To a mixture of 2-benzyl-6,7-dichloro-9-(1-methyl-1H-pyrazol-3-yl)-2,3,4,5-tetrahydro-1H-pyrrolo[3,2-c:4,5-c']

dipyridine (xxxix) (120 mg, 0.29 mmol), 4 M HCl/dioxane (0.04 mL) and ZnBr$_2$ (65.5 mg, 0.29 mmol) in THF (6 mL) was added 10% Pd/C (50 mg) at 25° C. under N$_2$. The reaction mixture was degassed and stirred at 25° C. for 1 h under H$_2$ (15 psi). TLC (Dichloromethane/Methanol=10/1) showed the reaction was completed and a new spot was detected. The reaction mixture was filtered and the filtrate was concentrated in vacuo to afford 6,7-dichloro-9-(1-methyl-1H-pyrazol-3-yl)-2,3,4,5-tetrahydro-1H-pyrrolo[3,2-c:4,5-c']dipyridine (xxxx) (100 mg, 85% purity) as a white solid. $^1$H NMR (400 MHz, DMSO-d$_6$) δ 2.96-3.00 (2H, m), 3.16-3.20 (2H, m), 3.99 (3H, s), 4.40-4.44 (2H, m), 6.77 (1H, d, J=2.0 Hz), 7.82 (1H, d, J=2.4 Hz), 12.17 (1H, brs).

To a mixture of 6,7-dichloro-9-(1-methyl-1H-pyrazol-3-yl)-2,3,4,5-tetrahydro-1H-pyrrolo[3,2-c:4,5-c']dipyridine (xxxx) (85% purity, 110 mg, 0.29 mmol) and Et$_3$N (147 mg, 1.45 mmol, 0.20 mL) in CH$_2$Cl$_2$ (8 mL) was added (2-chloro-2-oxo-ethyl) acetate 10 (47.6 mg, 0.35 mmol, 0.04 mL) at 0° C. The reaction mixture was warmed to 25° C. and stirred for 0.5 h. TLC (Petroleum ether/Ethyl acetate=1/1) showed the reaction was completed and a new spot was detected. The reaction mixture was diluted with water (20 mL) at 25° C. and the mixture was extracted with CH$_2$Cl$_2$ (15 mL*2). The combined organic phase was dried with anhydrous Na$_2$SO$_4$, filtered and concentrated in vacuo to afford 2-(6,7-dichloro-9-(1-methyl-1H-pyrazol-3-yl)-3,4-dihydro-1H-pyrrolo[3,2-c:4,5-c']dipyridin-2(5H)-yl)-2-oxo-ethyl acetate (xxxxi) (80.0 mg, 53% yield for 2 steps) as a white solid. $^1$H NMR (400 MHz, DMSO-d$_6$) δ 2.08 (3H, s), 2.80-3.01 (2H, m), 3.69-3.87 (2H, m), 3.93-4.03 (3H, m), 4.78-5.00 (4H, m), 6.72-6.81 (1H, m), 7.82 (1H, d, J=2.4 Hz), 12.08-12.20 (1H, m).

A mixture of 2-(6,7-dichloro-9-(1-methyl-1H-pyrazol-3-yl)-3,4-dihydro-1H-pyrrolo[3,2-c:4,5-c']dipyridin-2(5H)-yl)-2-oxoethyl acetate (xxxxi) (80.0 mg, 0.18 mmol) and K$_2$CO$_3$ (98.5 mg, 0.71 mmol) in MeOH (5 mL) was stirred at 25° C. for 2 h under N$_2$. LCMS showed the reaction was completed and the desired m/z was detected. The reaction mixture was concentrated in vacuo. The residue was purified by preparative HPLC (TFA) to afford 1-(6,7-dichloro-9-(1-methyl-1H-pyrazol-3-yl)-3,4-dihydro-1H-pyrrolo[3,2-c:4,5-c']dipyridin-2(5H)-yl)-2-hydroxyethanone (25) (35.0 mg, 50% yield) as a white solid. $^1$H NMR (400 MHz, DMSO-d$_6$) δ 2.81-2.98 (2H, m), 3.65-3.75 (1H, m), 3.83-3.92 (1H, m), 3.92-4.07 (3H, m), 4.17-4.26 (2H, m), 4.57-4.66 (1H, m), 4.90 (2H, s), 6.72-6.79 (1H, m), 7.76-7.89 (1H, m), 12.06-12.17 (1H, m).

Example 30: 1-[6,7-Dichloro-9-(1-methyl-1H-pyrazol-3-yl)-1,3,4,5-tetrahydro-2H-pyrrolo[3,2-c:4,5-c']dipyridin-2-yl]-2-methoxyethan-1-one

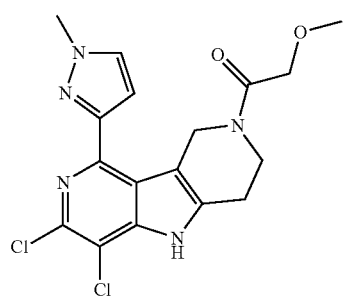 [SMILES: COCC(=O)N1CCc2[nH]c3c(Cl)c(Cl)nc(-c4ccn(C)n4)c3c2C1]

To a mixture of 6,7-dichloro-9-(1-methyl-1H-pyrazol-3-yl)-2,3,4,5-tetrahydro-1H-pyrrolo[3,2-c:4,5-c']dipyridine; hydrochloride (xxxx) (50.0 mg, 0.13 mmol) and Et$_3$N (71.5 mg, 0.71 mmol, 0.10 mL) in CH$_2$Cl$_2$ (8 mL) was added 2-methoxyacetyl chloride (18.4 mg, 0.17 mmol, 0.02 mL) at 0° C. The reaction mixture was warmed to 25° C. and stirred for 0.5 h. TLC (Petroleum ether/Ethyl acetate=1/1) showed the reaction was completed and a new spot was detected. The reaction mixture was diluted with water (20 mL) at 25° C. and the mixture was extracted with CH$_2$Cl$_2$ (15 mL*2). The combined organic phase was dried with anhydrous Na$_2$SO$_4$, filtered and concentrated in vacuo. The residue was purified by preparative HPLC (TFA). The crude product was triturated with MeCN (3 mL). The resultant precipitate solid was collected by filtration and dried in vacuo to afford 1-(6,7-dichloro-9-(1-methyl-1H-pyrazol-3-yl)-3,4-dihydro-1H-pyrrolo[3,2-c:4,5-c']dipyridin-2(5H)-yl)-2-methoxyethanone (30) (26.0 mg, 51% yield) as a white solid. $^1$H NMR (400 MHz, DMSO-d$_6$) δ 2.82-2.98 (2H, m), 3.37-3.32 (3H, m), 3.69-3.88 (2H, m), 3.93-4.05 (3H, m), 4.14-4.25 (2H, m), 4.82-5.00 (2H, m), 6.72-6.80 (1H, m), 7.83 (1H, s), 12.06-12.17 (1H, m).

Example 34 Synthesis

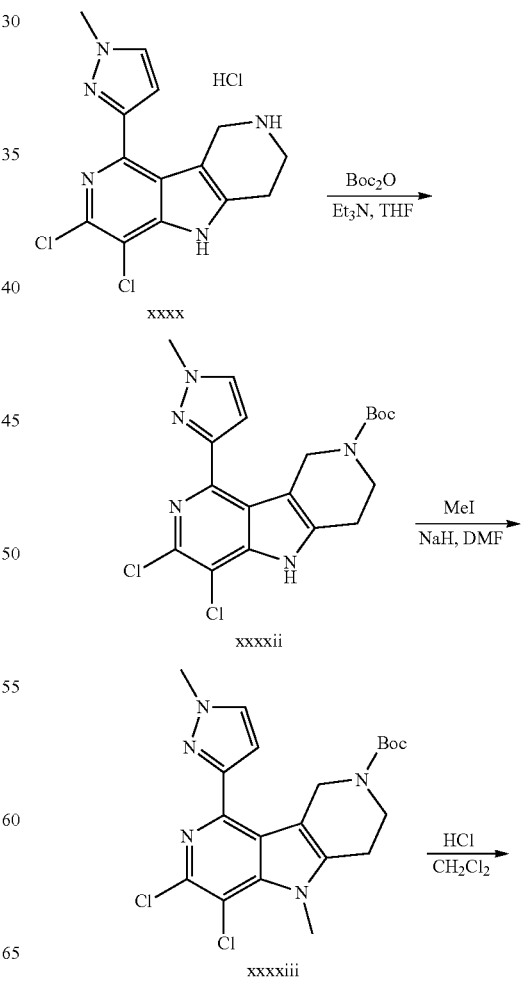

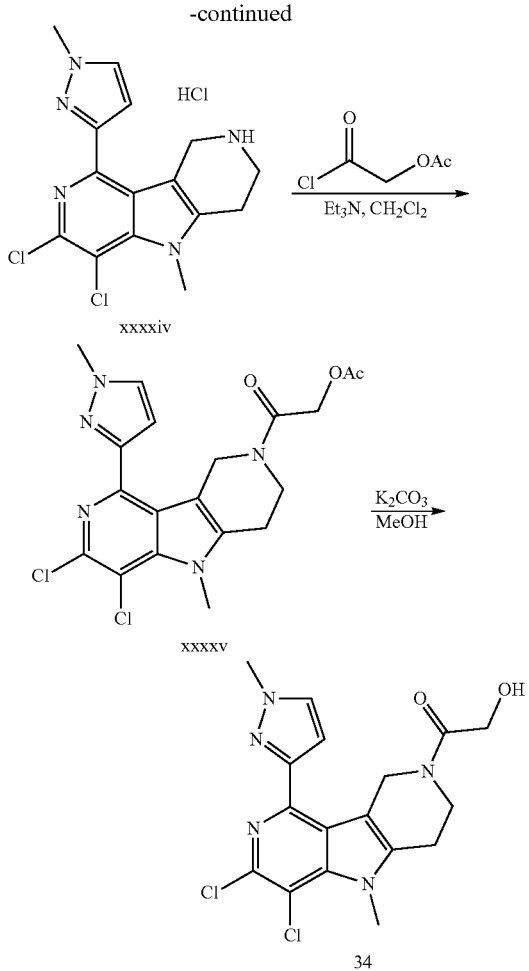

Example 34: 1-[6,7-Dichloro-5-methyl-9-(1-methyl-1H-pyrazol-3-yl)-1,3,4,5-tetrahydro-2H-pyrrolo[3,2-c:4,5-c']dipyridin-2-yl]-2-hydroxyethan-1-one

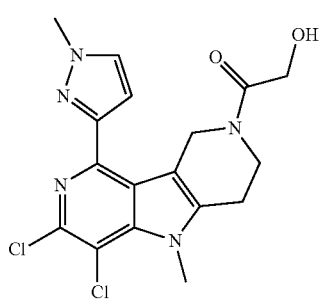 [SMILES: Cn1ccc(-c2nc(Cl)c(Cl)c3c2c2c(n3C)CCN(C(=O)CO)C2)n1]

A mixture of 6,7-dichloro-9-(1-methyl-1H-pyrazol-3-yl)-2,3,4,5-tetrahydro-1H-pyrrolo[3,2-c:4,5-c']dipyridine; hydrochloride (xxxx) (260 mg, 0.72 mmol), Boc$_2$O (264 mg, 1.21 mmol) and Et$_3$N (408 mg, 4.03 mmol, 0.56 mL) in THF (15 mL) was stirred at 25° C. for 2 h. TLC (Petroleum ether/Ethyl acetate=1/1) showed the reaction was completed and a new spot was detected. The reaction mixture was diluted with water (20 mL) at 25° C. and the mixture was extracted with EtOAc (15 mL*2). The combined organic phase was washed with brine (10 mL), dried with anhydrous Na$_2$SO$_4$, filtered and concentrated in vacuo. The residue was purified by column chromatography on silica gel (Petroleum ether/Ethyl acetate=10/1 to 4/1) to afford tert-butyl 6,7-dichloro-5-methyl-9-(1-methyl-1H-pyrazol-3-yl)-3,4-dihydro-1H-pyrrolo[3,2-c:4,5-c']dipyridine-2(5H)-carboxylate (xxxxii) (200 mg, 65% yield) as a colorless solid. $^1$H NMR (400 MHz, DMSO-d$_6$) δ 1.43 (9H, s), 2.78-2.88 (2H, m), 3.63-3.75 (2H, m), 3.97 (3H, s), 4.66-4.90 (2H, m), 6.74 (1H, d, J=2.4 Hz), 7.81 (1H, d, J=2.0 Hz), 12.09 (1H, s).

To a mixture of tert-butyl 6,7-dichloro-5-methyl-9-(1-methyl-1H-pyrazol-3-yl)-3,4-dihydro-1H-pyrrolo[3,2-c:4,5-c']dipyridine-2(5H)-carboxylate (xxxxii) (160 mg, 0.38 mmol) in DMF (8 mL) was added NaH (60% purity, 22.7 mg, 0.57 mmol) at 0° C. under N$_2$. The reaction mixture was stirred at 0° C. for 0.5 h. To the reaction mixture was added MeI (108 mg, 0.76 mmol, 0.05 mL) at 0° C. The reaction mixture was warmed to 25° C. and stirred for 0.5 h. TLC (Petroleum ether/Ethyl acetate=1/1) showed the reaction was completed and a new spot was detected. The reaction mixture was quenched with saturated aqueous NH$_4$Cl solution (20 mL) at 25° C. and the mixture was extracted with EtOAc (20 mL*2). The combined organic phase was washed with brine (10 mL*3), dried with anhydrous Na$_2$SO$_4$, filtered and concentrated in vacuo to afford tert-butyl 6,7-dichloro-5-methyl-9-(1-methyl-1H-pyrazol-3-yl)-3,4-dihydro-1H-pyrrolo[3,2-c:4,5-c']dipyridine-2(5H)-carboxylate (xxxxiii) (160 mg, 97% yield) as a white solid. $^1$H NMR (400 MHz, DMSO-d$_6$) δ 1.40 (9H, s), 2.80-2.88 (2H, m), 3.66-3.73 (2H, m), 3.96 (3H, s), 3.99 (3H, s), 4.54-4.71 (2H, m), 6.69 (1H, d, J=2.0 Hz), 7.82 (1H, d, J=2.0 Hz).

A mixture of tert-butyl 6,7-dichloro-5-methyl-9-(1-methyl-1H-pyrazol-3-yl)-3,4-dihydro-1H-pyrrolo[3,2-c:4,5-c']dipyridine-2(5H)-carboxylate; hydrochloride (xxxxiii) (140 mg, 0.32 mmol) and 4 M HCl/dioxane (3 mL) in CH$_2$Cl$_2$ (3 mL) was stirred at 25° C. for 0.5 h. TLC (Petroleum ether/Ethyl acetate=1/1) showed the reaction was completed and a new spot was detected. The reaction mixture was concentrated in vacuo to afford 6,7-dichloro-5-methyl-9-(1-methyl-1H-pyrazol-3-yl)-2,3,4,5-tetrahydro-1H-pyrrolo[3,2-c:4,5-c']dipyridine; hydrochloride (xxxxiv) (115 mg, 96% yield) as a white solid. $^1$H NMR (400 MHz, DMSO-d$_6$) δ 3.06-3.15 (2H, m), 3.46-3.54 (2H, m), 3.97 (3H, s), 4.03 (3H, s), 4.36-4.50 (2H, m), 6.77 (1H, d, J=2.0 Hz), 7.86 (1H, d, J=2.4 Hz), 9.36 (2H, brs).

To a mixture of 6,7-dichloro-5-methyl-9-(1-methyl-1H-pyrazol-3-yl)-2,3,4,5-tetrahydro-1H-pyrrolo[3,2-c:4,5-c']dipyridine; hydrochloride (xxxxiv) (115 mg, 0.31 mmol) and Et$_3$N (156 mg, 1.54 mmol, 0.21 mL) in CH$_2$Cl$_2$ (20 mL) was added (2-chloro-2-oxo-ethyl) acetate 14 (50.6 mg, 0.37 mmol, 0.04 mL) at 0° C. The reaction mixture was warmed to 25° C. and stirred for 0.5 h. TLC (Petroleum ether/Ethyl acetate=1/1) showed the reaction was completed and a new spot was detected. The reaction mixture was washed with water (20 mL), dried with anhydrous Na$_2$SO$_4$, filtered and concentrated in vacuo to afford 2-(6,7-dichloro-5-methyl-9-(1-methyl-1H-pyrazol-3-yl)-3,4-dihydro-1H-pyrrolo[3,2-c:4,5-c']dipyridin-2(5H)-yl)-2-oxoethyl acetate (xxxxv) (130 mg, 95% yield) as a white solid. $^1$H NMR (400 MHz, DMSO-d$_6$) δ 2.05-2.08 (3H, m), 2.68-2.78 (2H, m), 2.83-3.00 (2H, m), 3.72-3.88 (2H, m), 3.92-4.06 (6H, m), 4.84-4.92 (2H, m), 6.67-6.81 (1H, m), 7.83 (1H, d, J=2.0 Hz).

A mixture of 2-(6,7-dichloro-5-methyl-9-(1-methyl-1H-pyrazol-3-yl)-3,4-dihydro-1H-pyrrolo[3,2-c:4,5-c']dipyridin-2(5H)-yl)-2-oxoethyl acetate (xxxxv) (120 mg, 0.28 mmol) and K$_2$CO$_3$ (152 mg, 1.10 mmol) in MeOH (8 mL)

was stirred at 25° C. for 2 h. LCMS showed the reaction was completed and the desired m/z was detected. The reaction mixture was concentrated in vacuo. The residue was diluted with water (10 mL) at 25° C. and the mixture was extracted with CH$_2$Cl$_2$ (10 mL*2). The combined organic phase was dried with anhydrous Na$_2$SO$_4$, filtered and concentrated in vacuo. The residue was purified by preparative HPLC (TFA) to afford 1-(6,7-dichloro-5-methyl-9-(1-methyl-1H-pyrazol-3-yl)-3,4-dihydro-1H-pyrrolo[3,2-c:4,5-c']dipyridin-2(5H)-yl)-2-hydroxyethanone (34) (56.0 mg, 51% yield) as a white solid. LCMS: RT=2.690 min, m/z 394.0 [M+H]$^+$. $^1$H NMR (400 MHz, DMSO-d$_6$) δ 2.82-2.97 (2H, m), 3.70-3.90 (2H, m), 3.92-4.04 (6H, m), 4.11-4.25 (2H, m), 4.72-4.83 (2H, m), 6.69-6.76 (1H, m), 7.84 (1H, brs). The signal of the OH proton was not observed.

Example 64 Synthesis

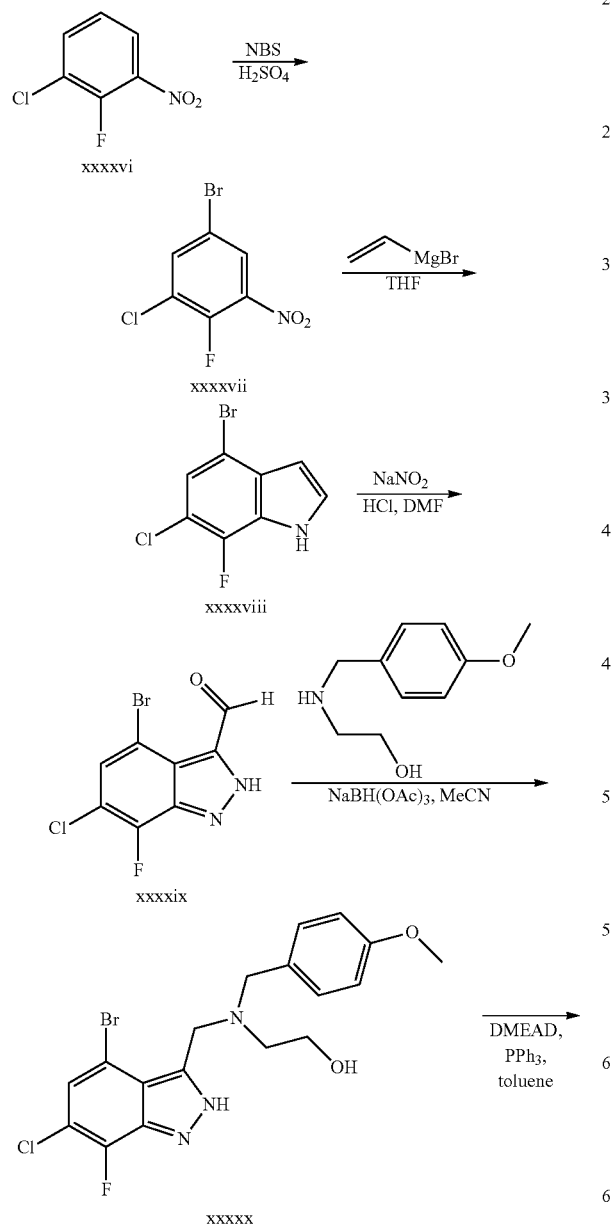

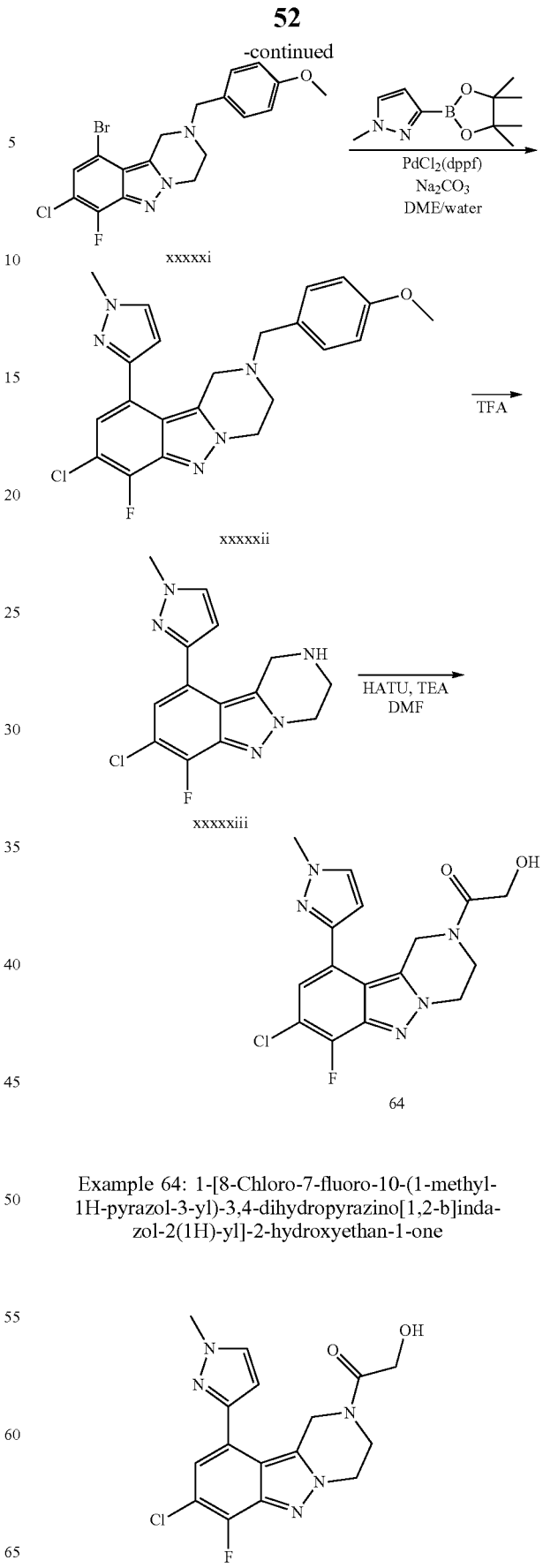

Example 64: 1-[8-Chloro-7-fluoro-10-(1-methyl-1H-pyrazol-3-yl)-3,4-dihydropyrazino[1,2-b]indazol-2(1H)-yl]-2-hydroxyethan-1-one To a solution of 1-chloro-2-fluoro-3-nitrobenzene (xxxxvi) (8.03 g, 45.74 mmol) in conc.$H_2SO_4$ (35 ml) was added NBS (8.96 g, 50.32 mmol) portionwise at room temperature. The mixture was purged with Ar and then stirred at 70° C. for 3 hours, then cooled to room temperature. The mixture was transferred into a beaker of ice water (50 mL), then extracted with EtOAc (30 mL×2). The combined organic layer was successively washed with water (30 mL), saturated aqueous $NaHCO_3$ (30 mL), and brine (30 mL), dried over $Na_2SO_4$, and concentrated under reduced pressure. Purification by column chromatography (0-5% EtOAc/hexane) afforded 5-bromo-1-chloro-2-fluoro-3-nitrobenzene (xxxxvii) (11.69 g, 45.9 mmol, 100%) as a yellow oil. $^1$H NMR (300 MHz, DMSO-$d_6$) δ 8.33-8.37 (1H, m), 8.38-8.42 (1H, m).

To a solution of 5-bromo-1-chloro-2-fluoro-3-nitrobenzene (xxxxvii) (5.1 g, 20.04 mmol) cooled to −78° C. was added vinylmagnesium bromide (1 M in THF) (46 ml, 46.00 mmol) dropwise over a period of 20 min, and stirred at −78° C. for 30 min. The reaction was quenched at −78° C. with MeOH (5 mL), then acidified with 1 M HCl (45 mL). The mixture was extracted with EtOAc (50 mL×3) and the combined organic layer was washed with brine (30 mL), dried over $Na_2SO_4$, and concentrated under reduced pressure. The crude material was passed through a pad of $SiO_2$ (50 mL), eluting with 1:1 EtOAc/hexane (100 mL) followed by EtOAc (30 mL). The eluent was concentrated under reduced pressure and further purified by column chromatography (silica gel, 1-5% EtOAc/hexane) to afford 4-bromo-6-chloro-7-fluoro-1H-indole (xxxxviii) (0.954 g, 3.84 mmol, 19.15%) as a dark red-orange solid. $^1$H NMR (300 MHz, DMSO-$d_6$) δ 6.49 (1H, td, J=3.2, 2.3 Hz), 7.38 (1H, d, J=5.6 Hz), 7.55-7.63 (1H, m), 12.24 (1H, br s).

To a solution of sodium nitrite (1.38 g, 20.00 mmol) in DMF (12 ml) and water (6 ml) cooled to 0° C. was added 2 M HCl (aq.) (8.5 ml, 17.00 mmol). The solution was stirred at room temperature for 5 min and then a solution of 4-bromo-6-chloro-7-fluoro-1H-indole (xxxxviii) (595 mg, 2.39 mmol) in DMF (40 mL) was added via addition funnel over a period of 45 minutes. The reaction was stirred at room temperature for 1 hour, then stirred at 65° C. for 3 hours. The reaction was diluted with water (30 mL) and extracted with Et2O (40 mL×3). The combined organic layer was washed with water (10 mL), brine (10 mL), dried over $Na_2SO_4$, and concentrated under reduced pressure to give 4-bromo-6-chloro-7-fluoro-1H-indazole-3-carbaldehyde (xxxxix) (576 mg, 2.076 mmol, 87%) as a brown solid. $^1$H NMR (300 MHz, DMSO-$d_6$) δ 7.78-7.83 (1H, m), 10.53 (1H, s), 15.08-15.42 (1H, m).

To a solution of 4-bromo-6-chloro-7-fluoro-1H-indazole-3-carbaldehyde (xxxix) (569 mg, 2.05 mmol) and 2-((4-methoxybenzyl)amino)ethan-1-ol (509 mg, 2.81 mmol) in $CH_3CN$ (5 ml) and THF(dry) (5 ml) was added $NaBH(OAc)_3$ (1304 mg, 6.15 mmol) at room temperature. The mixture was stirred for 40 min at room temperature and then quenched with aqueous saturated $NaHCO_3$ (10 mL). The mixture was extracted with EtOAc (25 mL×3) and the combined organic layer was washed with brine (10 mL), dried over $Na_2SO_4$, and concentrated under reduced pressure. Purification by column chromatography (silica gel, 50-100% EtOAc/hexane) afforded 2-(((4-bromo-6-chloro-7-fluoro-1H-indazol-3-yl)methyl)(4-methoxybenzyl)amino)ethan-1-ol (xxxxx) (297 mg, 0.671 mmol, 32.7%) as a light brown solid. $^1$H NMR (300 MHz, DMSO-$d_6$) δ 2.59 (2H, t, J=6.8 Hz), 3.36-3.48 (2H, m), 3.64 (2H, s), 3.70 (3H, s), 4.12 (2H, s), 4.25 (1H, br s), 6.76-6.85 (2H, m), 7.20 (2H, br d, J=8.7 Hz), 7.49 (1H, br d, J=5.6 Hz), 13.94 (1H, br s).

To a solution of 2-(((4-bromo-6-chloro-7-fluoro-1H-indazol-3-yl)methyl)(4-methoxybenzyl)amino)ethan-1-ol (xxxxx) (295 mg, 0.67 mmol) and $Ph_3P$ (262 mg, 1.00 mmol) in THF(dry) (5 ml) was added bis(2-methoxyethyl) (E)-diazene-1,2-dicarboxylate (234 mg, 1.00 mmol) at room temperature. The reaction was stirred at room temperature for 1.5 hours and then water (10 mL) was added. The mixture was extracted with EtOAc (20 mL×2) and the combined organic layer was washed with brine (10 mL), dried over $Na_2SO_4$, and concentrated under reduced pressure. Purification by column chromatography (silica gel, 50-100% EtOAc/hexane) afforded 10-bromo-8-chloro-7-fluoro-2-(4-methoxybenzyl)-1,2,3,4-tetrahydropyrazino[1,2-b]indazole (xxxxxi) (194 mg, 0.457 mmol, 68.6%) as a beige solid. $^1$H NMR (300 MHz, DMSO-$d_6$) δ 3.04 (2H, t, J=5.5 Hz), 3.75 (3H, s), 3.77 (2H, s), 4.24 (2H, s), 4.44 (2H, t, J=5.3 Hz), 6.89-6.97 (2H, m), 7.28-7.34 (2H, m), 7.36 (1H, d, J=5.6 Hz).

A mixture of 1-methyl-3-(4,4,5,5-tetramethyl-1,3,2-dioxaborolan-2-yl)-1H-pyrazole (140 mg, 0.67 mmol), 10-bromo-8-chloro-7-fluoro-2-(4-methoxybenzyl)-1,2,3,4-tetrahydropyrazino[1,2-b]indazole (xxxxxi) (191 mg, 0.45 mmol), $PdCl_2$(dppf) (32.9 mg, 0.04 mmol), cesium carbonate (440 mg, 1.35 mmol), DME (2.5 mL) and water (0.5 mL) was heated at 120° C. for 1 h under microwave irradiation. The crude was filtered through Celite and concentrated under reduced pressure. The crude was suspended in EtOAc (15 mL) and filtered through Celite again. The filtrate was concentrated under reduced pressure and purified by column chromatography (NH silica, 10-60% EtOAc/hexane) to afford 8-chloro-7-fluoro-2-(4-methoxybenzyl)-10-(1-methyl-1H-pyrazol-3-yl)-1,2,3,4-tetrahydropyrazino[1,2-b]indazole (xxxxxii) (66 mg, 0.155 mmol, 34.5%) as a yellow solid. 1H NMR (300 MHz, DMSO-d6) δ 3.06 (2H, br s), 3.75 (8H, s), 4.03 (2H, br s), 4.49 (2H, br s), 6.62 (1H, d, J=1.9 Hz), 6.92 (2H, d, J=8.7 Hz), 7.15 (1H, d, J=6.0 Hz), 7.29 (2H, br d, J=8.3 Hz), 7.72 (1H, d, J=2.3 Hz).

A solution of 8-chloro-7-fluoro-2-(4-methoxybenzyl)-10-(1-methyl-1H-pyrazol-3-yl)-1,2,3,4-tetrahydropyrazino[1,2-b]indazole (xxxxxii) (166 mg, 0.39 mmol) in 2,2,2-trifluoroacetic acid (5 ml, 0.39 mmol) was stirred at 85° C. under Ar atmosphere for 2 hours, then at 70° C. overnight (12 hours). The reaction mixture was concentrated under reduced pressure (co-evaporate with toluene 5 mL×2) to give a dark green oil. To the crude material was added saturated aqueous $NaHCO_3$ (10 mL) and extracted with EtOAc (20 mL×2). The combined organic layer was washed with brine (5 mL), dried over Na2SO4, and concentrated to give 8-chloro-7-fluoro-10-(1-methyl-1H-pyrazol-3-yl)-1,2,3,4-tetrahydropyrazino[1,2-b]indazole (xxxxxiii) (179 mg, quant., 66% purity) as a dark green amorphous solid. This material was used without further purification. $^1$H NMR (300 MHz, DMSO-$d_6$) δ 3.21 (2H, t, J=5.5 Hz), 3.62-3.78 (1H, m), 3.92 (3H, s), 4.28 (2H, s), 4.34 (2H, t, J=5.5 Hz), 6.64 (1H, d, J=2.3 Hz), 7.13 (1H, d, J=6.4 Hz), 7.79 (1H, d, J=2.3 Hz).

To a solution of 8-chloro-7-fluoro-10-(1-methyl-1H-pyrazol-3-yl)-1,2,3,4-tetrahydropyrazino[1,2-b]indazole (xxxxxiii) (119 mg, 0.39 mmol), 2-hydroxyacetic acid (38.6 mg, 0.51 mmol), and DIPEA (0.170 ml, 0.98 mmol) in DMF(dry) (2 ml) was added HATU (222 mg, 0.59 mmol) at room temperature and stirred the mixture at room temperature for 3 hours. The reaction was diluted with water (10 mL) and extracted with EtOAc (15 mL×2). The combined organic layer was washed with brine (5 mL), dried over $Na_2SO_4$, and concentrated under reduced pressure. Purification by column chromatography (silica gel, 0-5% MeOH/

EtOAc) afforded an yellow oil. Further purification by column chromatography (silica gel, 0-3% MeOH/EtOAc) afforded a white solid (contains impurity). Another column chromatography (NH silica, 0-4% MeOH/EtOAc) afforded a white solid that was suspended in EtOAc and filtered to give 1-(8-chloro-7-fluoro-10-(1-methyl-1H-pyrazol-3-yl)-3,4-dihydropyrazino[1,2-b]indazol-2(1H)-yl)-2-hydroxyethan-1-one (64) (33.0 mg, 0.091 mmol, 16% in 2 steps) as a white solid. $_1$H NMR (300 MHz, DMSO-d$_6$) δ 3.97 (4H, br d, J=7.5 Hz), 4.03-4.11 (1H, m), 4.25 (2H, br d, J=4.5 Hz), 4.41-4.63 (2H, m), 4.81-4.98 (1H, m), 5.15-5.35 (2H, m), 6.75 (1H, br d, J=8.7 Hz), 7.19-7.36 (1H, m), 7.83 (1H, s).

Examples 67-71 can be produced by employing a similar synthetic process and method as described in this Example 64 synthesis.

Example 67: 1-[7,8-Dichloro-10-(1-methyl-1H-pyrazol-3-yl)-3,4-dihydropyrazino[1,2-b]indazol-2(1H)-yl]-2-hydroxyethan-1-one

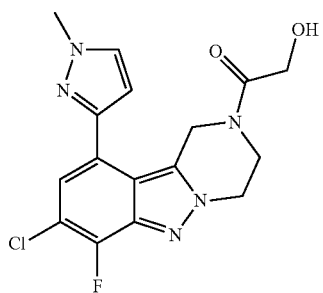 [SMILES: Cn1ccc(-c2cc(Cl)c(F)c3nn4c(c23)CN(C(=O)CO)CC4)n1]

Example 67 was obtained as a white solid in a manner similar to that described for the synthesis of Example 64. $^1$H NMR (300 MHz, DMSO-d$_6$) δ 3.89-4.30 (7H, m), 4.43-4.65 (2H, m), 4.81-4.98 (1H, m), 5.17-5.36 (2H, m), 6.71-6.84 (1H, m), 7.31-7.45 (1H, m), 7.77-7.91 (1H, m).

Example 68: 1-[7,8-Dichloro-10-(1-methyl-1H-pyrazol-3-yl)-3,4-dihydropyrazino[1,2-b]indazol-2(1H)-yl]-2-methoxyethan-1-one

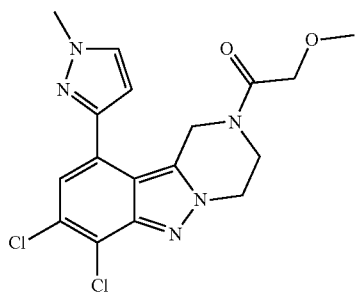 [SMILES: COCC(=O)N1CCn2nc3c(Cl)c(Cl)cc(-c4ccn(C)n4)c3c2C1]

Example 68 was obtained as a white solid in a manner similar to that described for the synthesis of Example 64. $^1$H NMR (400 MHz, DMSO-d$_6$) δ 3.29-3.32 (3H, m), 3.96-4.01 (3H, m), 4.01-4.09 (2H, m), 4.23-4.28 (2H, m), 4.48-4.60 (2H, m), 5.18-5.34 (2H, m), 6.80 (1H, d, J=15.2 Hz), 7.33-7.43 (1H, m), 7.86 (1H, s).

Example 69: 1-[7-Chloro-10-(1-methyl-1H-pyrazol-3-yl)-3,4-dihydropyrazino[1,2-b]indazol-2(1H)-yl]-2-hydroxyethan-1-one

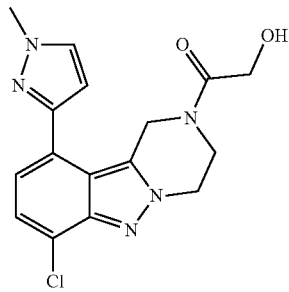 [SMILES: Cn1ccc(-c2ccc(Cl)c3nn4c(c23)CN(C(=O)CO)CC4)n1]

Example 69 was obtained as a white solid in a manner similar to that described for the synthesis of Example 64. $^1$H NMR (300 MHz, DMSO-d$_6$) δ 3.90-4.10 (5H, m), 4.21-4.29 (2H, m), 4.44-4.63 (2H, m), 4.83-4.93 (1H, m), 5.14-5.25 (1H, m), 5.30 (1H, s), 6.66 (1H, br d, J=7.53 Hz), 7.15-7.26 (1H, m), 7.39 (1H, d, J=7.53 Hz), 7.82 (1H, s).

Example 70: 1-[8-Chloro-7-fluoro-10-(5-methyl-1,3,4-oxadiazol-2-yl)-3,4-dihydropyrazino[1,2-b]indazol-2(1H)-yl]-2-hydroxyethan-1-one

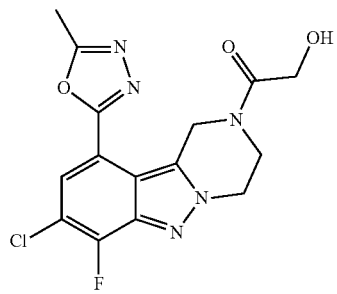 [SMILES: Cc1nnc(-c2cc(Cl)c(F)c3nn4c(c23)CN(C(=O)CO)CC4)o1]

Example 70 was obtained as a white solid in a manner similar to that described for the synthesis of Example 64. $^1$H NMR (400 MHz, DMSO-d$_6$) δ 2.64 (3H, s), 3.95-4.15 (2H, m), 4.19-4.35 (2H, m), 4.48-4.68 (2H, m), 4.93 (1H, br s), 5.40 (2H, br s), 7.62-7.81 (1H, m).

Example 71: 1-[8-Chloro-7-fluoro-10-(3-methyl-1,2,4-oxadiazol-5-yl)-3,4-dihydropyrazino[1,2-b]indazol-2(1H)-yl]-2-hydroxyethan-1-one

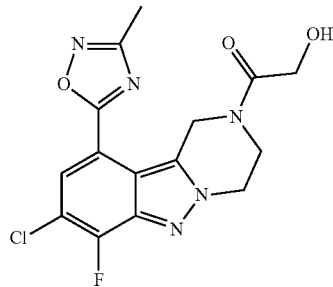 [SMILES: Cc1noc(-c2cc(Cl)c(F)c3nn4c(c23)CN(C(=O)CO)CC4)n1]

Example 71 was obtained as a white solid in a manner similar to that described for the synthesis of Example 64. $^1$H NMR (400 MHz, DMSO-$d_6$) δ 3.97-4.16 (3H, m), 4.26 (3H, br d, J=11.0 Hz), 4.50-4.69 (3H, m), 4.92 (1H, br d, J=3.4 Hz), 5.39 (2H, s), 7.92 (1H, d, J=5.9 Hz).

Examples 72-74 can be produced by employing a similar synthetic process and method as described in this Examples 25 or 34 synthesis.

Example 72: 1-[6-Chloro-9-(1-methyl-1H-pyrazol-3-yl)-1,3,4,5-tetrahydro-2H-pyrrolo[3,2-c:4,5-c']dipyridin-2-yl]-2-hydroxyethan-1-one

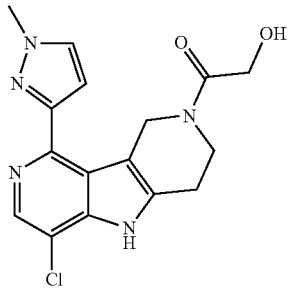 [SMILES: Cn1ccc(-c2ncc(Cl)c3[nH]c4c(c23)CN(C(=O)CO)CC4)n1]

Example 72 was obtained as a white solid in a manner similar to that described for the synthesis of Example 25. $^1$H NMR (400 MHz, DMSO-$d_6$) δ 2.84-2.98 (2H, m), 3.64-3.73 (1H, m), 3.83-3.90 (1H, m), 3.92-4.03 (3H, m), 4.16-4.27 (2H, m), 4.58 (1H, brs), 4.90 (2H, s), 6.761-6.80 (1H, m), 7.79 (1H, s), 8.16-8.19 (1H, m), 11.93 (1H, brs).

Example 73: 1-[6-Chloro-9-(1-methyl-1H-pyrazol-3-yl)-1,3,4,5-tetrahydro-2H-pyrrolo[3,2-c:4,5-c']dipyridin-2-yl]-2-methoxyethan-1-one

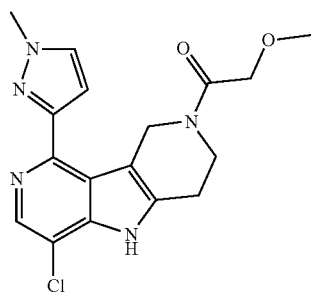

Example 73 was obtained as a white solid in a manner similar to that described for the synthesis of Example 25. $^1$H NMR (400 MHz, DMSO-$d_6$) δ 2.83-2.97 (2H, m), 3.27-3.32 (3H, m), 3.69-3.89 (2H, m), 3.93-4.02 (2H, m), 4.15-4.22 (2H, m), 4.80-5.01 (2H, m), 6.73-6.80 (1H, m), 7.79 (1H, s), 8.15-8.20 (1H, m), 11.88-11.99 (1H, m).

Example 74: 1-[6-Chloro-5-methyl-9-(1-methyl-1H-pyrazol-3-yl)-1,3,4,5-tetrahydro-2H-pyrrolo[3,2-c:4,5-c']dipyridin-2-yl]-2-hydroxyethan-1-one

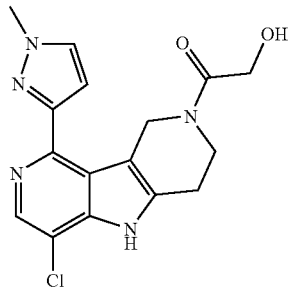 [SMILES: Cn1ccc(-c2ncc(Cl)c3[nH]c4c(c23)CN(C(=O)CO)CC4)n1]

Example 74 was obtained as a white solid in a manner similar to that described for the synthesis of Example 34. $^1$H NMR (400 MHz, DMSO-$d_6$) δ 2.83-2.97 (2H, m), 3.68-3.77 (1H, m), 3.85-3.90 (1H, m), 3.92-4.01 (6H, m), 4.09-4.28 (2H, m), 4.62 (1H, brs), 4.71-4.87 (2H, m), 6.66-6.81 (1H, m), 7.80 (1H, s), 8.12-8.17 (1H, m).

Examples 75-82 can be produced by employing a similar synthetic process and method as described in this Example 1 synthesis.

Example 75: 1-(3-Chloro-4-fluoro-2-methoxy-5,6,7,9-tetrahydro-8H-pyrrolo[3,2-b:4,5-c']dipyridin-8-yl)-2-hydroxyethan-1-one

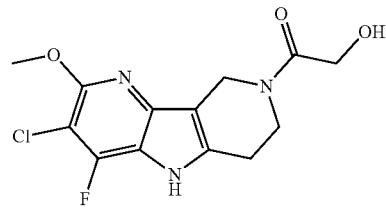 [SMILES: COc1nc2c3c([nH]c2c(F)c1Cl)CCN(C(=O)CO)C3]

Example 75 was obtained as a white solid in a manner similar to that described for the synthesis of Example 1. $^1$H NMR (400 MHz, DMSO-$d_6$) δ 2.75-2.95 (2H, m), 3.65-3.90 (2H, m), 3.97 (3H, s), 4.21-4.25 (2H, m), 4.51-4.75 (3H, m), 11.77-11.81 (1H, m).

Example 76: 1-(3,4-Dichloro-2-methoxy-6,6-dimethyl-5,6,7,9-tetrahydro-8H-pyrrolo[3,2-b:4,5-c']dipyridin-8-yl)-2-hydroxyethan-1-one

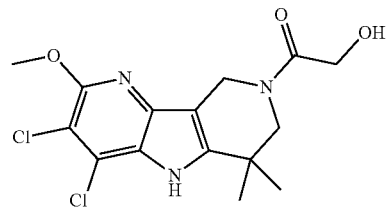 [SMILES: COc1nc2c3c([nH]c2c(Cl)c1Cl)C(C)(C)CN(C(=O)CO)C3]

Example 76 was obtained as a white solid in a manner similar to that described for the synthesis of Example 1. $^1$H NMR (400 MHz, DMSO-d$_6$) δ 1.31 (3H, s), 1.34 (3H, s), 3.42-3.67 (2H, m), 3.97 (3H, s), 4.21-4.26 (2H, m), 4.50-4.65 (2H, m), 4.69 (1H, brs), 11.56 (1H, brs).

Example 77: 1-(3,4-Dichloro-2-ethoxy-5,6,7,9-tetrahydro-8H-pyrrolo[3,2-b:4,5-c']dipyridin-8-yl)-2-hydroxyethan-1-one

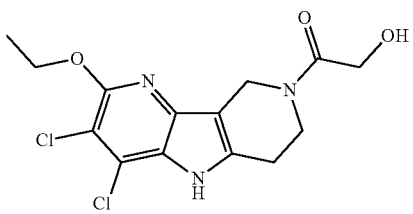 [SMILES: CCOc1nc2c3c([nH]c2c(Cl)c1Cl)CCN(C(=O)CO)C3]

Example 77 was obtained as a white solid in a manner similar to that described for the synthesis of Example 1. $^1$H NMR (400 MHz, DMSO-d$_6$) δ 1.39 (3H, t, J=7.2 Hz), 2.89 (2H, t, J=5.6 Hz), 3.80 (2H, s), 4.19-4.25 (2H, m), 4.41 (1H, brs), 4.46 (2H, q, J=7.2 Hz), 4.62 (2H, s), 11.37 (1H, s).

Example 78: 1-(3-Chloro-2-ethoxy-4-fluoro-5,6,7,9-tetrahydro-8H-pyrrolo[3,2-b:4,5-c']dipyridin-8-yl)-2-hydroxyethan-1-one

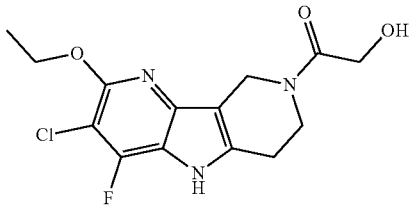 [SMILES: CCOc1nc2c3c([nH]c2c(F)c1Cl)CCN(C(=O)CO)C3]

Example 78 was obtained as a white solid in a manner similar to that described for the synthesis of Example 1. $^1$H NMR (400 MHz, DMSO-d$_6$) δ 1.37 (3H, t, J=7.2 Hz), 2.77-2.95 (2H, m), 3.68-3.73 (1H, m), 3.86-3.88 (1H, m), 4.21-4.25 (2H, m), 4.38-4.46 (2H, m), 4.51-4.66 (2H, m), 11.77-11.81 (2H, m).

Example 79: 1-[3,4-Dichloro-2-(cyclopropylmethoxy)-5,6,7,9-tetrahydro-8H-pyrrolo[3,2-b:4,5-c']dipyridin-8-yl]-2-hydroxyethan-1-one

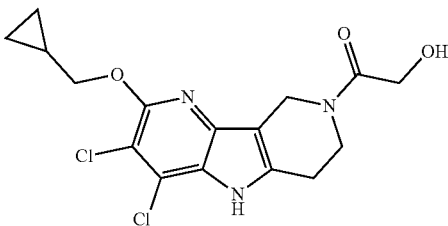 [SMILES: O=C(CO)N1CCc2[nH]c3c(Cl)c(Cl)c(OCC4CC4)nc3c2C1]

Example 79 was obtained as a white solid in a manner similar to that described for the synthesis of Example 1. $^1$H NMR (400 MHz, DMSO-d$_6$) δ 0.36-0.43 (2H, m), 0.54-0.61 (2H, m), 1.28-1.31 (1H, m), 2.87-2.91 (2H, m), 3.77-3.81 (2H, m), 4.22 (2H, s), 4.28 (2H, d, J=7.2 Hz), 4.40-4.43 (1H, m), 4.61 (2H, s), 11.37 (1H, s).

Example 80: 1-[3-Chloro-2-(cyclopropylmethoxy)-4-fluoro-5,6,7,9-tetrahydro-8H-pyrrolo[3,2-b:4,5-c']dipyridin-8-yl]-2-hydroxyethan-1-one

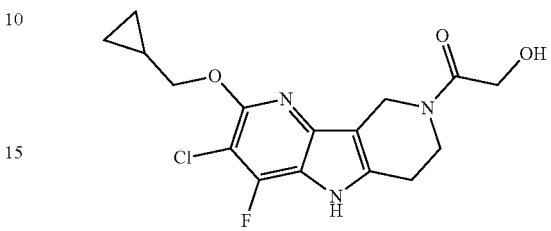

Example 80 was obtained as an off-white solid in a manner similar to that described for the synthesis of Example 1. $^1$H NMR (400 MHz, DMSO-d$_6$) δ 0.31-0.42 (2H, m), 0.50-0.62 (2H, m), 1.25-1.37 (1H, m), 2.75-2.99 (2H, m), 3.65-3.96 (2H, m), 4.14-4.30 (4H, m), 4.50-4.80 (3H, m), 11.76-11.81 (1H, m).

Example 81: 1-[3,4-Dichloro-2-(difluoromethoxy)-5,6,7,9-tetrahydro-8H-pyrrolo[3,2-b:4,5-c']dipyridin-8-yl]-2-hydroxyethan-1-one

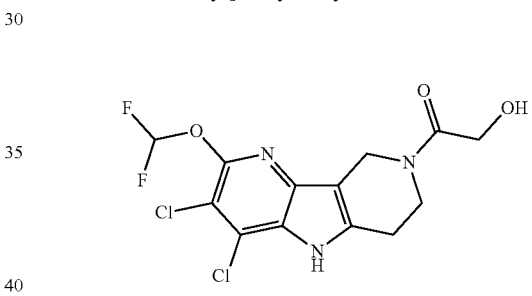

Example 81 was obtained as a white solid in a manner similar to that described for the synthesis of Example 1. $^1$H NMR (400 MHz, DMSO-d$_6$) δ 2.91-2.95 (2H, m), 3.80-3.84 (2H, m), 4.23 (2H, s), 4.43 (1H, brs), 4.64 (2H, s) 7.69 (1H, t, J=72.8 Hz), 11.78 (1H, s).

Example 82: 1-[3-Chloro-2-(difluoromethoxy)-4-fluoro-5,6,7,9-tetrahydro-8H-pyrrolo[3,2-b:4,5-c']dipyridin-8-yl]-2-hydroxyethan-1-one

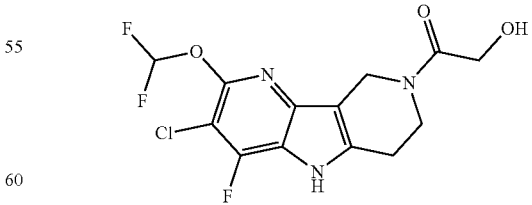

Example 82 was obtained as a red solid in a manner similar to that described for the synthesis of Example 1. $^1$H NMR (400 MHz, DMSO-d$_6$) δ 2.09 (3H, s), 2.78-3.03 (2H, m), 3.70-3.90 (2H, m), 4.54-4.67 (2H, m), 4.87-4.98 (2H, m), 7.54-7.99 (1H, m), 12.10-12.28 (1H, m).

Representative compounds of the present invention are shown in Table 1:

TABLE 1

| Example No. | Structure | Name |
|---|---|---|
| 1 | | 1-(3,4-dichloro-2-methoxy-5,6,7,9-tetrahydro-8H-pyrrolo[3,2-b:4,5-c']dipyridin-8-yl)-2-hydroxyethan-1-one |
| 2 | | 1-(7-chloro-1,3,4,5-tetrahydro-2H-pyrrolo[3,2-c:4,5-c']dipyridin-2-yl)-2-methoxyethan-1-one |
| 3 | | 1-(7,8-dichloro-3,4-dihydropyrazino[1,2-b]indazol-2(1H)-yl)-2-methoxyethan-1-one |
| 4 | | 1-(7,8-dichloro-3,4-dihydropyrazino[1,2-b]indazol-2(1H)-yl)-2-hydroxyethan-1-one |
| 5 | | 1-(7,8-dichloro-3,4-dihydropyrazolo[1,5-a:4,3-c']dipyridin-2(1H)-yl)-2-methoxyethan-1-one |

TABLE 1-continued

| Example No. | Structure | Name |
|---|---|---|
| 6 | | 1-(7,8-dichloro-3,4-dihydropyrazolo[1,5-a:4,3-c']dipyridin-2(1H)-yl)-2-hydroxyethan-1-one |
| 7 | | 1-(3,4-dichloro-2-methoxy-5,6,7,9-tetrahydro-8H-pyrrolo[3,2-b:4,5-c']dipyridin-8-yl)-2-methoxyethan-1-one |
| 8 | | 1-(3-chloro-4-fluoro-2-methoxy-5,6,7,9-tetrahydro-8H-pyrrolo[3,2-b:4,5-c']dipyridin-8-yl)-2-hydroxyethan-1-one |
| 9 | | (3,4-dichloro-2-methoxy-5,6,7,9-tetrahydro-8H-pyrrolo[3,2-b:4,5-c']dipyridin-8-yl)(oxetan-2-yl)methanone |
| 10 | | 1-(3-bromo-4-chloro-2-methoxy-5,6,7,9-tetrahydro-8H-pyrrolo[3,2-b:4,5-c']dipyridin-8-yl)-2-hydroxyethan-1-one |

TABLE 1-continued

| Example No. | Structure | Name |
|---|---|---|
| 11 | | 1-(3,4-dichloro-2-methoxy-6-methyl-5,6,7,9-tetrahydro-8H-pyrrolo+3,2-b:4,5-c']dipyridin-8-yl)-2-hydroxyethan-1-one |
| 12 | | 1-(3-bromo-4-fluoro-2-methoxy-5,6,7,9-tetrahydro-8H-pyrrolo[3,2-b:4,5-c']dipyridin-8-yl)-2-hydroxyethan-1-one |
| 13 | | 1-(3,4-dichloro-2-methoxy-6,7,9,10-tetrahydropyrido[2',3':4,5]pyrrolo[2,3-d]azepin-8(5H)-yl)-2-hydroxyethan-1-one |
| 14 | | 1-(3,4-dichloro-2-methoxy-5-methyl-5,6,7,9-tetrahydro-8H-pyrrolo[3,2-b:4,5-c']dipyridin-8-yl)-2-hydroxyethan-1-one |
| 15 | | 1-(3-bromo-4-chloro-2-methoxy-5-methyl-5,6,7,9-tetrahydro-8H-pyrrolo[3,2-b:4,5-c']dipyridin-8-yl)-2-hydroxyethan-1-one |

TABLE 1-continued

| Example No. | Structure | Name |
|---|---|---|
| 16 | | 1-(3-bromo-4-chloro-2-methoxy-5,6,7,9-tetrahydro-8H-pyrrolo[3,2-b:4,5-c']dipyridin-8-yl)-2-methoxyethan-1-one |
| 17 | | 1-(3-bromo-4-fluoro-2-methoxy-5,6,7,9-tetrahydro-8H-pyrrolo[3,2-b:4,5-c']dipyridin-8-yl)-2-methoxyethan-1-one |
| 18 | | (3-bromo-4-chloro-2-methoxy-5,6,7,9-tetrahydro-8H-pyrrolo[3,2-b:4,5-c']dipyridin-8-yl)(oxetan-2-yl)methanone |
| 19 | | (3-bromo-4-fluoro-2-methoxy-5,6,7,9-tetrahydro-8H-pyrrolo[3,2-b:4,5-c']dipyridin-8-yl)(oxetan-2-yl)methanone |
| 20 | | 1-(3-bromo-4-chloro-2-methoxy-6-methyl-5,6,7,9-tetrahydro-8H-pyrrolo[3,2-b:4,5-c']dipyridin-8-yl)-2-hydroxyethan-1-one |

TABLE 1-continued

| Example No. | Structure | Name |
|---|---|---|
| 21 | 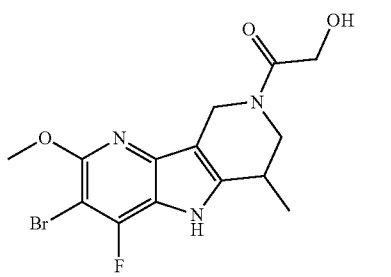 [SMILES: COc1nc2c3c([nH]c2c(F)c1Br)C(C)CN(C(=O)CO)C3] | 1-(3-bromo-4-fluoro-2-methoxy-6-methyl-5,6,7,9-tetrahydro-8H-pyrrolo[3,2-b:4,5-c']dipyridin-8-yl)-2-hydroxyethan-1-one |
| 22 | 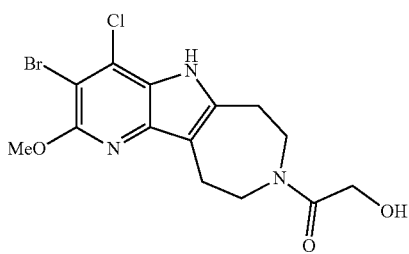 [SMILES: COc1nc2c3c([nH]c2c(Cl)c1Br)CCN(C(=O)CO)CC3] | 1-(3-bromo-4-chloro-2-methoxy-6,7,9,10-tetrahydropyrido[2',3':4,5]pyrrolo[2,3-d]azepin-8(5H)-yl)-2-hydroxyethan-1-one |
| 23 | 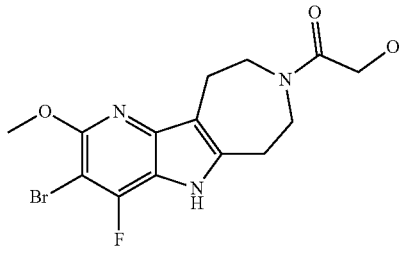 | 1-(3-bromo-4-fluoro-2-methoxy-6,7,9,10-tetrahydropyrido[2',3':4,5]pyrrolo[2,3-d]azepin-8(5H)-yl)-2-hydroxyethan-1-one |
| 24 | 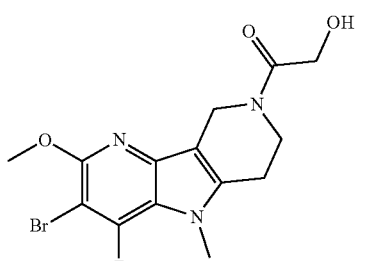 | 1-(3-bromo-4-fluoro-2-methoxy-5-methyl-5,6,7,9-tetrahydro-8H-pyrrolo[3,2-b:4,5-c']dipyridin-8-yl)-2-hydroxyethan-1-one |
| 25 | 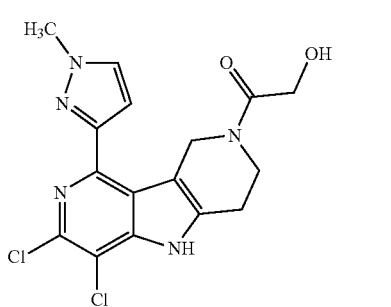 [SMILES: Cn1ccc(-c2nc(Cl)c(Cl)c3[nH]c4c(c23)CN(C(=O)CO)CC4)n1] | 1-[6,7-dichloro-9-(1-methyl-1H-pyrazol-3-yl)-1,3,4,5-tetrahydro-2H-pyrrolo[3,2-c:4,5-c']dipyridin-2-yl]-2-hydroxyethan-1-one |

TABLE 1-continued

| Example No. | Structure | Name |
|---|---|---|
| 26 | | 1-(6-chloro-7-methyl-9-(1-methyl-1H-pyrazol-3-yl)-1,3,4,5-tetrahydro-2H-pyrrolo[3,2-c:4,5-c']dipyridin-2-yl)-2-hydroxyethan-1-one |
| 27 | | 1-(7-chloro-6-fluoro-9-(1-methyl-1H-pyrazol-3-yl)-1,3,4,5-tetrahydro-2H-pyrrolo[3,2-c:4,5-c']dipyridin-2-yl)-2-hydroxyethan-1-one |
| 28 | | 1-(7-chloro-6-methyl-9-(1-methyl-1H-pyrazol-3-yl)-1,3,4,5-tetrahydro-2H-pyrrolo[3,2-c:4,5-c']dipyridin-2-yl)-2-hydroxyethan-1-one |
| 29 | | 1-(6-chloro-7-fluoro-9-(1-methyl-1H-pyrazol-3-yl)-1,3,4,5-tetrahydro-2H-pyrrolo[3,2-c:4,5-c']dipyridin-2-yl)-2-hydroxyethan-1-one |
| 30 | | 1-[6,7-dichloro-9-(1-methyl-1H-pyrazol-3-yl)-1,3,4,5-tetrahydro-2H-pyrrolo[3,2-c:4,5-c']dipyridin-2-yl]-2-methoxyethan-1-one |

TABLE 1-continued

| Example No. | Structure | Name |
|---|---|---|
| 31 | | 1-(6-bromo-7-fluoro-9-(1-methyl-1H-pyrazol-3-yl)-1,3,4,5-tetrahydro-2H-pyrrolo[3,2-c:4,5-c']dipyridin-2-yl)-2-hydroxyethan-1-one |
| 32 | | (6,7-dichloro-9-(1-methyl-1H-pyrazol-3-yl)-1,3,4,5-tetrahydro-2H-pyrrolo[3,2-c:4,5-c']dipyridin-2-yl)(oxetan-2-yl)methanone |
| 33 | | 1-(6-bromo-7-chloro-9-(1-methyl-1H-pyrazol-3-yl)-1,3,4,5-tetrahydro-2H-pyrrolo[3,2-c:4,5-c']dipyridin-2-yl)-2-hydroxyethan-1-one |
| 34 | | 1-[6,7-dichloro-5-methyl-9-(1-methyl-1H-pyrazol-3-yl)-1,3,4,5-tetrahydro-2H-pyrrolo[3,2-c:4,5-c']dipyridin-2-yl]-2-hydroxyethan-1-one |
| 35 | | 1-(6,7-dichloro-4-methyl-9-(1-methyl-1H-pyrazol-3-yl)-1,3,4,5-tetrahydro-2H-pyrrolo[3,2-c:4,5-c']dipyridin-2-yl)-2-hydroxyethan-1-one |

TABLE 1-continued

| Example No. | Structure | Name |
|---|---|---|
| 36 | | 1-(6,7-dichloro-9-(1-methyl-1H-pyrazol-4-yl)-1,3,4,5-tetrahydro-2H-pyrrolo[3,2-c:4,5-c']dipyridin-2-yl)-2-hydroxyethan-1-one |
| 37 | | 1-(6,7-dichloro-4,4-dimethyl-9-(1-methyl-1H-pyrazol-3-yl)-1,3,4,5-tetrahydro-2H-pyrrolo[3,2-c:4,5-c']dipyridin-2-yl)-2-hydroxyethan-1-one |
| 38 | | 1-(6,7-dichloro-9-(1-(difluoromethyl)-1H-pyrazol-4-yl)-1,3,4,5-tetrahydro-2H-pyrrolo[3,2-c:4,5-c']dipyridin-2-yl)-2-hydroxyethan-1-one |
| 39 | | 1-(6',7'-dichloro-9'-(1-methyl-1H-pyrazol-3-yl)-1',5'-dihydrospiro[cyclopropane-1,4'-pyrrolo[3,2-c:4,5-c']dipyridin]-2'(3'H)-yl)-2-hydroxyethan-1-one |
| 40 | | 1-(6,7-dichloro-9-(2-methyl-2H-1,2,3-triazol-4-yl)-1,3,4,5-tetrahydro-2H-pyrrolo[3,2-c:4,5-c']dipyridin-2-yl)-2-hydroxyethan-1-one |

TABLE 1-continued

| Example No. | Structure | Name |
|---|---|---|
| 41 | | 1-(3,4-dichloro-1-(1-methyl-1H-pyrazol-3-yl)-6,7,9,10-tetrahydropyrido[3',4': 4,5]pyrrolo[2,3-d]azepin-8(5H)-yl)-2-hydroxyethan-1-one |
| 42 | | 1-(6,7-dichloro-9-(2-(difluoromethyl)-2H-1,2,3-triazol-4-yl)-1,3,4,5-tetrahydro-2H-pyrrolo[3,2-c:4,5-c']dipyridin-2-yl)-2-hydroxyethan-1-one |
| 43 | | 1-(6,7-dichloro-9-(1-(difluoromethyl)-1H-pyrazol-3-yl)-1,3,4,5-tetrahydro-2H-pyrrolo[3,2-c:4,5-c']dipyridin-2-yl)-2-hydroxyethan-1-one |
| 44 | | 1-(6,7-dichloro-9-(1-methyl-1H-1,2,4-triazol-3-yl)-1,3,4,5-tetrahydro-2H-pyrrolo[3,2-c:4,5-c']dipyridin-2-yl)-2-hydroxyethan-1-one |
| 45 | | 1-(6,7-dichloro-9-(3-methyl-1,2,4-oxadiazol-5-yl)-1,3,4,5-tetrahydro-2H-pyrrolo[3,2-c:4,5-c']dipyridin-2-yl)-2-hydroxyethan-1-one |

TABLE 1-continued

| Example No. | Structure | Name |
|---|---|---|
| 46 | | 1-(6,7-dichloro-9-(6-methoxypyridin-2-yl)-1,3,4,5-tetrahydro-2H-pyrrolo[3,2-c:4,5-c']dipyridin-2-yl)-2-hydroxyethan-1-one |
| 47 | | 1-(6,7-dichloro-9-(5-methyl-1,3,4-oxadiazol-2-yl)-1,3,4,5-tetrahydro-2H-pyrrolo[3,2-c:4,5-c']dipyridin-2-yl)-2-hydroxyethan-1-one |
| 48 | | 1-(6,7-dichloro-9-(3-methoxypyridin-2-yl)-1,3,4,5-tetrahydro-2H-pyrrolo[3,2-c:4,5-c']dipyridin-2-yl)-2-hydroxyethan-1-one |
| 49 | | 1-(6,7-dichloro-9-(2-fluorophenyl)-1,3,4,5-tetrahydro-2H-pyrrolo[3,2-c:4,5-c']dipyridin-2-yl)-2-hydroxyethan-1-one |
| 50 | | 1-(6,7-dichloro-9-(2-methoxypyridin-4-yl)-1,3,4,5-tetrahydro-2H-pyrrolo[3,2-c:4,5-c']dipyridin-2-yl)-2-hydroxyethan-1-one |

TABLE 1-continued

| Example No. | Structure | Name |
|---|---|---|
| 51 | | 1-(6,7-dichloro-9-(5-fluoropyridin-3-yl)-1,3,4,5-tetrahydro-2H-pyrrolo[3,2-c:4,5-c']dipyridin-2-yl)-2-hydroxyethan-1-one |
| 52 | | 1-(6,7-dichloro-9-(5-methoxypyridin-3-yl)-1,3,4,5-tetrahydro-2H-pyrrolo[3,2-c:4,5-c']dipyridin-2-yl)-2-hydroxyethan-1-one |
| 53 | | 1-(6,7-dichloro-9-(pyrimidin-5-yl)-1,3,4,5-tetrahydro-2H-pyrrolo[3,2-c:4,5-c']dipyridin-2-yl)-2-hydroxyethan-1-one |
| 54 | | 1-(6,7-dichloro-9-(3,4-dihydro-2H-pyran-6-yl)-1,3,4,5-tetrahydro-2H-pyrrolo[3,2-c:4,5-c']dipyridin-2-yl)-2-hydroxyethan-1-one |
| 55 | | 1-(6,7-dichloro-9-(tetrahydro-2H-pyran-2-yl)-1,3,4,5-tetrahydro-2H-pyrrolo[3,2-c:4,5-c']dipyridin-2-yl)-2-hydroxyethan-1-one |

TABLE 1-continued

| Example No. | Structure | Name |
|---|---|---|
| 56 | | 1-(6-chloro-7-fluoro-9-methoxy-1,3,4,5-tetrahydro-2H-pyrrolo[3,2-c:4,5-c']dipyridin-2-yl)-2-hydroxyethan-1-one |
| 57 | | 1-(6,7-dichloro-9-(furan-2-yl)-1,3,4,5-tetrahydro-2H-pyrrolo[3,2-c:4,5-c']dipyridin-2-yl)-2-hydroxyethan-1-one |
| 58 | | 1-(6,7-dichloro-9-cyclopropoxy-1,3,4,5-tetrahydro-2H-pyrrolo[3,2-c:4,5-c']dipyridin-2-yl)-2-hydroxyethan-1-one |
| 59 | | 1-(6,7-dichloro-9-(thiophen-2-yl)-1,3,4,5-tetrahydro-2H-pyrrolo[3,2-c:4,5-c']dipyridin-2-yl)-2-hydroxyethan-1-one |
| 60 | | 1-(7-chloro-9-cyclopropoxy-6-fluoro-1,3,4,5-tetrahydro-2H-pyrrolo[3,2-c:4,5-c']dipyridin-2-yl)-2-hydroxyethan-1-one |

TABLE 1-continued

| Example No. | Structure | Name |
|---|---|---|
| 61 | | 1-(6,7-dichloro-9-methoxy-1,3,4,5-tetrahydro-2H-pyrrolo[3,2-c:4,5-c']dipyridin-2-yl)-2-hydroxyethan-1-one |
| 62 | | 1-(6-chloro-9-cyclopropoxy-7-fluoro-1,3,4,5-tetrahydro-2H-pyrrolo[3,2-c:4,5-c']dipyridin-2-yl)-2-hydroxyethan-1-one |
| 63 | | 1-(7-chloro-6-fluoro-9-methoxy-1,3,4,5-tetrahydro-2H-pyrrolo[3,2-c:4,5-c']dipyridin-2-yl)-2-hydroxyethan-1-one |
| 64 | | 1-[8-chloro-7-fluoro-10-(1-methyl-1H-pyrazol-3-yl)-3,4-dihydropyrazino[1,2-b]indazol-2(1H)-yl]-2-hydroxyethan-1-one |
| 65 | | 1-(8-bromo-7-chloro-10-(1-methyl-1H-pyrazol-3-yl)-3,4-dihydropyrazino[1,2-b]indazol-2(1H)-yl)-2-hydroxyethan-1-one |

TABLE 1-continued

| Example No. | Structure | Name |
|---|---|---|
| 66 | | 1-(8-bromo-7-fluoro-10-(1-methyl-1H-pyrazol-3-yl)-3,4-dihydropyrazino[1,2-b]indazol-2(1H)-yl)-2-hydroxyethan-1-one |
| 67 | | 1-[7,8-dichloro-10-(1-methyl-1H-pyrazol-3-yl)-3,4-dihydropyrazino[1,2-b]indazol-2(1H)-yl]-2-hydroxyethan-1-one |
| 68 | | 1-[7,8-dichloro-10-(1-methyl-1H-pyrazol-3-yl)-3,4-dihydropyrazino[1,2-b]indazol-2(1H)-yl]-2-methoxyethan-1-one |
| 69 | | 1-[7-chloro-10-(1-methyl-1H-pyrazol-3-yl)-3,4-dihydropyrazino[1,2-b]indazol-2(1H)-yl]-2-hydroxyethan-1-one |
| 70 | | 1-[8-chloro-7-fluoro-10-(5-methyl-1,3,4-oxadiazol-2-yl)-3,4-dihydropyrazino[1,2-b]indazol-2(1H)-yl]-2-hydroxyethan-1-one |

TABLE 1-continued

| Example No. | Structure | Name |
|---|---|---|
| 71 | | 1-[8-chloro-7-fluoro-10-(3-methyl-1,2,4-oxadiazol-5-yl)-3,4-dihydropyrazino[1,2-b]indazol-2(1H)-yl]-2-hydroxyethan-1-one |
| 72 | | 1-[6-chloro-9-(1-methyl-1H-pyrazol-3-yl)-1,3,4,5-tetrahydro-2H-pyrrolo[3,2-c:4,5-c']dipyridin-2-yl]-2-hydroxyethan-1-one |
| 73 | | 1-[6-chloro-9-(1-methyl-1H-pyrazol-3-yl)-1,3,4,5-tetrahydro-2H-pyrrolo[3,2-c:4,5-c']dipyridin-2-yl]-2-methoxyethan-1-one |
| 74 | | 1-[6-chloro-5-methyl-9-(1-methyl-1H-pyrazol-3-yl)-1,3,4,5-tetrahydro-2H-pyrrolo[3,2-c:4,5-c']dipyridin-2-yl]-2-hydroxyethan-1-one |
| 75 | | 1-(3-chloro-4-fluoro-2-methoxy-5,6,7,9-tetrahydro-8H-pyrrolo[3,2-b:4,5-c']dipyridin-8-yl)-2-hydroxyethan-1-one |

| Example No. | Structure | Name |
|---|---|---|
| 76 | | 1-(3,4-dichloro-2-methoxy-6,6-dimethyl-5,6,7,9-tetrahydro-8H-pyrrolo[3,2-b:4,5-c']dipyridin-8-yl)-2-hydroxyethan-1-one |
| 77 | | 1-(3,4-dichloro-2-ethoxy-5,6,7,9-tetrahydro-8H-pyrrolo[3,2-b:4,5-c']dipyridin-8-yl)-2-hydroxyethan-1-one |
| 78 | | 1-(3-chloro-2-ethoxy-4-fluoro-5,6,7,9-tetrahydro-8H-pyrrolo[3,2-b:4,5-c']dipyridin-8-yl)-2-hydroxyethan-1-one |
| 79 | | 1-[3,4-dichloro-2-(cyclopropylmethoxy)-5,6,7,9-tetrahydro-8H-pyrrolo[3,2-b:4,5-c']dipyridin-8-yl]-2-hydroxyethan-1-one |
| 80 | | 1-[3-chloro-2-(cyclopropylmethoxy)-4-fluoro-5,6,7,9-tetrahydro-8H-pyrrolo[3,2-b:4,5-c']dipyridin-8-yl]-2-hydroxyethan-1-one |

TABLE 1-continued

| Example No. | Structure | Name |
|---|---|---|
| 81 | | 1-[3,4-dichloro-2-(difluoromethoxy)-5,6,7,9-tetrahydro-8H-pyrrolo[3,2-b:4,5-c']dipyridin-8-yl]-2-hydroxyethan-1-one |
| 82 | | 1-[3-chloro-2-(difluoromethoxy)-4-fluoro-5,6,7,9-tetrahydro-8H-pyrrolo[3,2-b:4,5-c']dipyridin-8-yl]-2-hydroxyethan-1-one |
| 83 | | 1-(7-chloro-9-methoxy-1,3,4,5-tetrahydro-2H-pyrrolo[3,2-c:4,5-c']dipyridin-2-yl)-2-hydroxyethan-1-one |

Biological Assays

Representative compounds of the invention were tested in a RapidFire mass spectroscopy assay with the results shown in Table 2.

Rapidfire Mass Spectroscopy Assay

Compounds were resuspended in 10 mM stock concentration using DMSO and tested to determine their $IC_{50}$ values against h-cGAS in 384-well polypropylene plates using RapidFire 365 mass spectrometry (RF-MS). The final concentration of full-length h-cGAS, dsDNA, ATP, and GTP were 100 nM, 25 nM, 100 µM, and 100 µM, respectively. The reaction buffer was composed of 20 mM Tris-HCl, pH 7.4, 150 mM NaCl, 5 mM $MgCl_2$, 1 µM $ZnCl_2$ and 0.01% Tween-20. Reaction solutions of 20 µl were incubated for 7 h at room temperature (RT) and stopped by addition of 60 µl of 0.5% (v/v) formic acid per well followed by RF-MS analysis. An aqueous solvent of 5 mM ammonium acetate, pH 10 was used for loading/washing process. An organic solvent comprising 5 mM ammonium acetate, pH 10 in 50% water, 25% acetone, and 25% acetonitrile was used for elution of the analytes. About 35 µl of each sample was aspirated from a 384-well plate and separated using a Graphitic carbon Type D cartridge. The sample loaded onto cartridge was then washed for 4 s at 1.5 ml $min^{-1}$ using the aqueous solvent. ATP, GTP, and cGAMP were eluted for 5 s using the organic solvent at a flow rate of 1.5 ml $min^{-1}$ followed by re-equilibration with the aqueous solvent for 5 s at a flow rate of 1.5 ml $min^{-1}$. The samples were analysed using a negative ionization mode in the mass spectrometer, with a gas temperature of 350° C., nebulizer pressure of 35 psi, and gas flow rate of 15 L $min^{-1}$. The acquisition range was between 300 and 800 m/z for all the chromatograms and the molecular masses of the detected peaks were: ATP: 505.9835, GTP: 521.9854, and cGAMP: 673.0906. The area under the curve (AUC) of the extracted ion counts for each analyte was calculated using the Agilent RapidFire Integrator software. Percent product formation for cGAMP was calculated as: product formation (%)=[($AUC_{cGAMP}$×100)/ ($AUC_{cGAMP}$+½$AUC_{ATP}$+½$AUC_{GTP}$)]. Percent product formation from each sample at a given inhibitor concentration was used to determine percent inhibition by normalization against the positive control (no dsDNA) and negative control (no inhibitor). The % inhibition was calculated as follows: % inhibition=100×[(sample−average negative control)/(average positive control−average negative control)].

TABLE 2

| Ex # | $IC_{50}$ (µM) |
|---|---|
| 1 | 0.0616 |
| 2 | 2.41 |
| 3 | 2.47 |
| 4 | 1.46 |
| 5 | 21.8 |
| 6 | 20.8 |

Representative compounds from related application PCT/US2019/016673 were tested in the foregoing RapidFire mass spectroscopy assay with the results shown in Table 3 in support of claim scope for representative compounds of the present invention.

TABLE 3

| ID/Structure | IC$_{50}$ (μM) |
|---|---|
| TDI-004576 | 3.08 |
| TDI-004581 | 2.41 |
| TDI-005021 | 13.9 |
| TDI-005323 | 5.86 |
| TDI-005324 | 4.02 |
| TDI-005325 | 3.23 |

TABLE 3-continued
| ID/Structure | IC$_{50}$ (μM) |
|---|---|
| TDI-005397 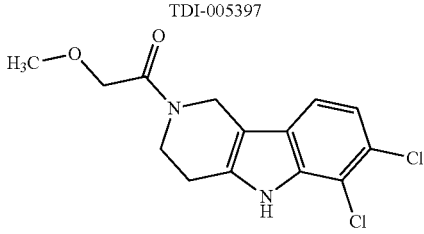 | 0.352 |
| TDI-005685 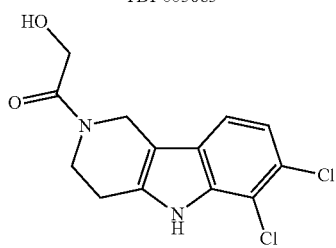 | 0.106 |
| TDI-005716 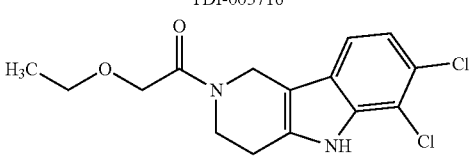 | 1.51 |
| TDI-005719 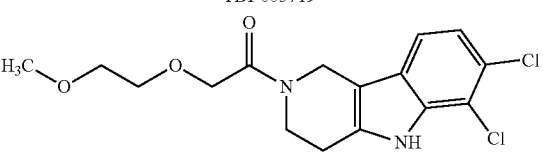 | 3.29 |
| TDI-005745 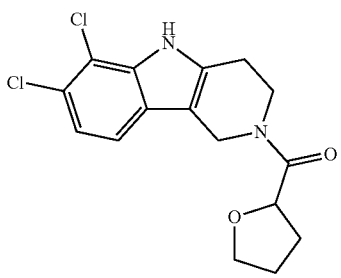 [SMILES: O=C(C1CCCO1)N1CCc2[nH]c3c(Cl)c(Cl)ccc3c2C1] | 3.08 |
| TDI-005776 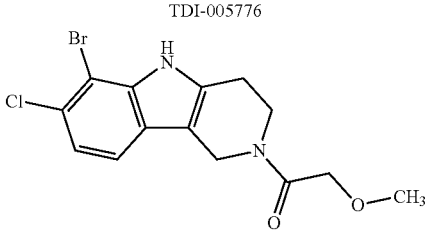 | 0.203 |

TABLE 3-continued
| ID/Structure | IC$_{50}$ (μM) |
|---|---|
| TDI-005777 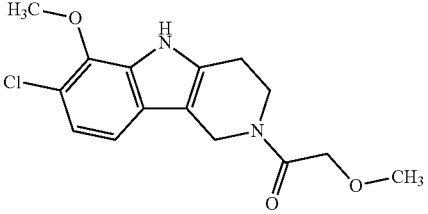 [SMILES: COCC(=O)N1CCc2[nH]c3c(OC)c(Cl)ccc3c2C1] | 24.7 |
| TDI-005854 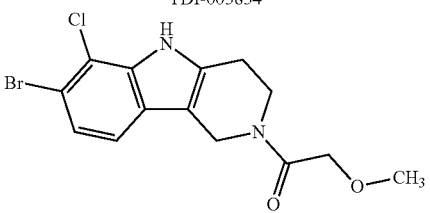 | 0.198 |
| TDI-005855 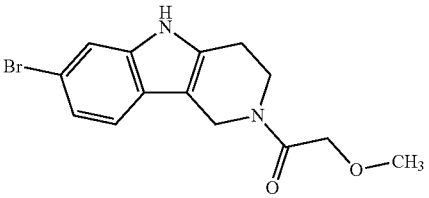 [SMILES: COCC(=O)N1CCc2[nH]c3cc(Br)ccc3c2C1] | 1.74 |
| TDI-006171 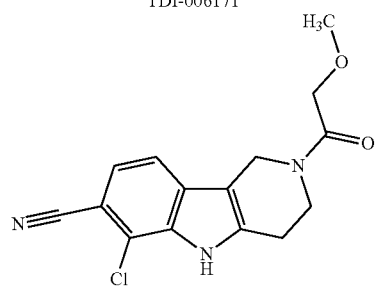 | 7.69 |
| TDI-006182 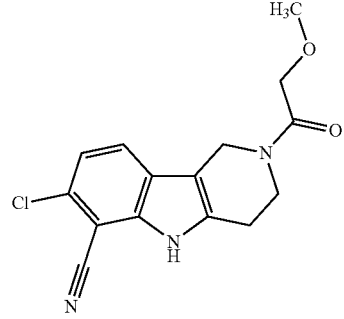 [SMILES: COCC(=O)N1CCc2[nH]c3c(C#N)c(Cl)ccc3c2C1] | 0.57 |
| TDI-006183 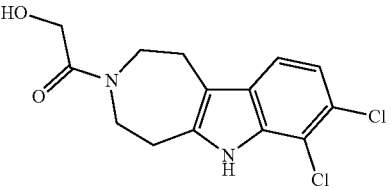 [SMILES: O=C(CO)N1CCc2[nH]c3c(Cl)c(Cl)ccc3c2CC1] | 0.469 |

TABLE 3-continued
| ID/Structure | IC$_{50}$ (µM) |
|---|---|
| TDI-006261 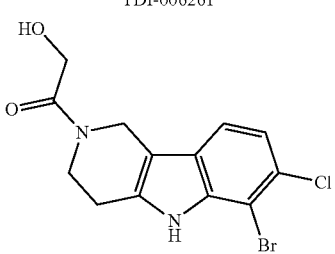 | 0.14 |
| TDI-006339 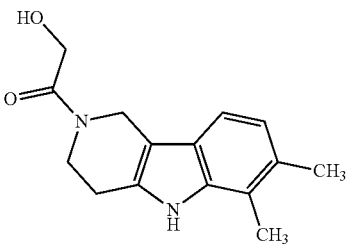 [SMILES: Cc1ccc2c3c([nH]c2c1C)CCN(C(=O)CO)C3] | 7.63 |
| TDI-006340 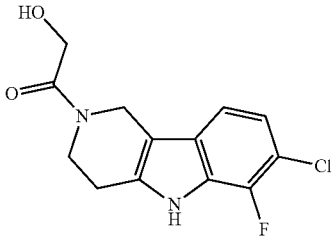 | 0.129 |
| TDI-006354 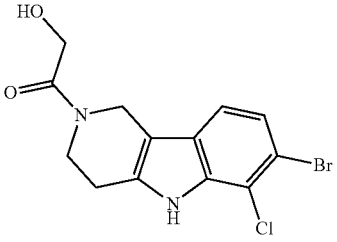 [SMILES: O=C(CO)N1CCc2[nH]c3c(Cl)c(Br)ccc3c2C1] | 0.043 |
| TDI-006358 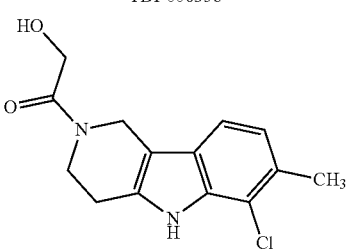 | 0.597 |

TABLE 3-continued
| ID/Structure | IC$_{50}$ (μM) |
|---|---|
| TDI-006359 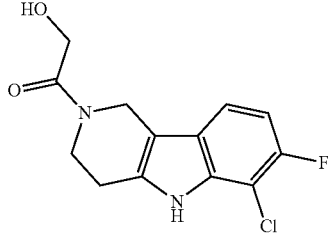 [SMILES: O=C(CO)N1CCc2[nH]c3c(Cl)c(F)ccc3c2C1] | 0.44 |
| TDI-006360 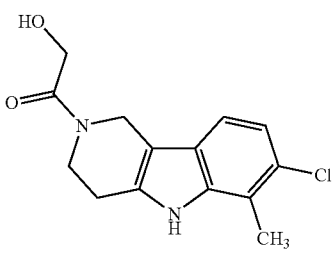 [SMILES: Cc1c(Cl)ccc2c3c([nH]c12)CCN(C(=O)CO)C3] | 0.327 |
| TDI-006366 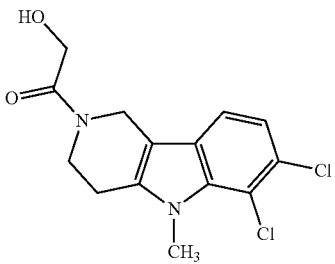 [SMILES: Cn1c2c(c3ccc(Cl)c(Cl)c31)CN(C(=O)CO)CC2] | 0.201 |
| TDI-006528 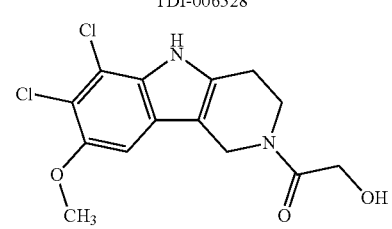 | 0.031 |
| TDI-006529 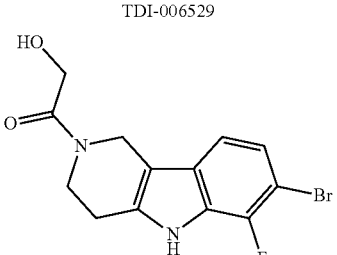 | 0.039 |

TABLE 3-continued

| ID/Structure | IC$_{50}$ (μM) |
|---|---|
| TDI-006570 | 0.138 |
| TDI-006622 | 0.049 |
| TDI-006923 | 19.3 |
| TDI-006931 | 0.402 |
| TDI-006932 | >25 |
| TDI-007362 | 0.591 |

107
108
TABLE 3-continued
| ID/Structure | IC$_{50}$ (μM) |
|---|---|
| TDI-007433 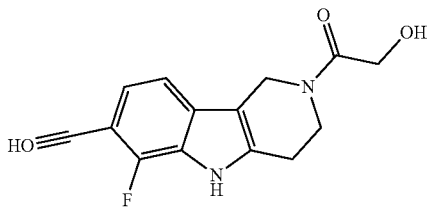 | 1.45 |
| TDI-007445 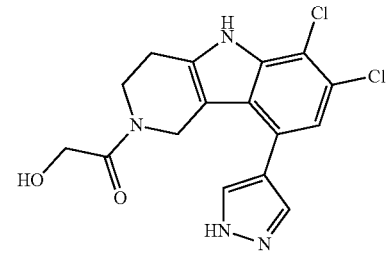 [SMILES: O=C(CO)N1CCc2[nH]c3c(Cl)c(Cl)cc(-c4cn[nH]c4)c3c2C1] | 0.0275 |
| TDI-007457 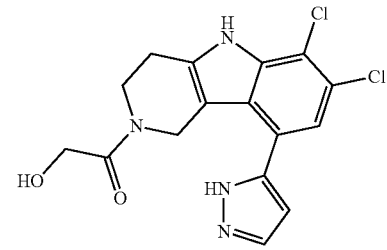 [SMILES: O=C(CO)N1CCc2[nH]c3c(Cl)c(Cl)cc(-c4ccn[nH]4)c3c2C1] | 0.0541 |
| TDI-007542 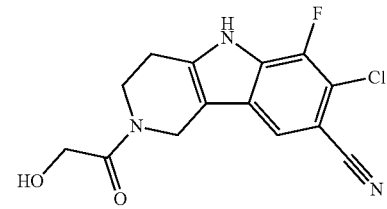 [SMILES: N#Cc1cc2c3c([nH]c2c(F)c1Cl)CCN(C(=O)CO)C3] | 1.23 |
| TDI-007544 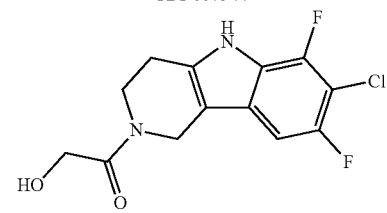 [SMILES: O=C(CO)N1CCc2[nH]c3c(F)c(Cl)c(F)cc3c2C1] | 0.166 |
| TDI-007553 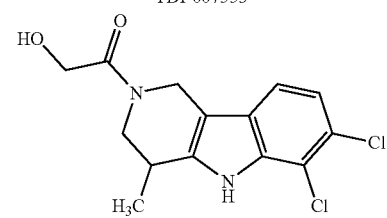 | 0.3 |

TABLE 3-continued

| ID/Structure | IC$_{50}$ (μM) |
|---|---|
| TDI-007560 | 6.74 |
| TDI-007575 | 0.174 |
| TDI-007576 | 0.323 |
| TDI-007586 | 0.352 |
| TDI-007635 | 0.0428 |

TABLE 3-continued

| ID/Structure | IC$_{50}$ (μM) |
| --- | --- |
| TDI-007945 | 0.125 |
| TDI-008026 | 0.203 |
| TDI-008034 | 0.401 |
| TDI-008061 | 0.131 |
| TDI-008062 | 1.03 |

TABLE 3-continued
| ID/Structure | IC$_{50}$ (μM) |
|---|---|
| TDI-008069 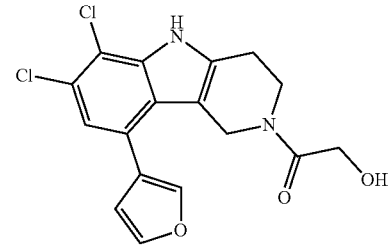 | 0.0848 |
| TDI-008070 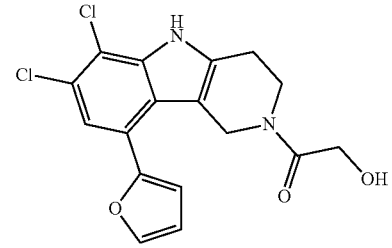 [SMILES: O=C(CO)N1CCc2[nH]c3c(Cl)c(Cl)cc(-c4ccco4)c3c2C1] | 0.0228 |
| TDI-008071 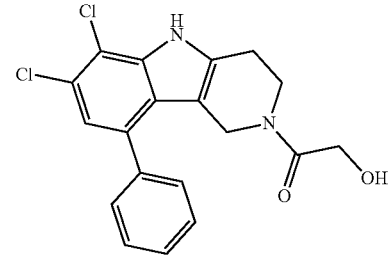 [SMILES: O=C(CO)N1CCc2[nH]c3c(Cl)c(Cl)cc(-c4ccccc4)c3c2C1] | 0.0393 |
| TDI-008072 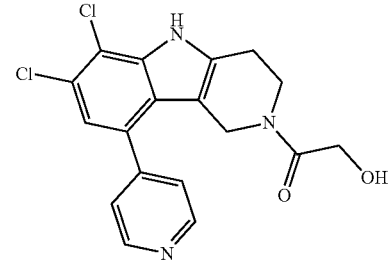 [SMILES: O=C(CO)N1CCc2[nH]c3c(Cl)c(Cl)cc(-c4ccncc4)c3c2C1] | 0.0975 |
| TDI-008073 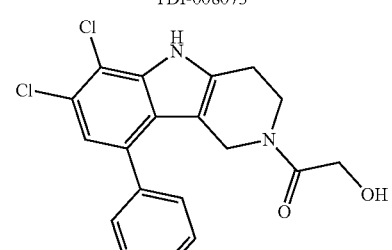 | 0.0204 |

TABLE 3-continued

| ID/Structure | IC$_{50}$ (µM) |
|---|---|
| TDI-008074 | 0.0194 |
| TDI-008075 | 0.469 |
| TDI-008076 | 11.4 |
| TDI-008077 | 0.0146 |
| TDI-008078 | 0.0318 |

TABLE 3-continued

| ID/Structure | IC$_{50}$ (µM) |
|---|---|
| TDI-008079 | 0.890 |
| TDI-008080 | 0.0668 |
| TDI-008081 | 0.0479 |
| TDI-008082 | 0.322 |
| TDI-008083 | 0.0203 |

TABLE 3-continued

| ID/Structure | IC$_{50}$ (μM) |
|---|---|
| TDI-008084 | 0.258 |
| TDI-008085 | 0.0309 |
| TDI-008086 | 2.05 |
| TDI-008087 | 0.0102 |
| TDI-008088 | 0.0569 |

TABLE 3-continued
| ID/Structure | IC$_{50}$ (μM) |
|---|---|
| TDI-008089 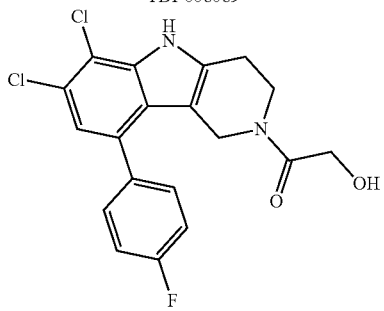 | 0.0644 |
| TDI-008090 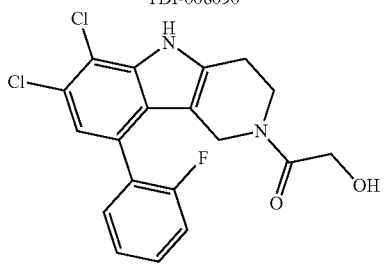 | 0.0267 |
| TDI-008091 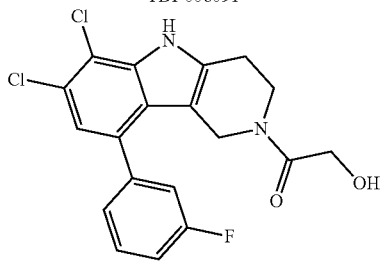 | 0.031 |
| TDI-008092 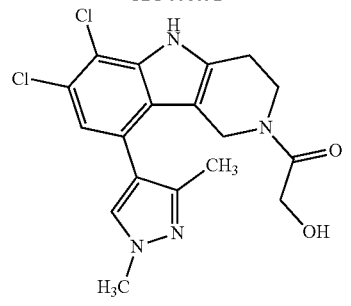 | 1.84 |
| TDI-008093 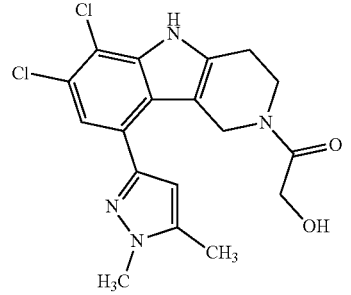 [SMILES: Cc1cc(-c2cc(Cl)c(Cl)c3[nH]c4c(c23)CN(C(=O)CO)CC4)nn1C] | 0.330 |

TABLE 3-continued
| ID/Structure | IC$_{50}$ (μM) |
|---|---|
| TDI-008094 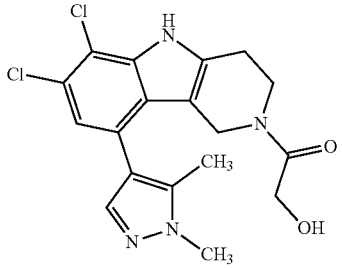 [SMILES: Cc1c(-c2cc(Cl)c(Cl)c3[nH]c4c(c23)CN(C(=O)CO)CC4)cnn1C] | 0.371 |
| TDI-008095 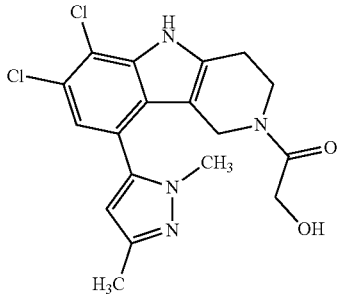 [SMILES: Cc1cc(-c2cc(Cl)c(Cl)c3[nH]c4c(c23)CN(C(=O)CO)CC4)n(C)n1] | 0.929 |
| TDI-008096 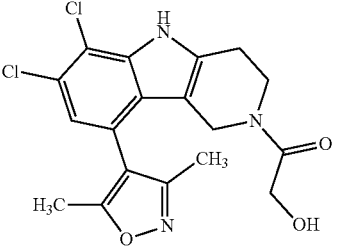 [SMILES: Cc1noc(C)c1-c1cc(Cl)c(Cl)c2[nH]c3c(c12)CN(C(=O)CO)CC3] | 5.95 |
| TDI-008097 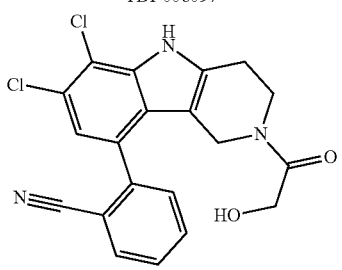 | 0.0422 |
| TDI-008098 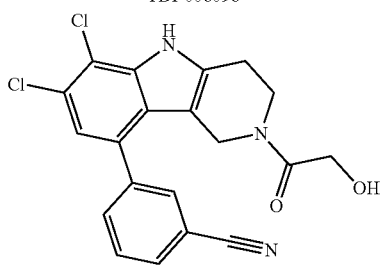 | 0.0853 |

TABLE 3-continued
| ID/Structure | IC$_{50}$ (μM) |
|---|---|
| TDI-008100 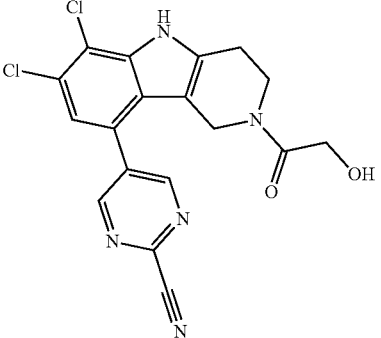 [SMILES: N#Cc1ncc(-c2cc(Cl)c(Cl)c3[nH]c4c(c23)CN(C(=O)CO)CC4)cn1] | 5.27 |
| TDI-008101 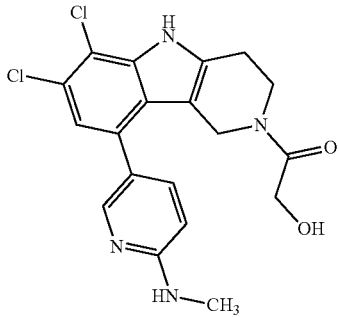 [SMILES: CNc1ccc(-c2cc(Cl)c(Cl)c3[nH]c4c(c23)CN(C(=O)CO)CC4)cn1] | 0.105 |
| TDI-008102 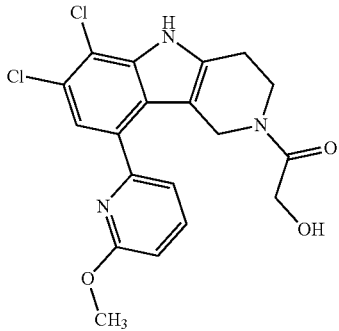 [SMILES: COc1cccc(-c2cc(Cl)c(Cl)c3[nH]c4c(c23)CN(C(=O)CO)CC4)n1] | 0.0402 |
| TDI-008103 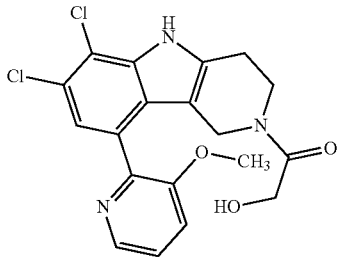 [SMILES: COc1cccnc1-c1cc(Cl)c(Cl)c2[nH]c3c(c12)CN(C(=O)CO)CC3] | 0.0441 |

TABLE 3-continued
| ID/Structure | IC$_{50}$ (µM) |
|---|---|
| TDI-008104 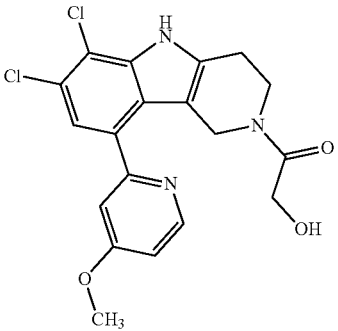 [SMILES: COc1ccnc(-c2cc(Cl)c(Cl)c3[nH]c4c(c23)CN(C(=O)CO)CC4)c1] | 0.0952 |
| TDI-008105 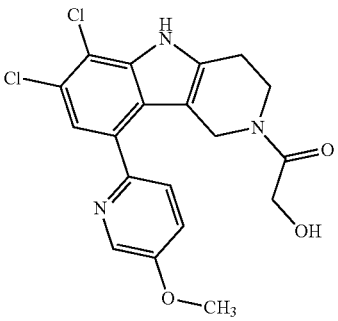 [SMILES: COc1ccc(-c2cc(Cl)c(Cl)c3[nH]c4c(c23)CN(C(=O)CO)CC4)nc1] | 0.107 |
| TDI-008106 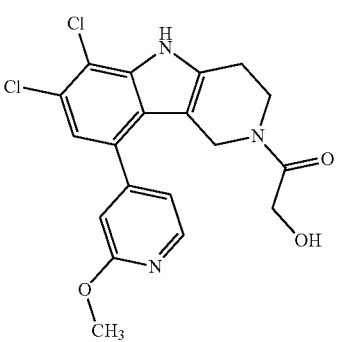 [SMILES: COc1cc(-c2cc(Cl)c(Cl)c3[nH]c4c(c23)CN(C(=O)CO)CC4)ccn1] | 0.0493 |
| TDI-008107 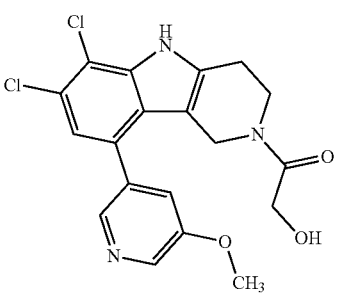 [SMILES: COc1cncc(-c2cc(Cl)c(Cl)c3[nH]c4c(c23)CN(C(=O)CO)CC4)c1] | 0.0524 |

TABLE 3-continued

| ID/Structure | IC$_{50}$ (µM) |
|---|---|
| TDI-008108 | 0.552 |
| TDI-008109 | 2.33 |
| TDI-008110 | 2.97 |
| TDI-008111 | 0.268 |

TABLE 3-continued

| ID/Structure | IC$_{50}$ (μM) |
|---|---|
| TDI-008112 | 0.201 |
| TDI-008113 | 0.962 |
| TDI-008114 | 0.0622 |
| TDI-008115 | 0.0451 |

TABLE 3-continued
| ID/Structure | IC$_{50}$ (μM) |
|---|---|
| TDI-008116 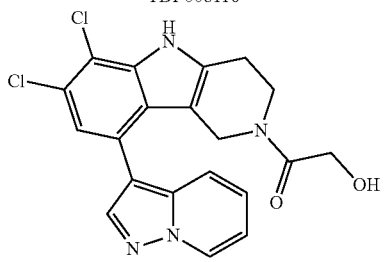 | 0.0252 |
| TDI-008117 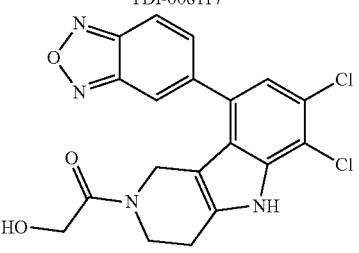 | 0.0182 |
| TDI-008118 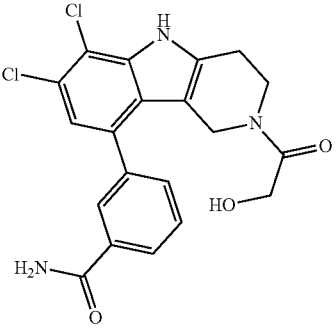 [SMILES: NC(=O)c1cccc(-c2cc(Cl)c(Cl)c3[nH]c4c(c23)CN(C(=O)CO)CC4)c1] | 0.0768 |
| TDI-008120 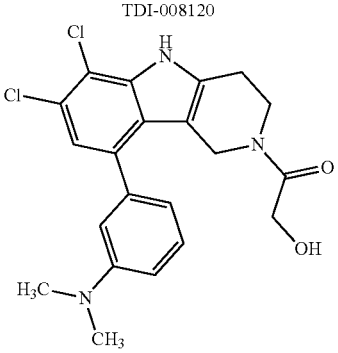 | 0.438 |
| TDI-008130 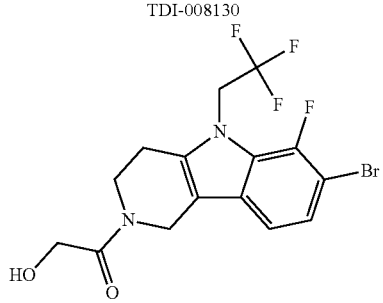 | 1.12 |

TABLE 3-continued
| ID/Structure | IC$_{50}$ (μM) |
|---|---|
| TDI-008136 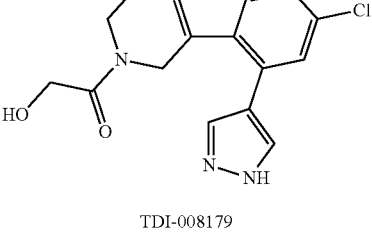 | 0.416 |
| TDI-008179 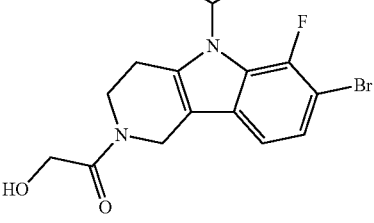 | 0.506 |
| TDI-008185 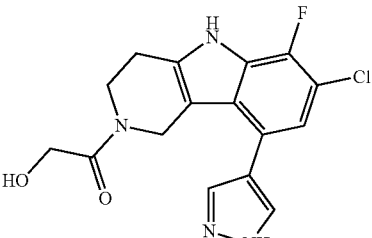 | 0.0322 |
| TDI-008246 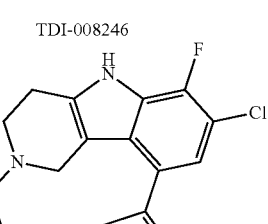 | 0.023 |
| TDI-008292 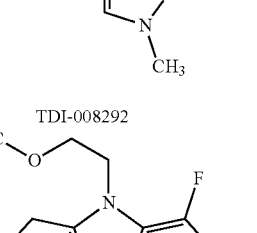 | 0.402 |

TABLE 3-continued
| ID/Structure | IC$_{50}$ (μM) |
|---|---|
| TDI-008371 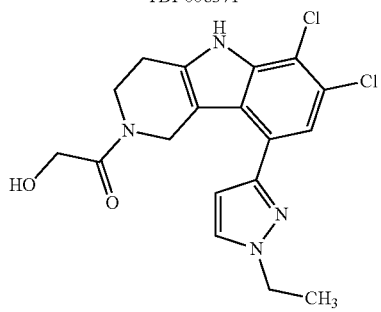 | 0.0232 |
| TDI-008437 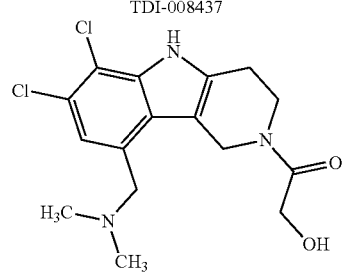 | 0.35 |
| TDI-008438 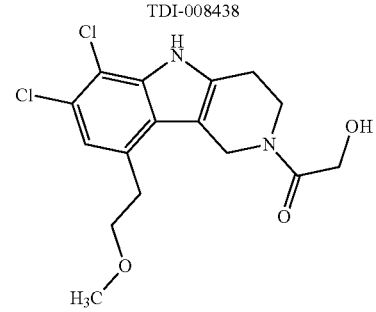 | 0.112 |
| TDI-008439 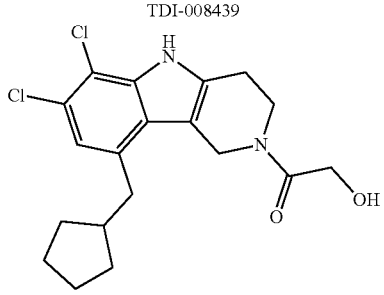 | 0.663 |
| TDI-008440 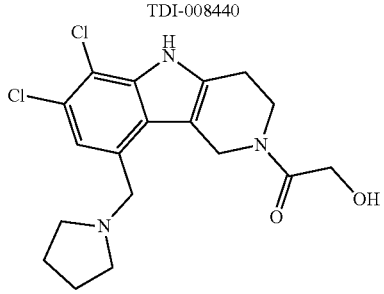 | 2.23 |

TABLE 3-continued

| ID/Structure | IC$_{50}$ (μM) |
|---|---|
| TDI-008441 | 5.22 |
| TDI-008442 | 0.706 |
| TDI-008443 | 0.586 |
| TDI-008444 | 3.24 |
| TDI-008445 | 0.035 |

TABLE 3-continued
| ID/Structure | IC$_{50}$ (μM) |
|---|---|
| TDI-008446 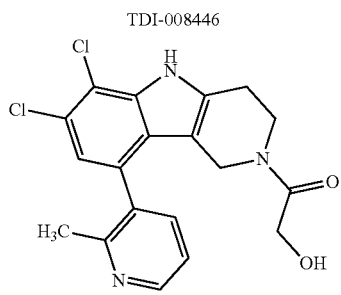 | 0.901 |
| TDI-008447 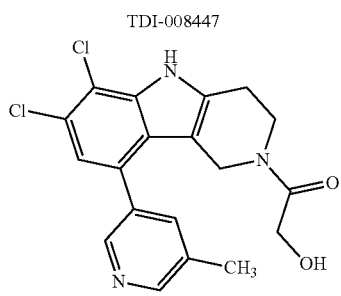 | 0.0249 |
| TDI-008448 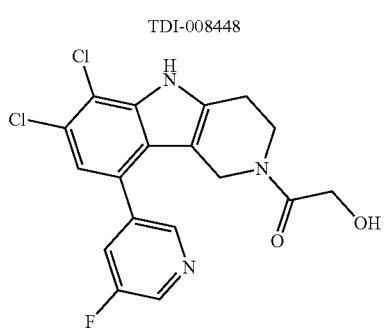 | 0.0259 |
| TDI-008449 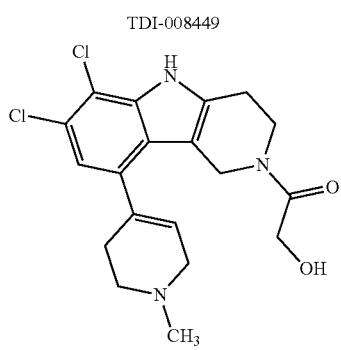 | 0.42 |

TABLE 3-continued
| ID/Structure | IC$_{50}$ (μM) |
|---|---|
| TDI-008450 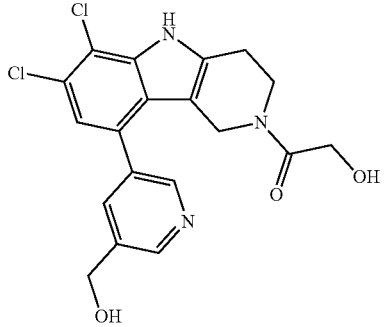 [SMILES: O=C(CO)N1CCc2[nH]c3c(Cl)c(Cl)cc(-c4cncc(CO)c4)c3c2C1] | 0.0545 |
| TDI-008451 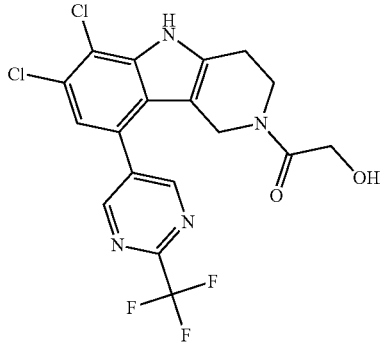 [SMILES: O=C(CO)N1CCc2[nH]c3c(Cl)c(Cl)cc(-c4cnc(C(F)(F)F)nc4)c3c2C1] | 9.78 |
| TDI-008452 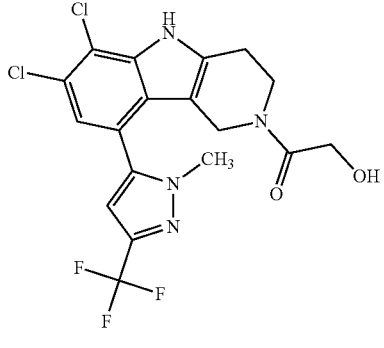 [SMILES: Cn1nc(C(F)(F)F)cc1-c1cc(Cl)c(Cl)c2[nH]c3c(c12)CN(C(=O)CO)CC3] | 2.91 |
| TDI-008455 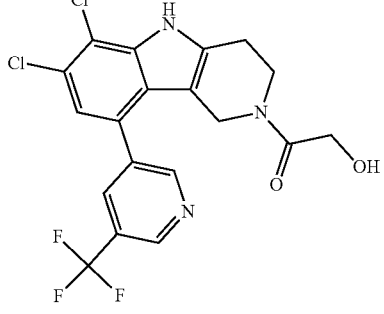 | 0.154 |

TABLE 3-continued
| ID/Structure | IC$_{50}$ (μM) |
|---|---|
| TDI-008457 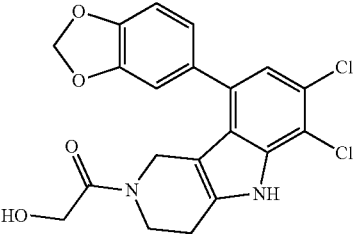 [SMILES: O=C(CO)N1CCc2[nH]c3c(Cl)c(Cl)cc(-c4ccc5c(c4)OCO5)c3c2C1] | 0.0446 |
| TDI-008458 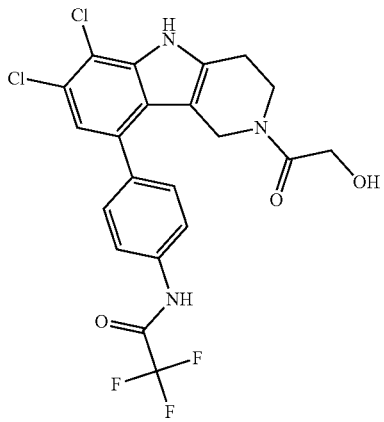 [SMILES: O=C(CO)N1CCc2[nH]c3c(Cl)c(Cl)cc(-c4ccc(NC(=O)C(F)(F)F)cc4)c3c2C1] | 0.629 |
| TDI-008460 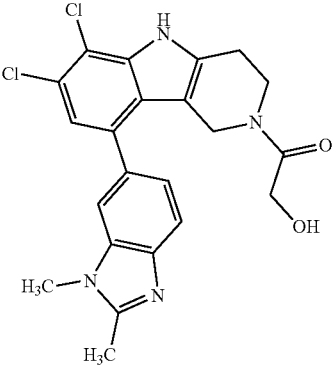 [SMILES: Cc1nc2ccc(-c3cc(Cl)c(Cl)c4[nH]c5c(c34)CN(C(=O)CO)CC5)cc2n1C] | 0.83 |
| TDI-008461 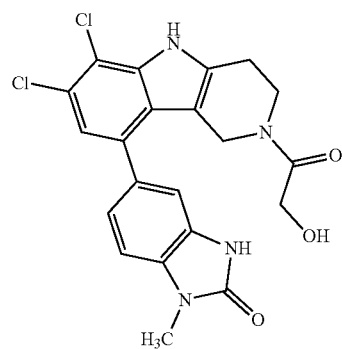 [SMILES: Cn1c(=O)[nH]c2cc(-c3cc(Cl)c(Cl)c4[nH]c5c(c34)CN(C(=O)CO)CC5)ccc21] | 0.344 |

TABLE 3-continued
| ID/Structure | IC$_{50}$ (μM) |
|---|---|
| TDI-008462 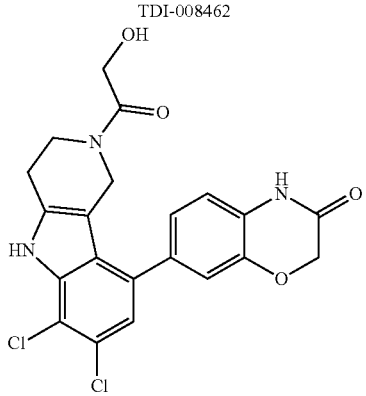 | 1.2 |
| TDI-008464 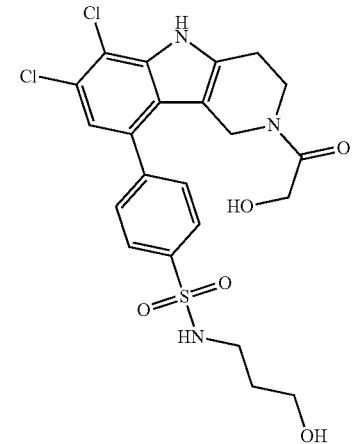 [SMILES: O=C(CO)N1CCc2[nH]c3c(Cl)c(Cl)cc(-c4ccc(S(=O)(=O)NCCCO)cc4)c3c2C1] | 3.91 |
| TDI-008474 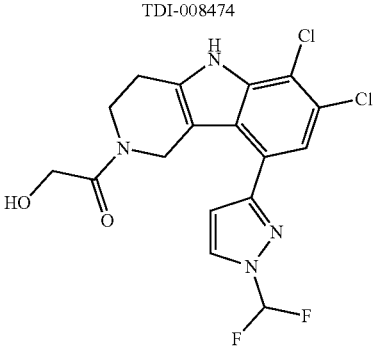 | 0.018 |
| TDI-008520 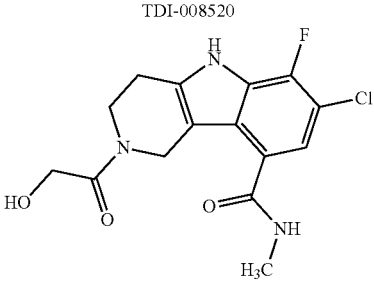 | 1.04 |

TABLE 3-continued
| ID/Structure | IC$_{50}$ (µM) |
|---|---|
| TDI-008522 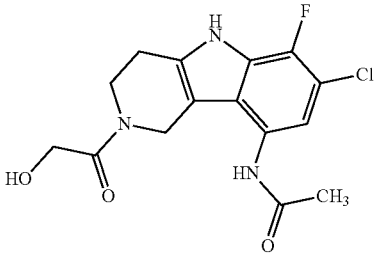 [SMILES: CC(=O)Nc1cc(Cl)c(F)c2[nH]c3c(c12)CN(C(=O)CO)CC3] | 0.365 |
| TDI-008605 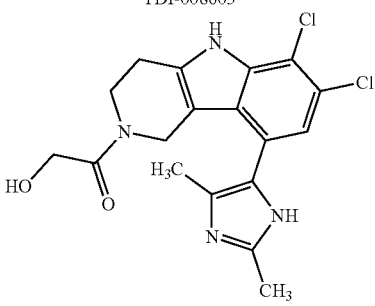 | 0.568 |
| TDI-008768 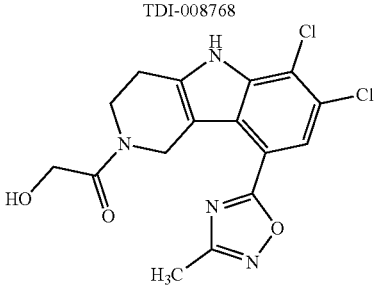 | 0.0226 |
| TDI-008777 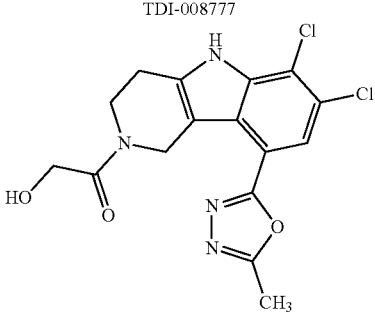 | 0.0305 |
| TDI-008783 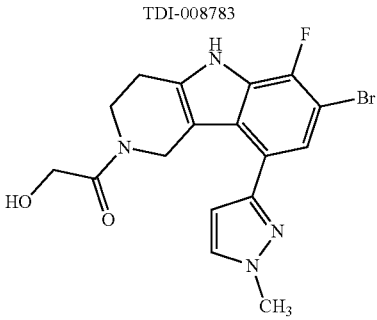 | 0.0172 |

TABLE 3-continued
| ID/Structure | IC$_{50}$ (μM) |
|---|---|
| TDI-008796 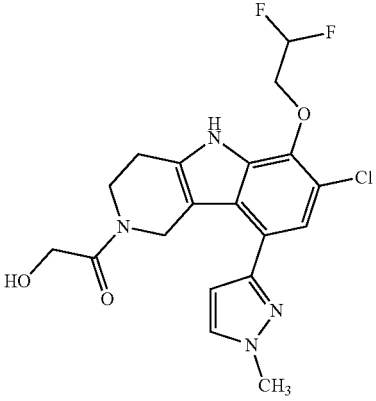 [SMILES: Cn1ccc(-c2cc(Cl)c(OCC(F)F)c3[nH]c4c(c23)CN(C(=O)CO)CC4)n1] | 0.984 |
| TDI-008797 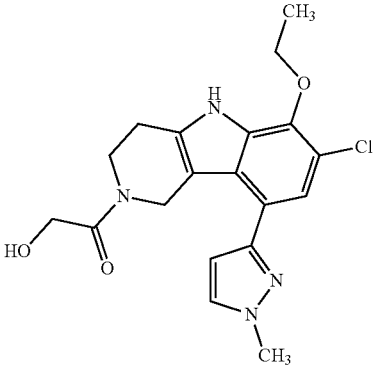 [SMILES: CCOc1c(Cl)cc(-c2ccn(C)n2)c2c3c([nH]c12)CCN(C(=O)CO)C3] | 0.351 |
| TDI-008860 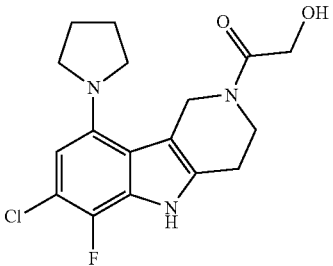 [SMILES: O=C(CO)N1CCc2[nH]c3c(F)c(Cl)cc(N4CCCC4)c3c2C1] | 0.350 |
| TDI-008861 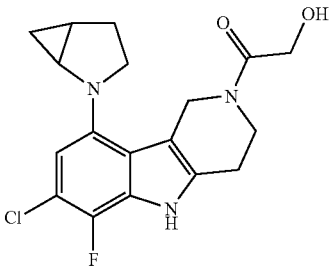 [SMILES: O=C(CO)N1CCc2[nH]c3c(F)c(Cl)cc(N4CCC5CC54)c3c2C1] | 0.480 |

TABLE 3-continued
| ID/Structure | IC$_{50}$ (μM) |
|---|---|
| TDI-008862 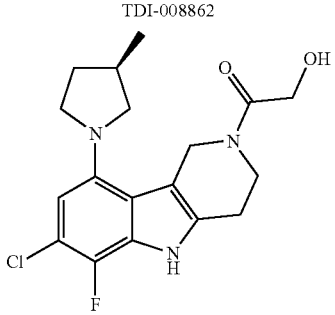 | 0.478 |
| TDI-008863 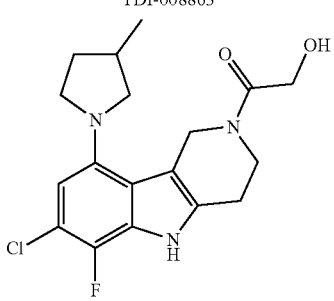 | 0.147 |
| TDI-008864 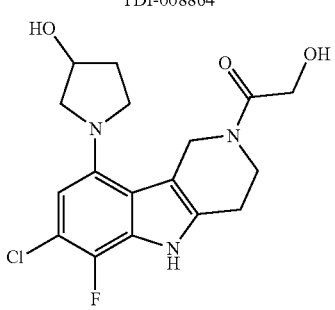 | 0.455 |
| TDI-008865 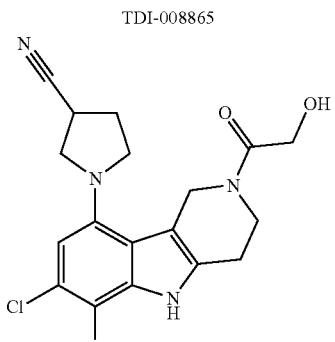 | 1.58 |

TABLE 3-continued

| ID/Structure | IC$_{50}$ (µM) |
|---|---|
| TDI-008866 | 0.452 |
| TDI-008867 | 6.93 |
| TDI-008937 | 0.0776 |
| TDI-008989 | 0.0459 |

TABLE 3-continued
| ID/Structure | IC$_{50}$ (μM) |
|---|---|
| TDI-009000 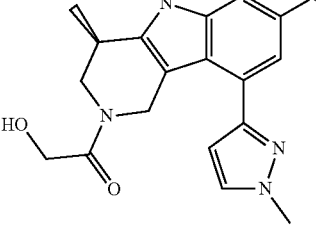 | 0.0245 |
| TDI-009001 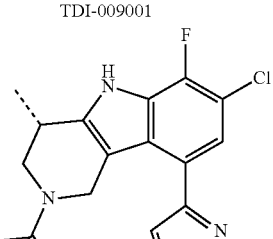 | 0.0327 |
| TDI-009007 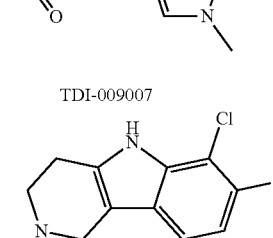 | 0.0233 |
| TDI-009013 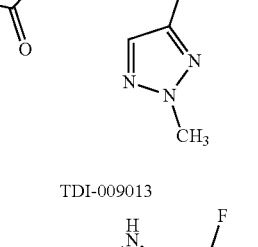 | 0.583 |
| TDI-009072 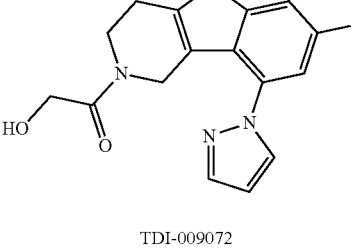 | 18.6 |

TABLE 3-continued

| ID/Structure | IC$_{50}$ (μM) |
|---|---|
| TDI-009186 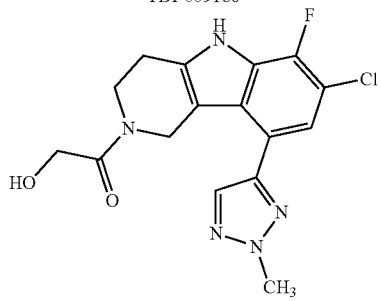 | 0.0176 |
| TDI-009208 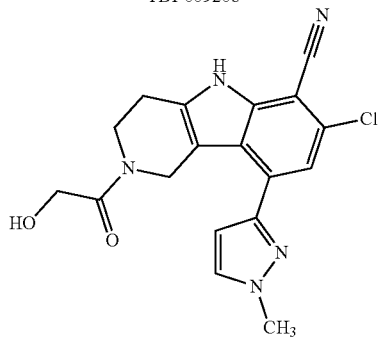 | 0.0392 |

Example 1 was tested in a cell-based lucia luciferase assay in THP1-Dual cells (protocol shown below). The results are shown in Table 4 along with representative compounds from related application PCT/US2019/016673.

Cell-Based Lucia Luciferase Assay in THP1-Dual Cells

Potency of select inhibitors is determined using human THP1-Dual cells carrying a secreted luciferase reporting interferon-induced gene expression. THP1-Dual cells were pre-incubated in 24-well plates ($2.5 \times 10^5$ cells/well, 500 μl per well) over an indicated concentration range of inhibitors for 1 h. DMSO was added as negative control. Cells were transfected with 0.5 μg ml$^{-1}$ of 100-bp dsDNA ligands in complex with Lipofectamine 2000 (Invitrogen) for 24 h. Transfection complex was prepared by combining 0.25 μg of dsDNA in 25 μl Opti-MEM (Gibco) with 0.25 μl of Lipofectamine 2000 in 25 μl Opti-MEM and adding the 50 μl combined volume for each well containing cells. Luciferase luminescence was measured for each sample using QUANTI-Luc luciferase reagent (InvivoGen) following the manufacturer's protocol. Shortly, 20 μl of cell culture supernatant per well was transferred into a 96-well white opaque plate and luminescence was recorded using a Biotek Synergy Neo plate reader (BioTek, Winooski, VT) with the following parameters: 50 μl of luciferase reagent injection, end-point measurement with 4 s start time and 0.1 s reading time. Relative luciferase activity for each compound-treated sample was calculated using Lipofectamine 2000 treated sample as negative control and Lipofectamine 2000:dsDNA complex treated sample without compound as positive control, i.e., relative luciferase activity=(RLU$_{sample}$−RLU$_{negative\ control}$)/(RLU$_{positive\ control}$−RLU$_{negative\ control}$) where RLU indicates raw luciferase unit.

TABLE 4

| ID # | IC$_{50}$ (μM) | ID # | IC$_{50}$ (μM) | ID # | IC$_{50}$ (μM) |
|---|---|---|---|---|---|
| Example 1 | 10.7 | TDI-008136 | 15.86 | TDI-008864 | >10.0 |
| TDI-006570 | >40 | TDI-008179 | 34 | TDI-008865 | >10.0 |
| TDI-007445 | 5.26 | TDI-008185 | 9.9 | TDI-008866 | >10.0 |
| TDI-007635 | 8.14 | TDI-008246 | 1.7 | TDI-008867 | >10.0 |
| TDI-008070 | 4.95 | TDI-008292 | >40.0 | TDI-008937 | 16.1 |
| TDI-008071 | 9 | TDI-008371 | 6.52 | TDI-008989 | 6.71 |
| TDI-008073 | 6.23 | TDI-008768 | 5.8 | TDI-009000 | 2.89 |
| TDI-008074 | 6.85 | TDI-008777 | 12.9 | TDI-009001 | 3.18 |
| TDI-008077 | 3.32 | TDI-008783 | 3.41 | TDI-009007 | 1.15 |
| TDI-008087 | 1.97 | TDI-008796 | >40.0 | TDI-009013 | >40.0 |
| TDI-008116 | 6.43 | TDI-008860 | >10.0 | TDI-009072 | >40.0 |
| TDI-008117 | 6.19 | TDI-008861 | >10.0 | TDI-009186 | 0.72 |
| TDI-008130 | 25.78 | TDI-008863 | >10.0 | TDI-009208 | 4.4 |

Representative compounds of the present invention were tested in a cGAS enzyme assay using time-resolved fluorescence resonance energy transfer (TR-FRET). The protocol is described below, and the results are shown in Table 5.

Enzyme Assay

The cGAS enzyme assay using TR-FRET were performed to determine potency of selected inhibitors in 384-well white flat-bottom small volume plates (Greiner Bio-One). Assay buffer (25 mmol/L Tris-HCl (pH 7.5), 150 mmol/L NaCl, 1 mmol/L MgCl$_2$, 0.01% Tween-20, 0.01% BSA) was used to dilution of the reagents. The test compounds were prepared as DMSO solution. Human cGAS (1.5 μl, final 5 nmol/L), each concentration of test compound (1.5 μl) and 90 bp dsDNA (1.5 μl, final 100 nmol/L) were added to each well and pre-incubated for 1 h. Next, the substrate mixture (1.5 μl) including ATP (final 40 μmol/L), GTP (final 20 μmol/L), and ZnCl$_2$ (100 μmol/L) was added to each well and incubation were carried out for 40 min at room temperature. And then, detection premix (2 μl) including mouse monoclonal antibody against cGAMP (in house, see Miyakawa S., et al., Journal of Immunological Methods, in press), FITC-cGAMP (Biolog Life Science Institute), rabbit Tb-anti-mouse IgG (ThermoFisher), EDTA was added to each well and incubated for 1 h. Indeed, TR-FRET was measured for each sample using competitive reaction assay system, which signals of individual wells were measured using a Envision Multilabel plate reader (PerkinElmer; Ex 337 nm, Em 520 nm/486 nm). The cGAMP concentration of each well was calculated using cGAMP standard curve. For determination of inhibition rate, the cGAMP concentration of no compound was set as 0% inhibition and the cGAMP concentration of no cGAS protein was set as 100% inhibition. The inhibition rate (%) of test compounds was calculated as $(1-(C_{sample}-C_{100\% \ inhibition})/(C_{0\% \ inhibition}-C_{100\% \ inhibition}))\times 100$ where C indicates concentration of cGAMP. The $IC_{50}$ values were calculated by Excelfit (CTC).

TABLE 5

| Example No. | hcGAS enzyme assay |
|---|---|
| 1 | 0.19 μM |
| 2 | >30 μM |
| 4 | 21 μM |
| 5 | >30 μM |
| 25 | 0.095 μM |
| 30 | 0.21 μM |
| 34 | 0.15 μM |
| 64 | 0.18 μM |
| 67 | 0.15 μM |
| 68 | 0.24 μM |
| 69 | 0.28 μM |
| 70 | 7.5 μM |
| 71 | 1.4 μM |
| 72 | 0.25 μM |
| 73 | 0.87 μM |
| 74 | 0.29 μM |
| 75 | 0.55 μM |
| 76 | 0.85 μM |
| 77 | 3.0 μM |
| 78 | 3.7 μM |
| 79 | 5.9 μM |
| 80 | 5.0 μM |
| 81 | 2.4 μM |
| 82 | 15 μM |

Representative compounds of the present invention were tested in a cell-based time-resolved fluorescence resonance energy transfer (TR-FRET) assay in THP1 cells. The protocol is described below, and the results are shown in Table 6.

Cell-Based Assay

Potency of select inhibitors were determined using human THP1 cells with homogeneous TR-FRFT assay. 50 nmol/l PMA treated THP1 cells were incubated in 96-well plates (corning3585) for 48 h. After differentiation THP1 cells (macrophage cells) were pre-incubated in the 96-well plates ($1.0\times10^5$ cells/well, 100 μl per well) with indicated concentration range of inhibitors, and DMSO as a positive control, for 1 h. Then, cells were transfected with 0.1 μg/well of 90-bp dsDNA ligands in complex with Lipofectamine 3000 (Invitrogen), without dsDNA as a negative control, for 24 h. Transfection complex was prepared by combining 0.1 μg of dsDNA in 5 μl Opti-MEM (Invitrogen) with 0.35 μl of Lipofectamine 3000 in 5 μl Opti-MEM. The 10 μl of combined transfection complex was added to each well containing cells. TR-FRET was measured for each sample using competitive reaction assay system with cGAMP and FITC-cGAMP (Biolog Life Science Institute) containing mouse monoclonal antibody against cGAMP (in house, see Miyakawa S., et al., Journal of Immunological Methods, in press) and rabbit Tb-anti-mouse IgG (ThermoFisher). After removal of cell culture supernatant, 50 μl of cell lysis buffer (50 mmol/l Tris-HCl, 1% NP-40, 2 mmol/l EDTA) was added to each well and stirred. After cell debris was precipitated by centrifugation, 6 μl of the supernatant was transferred into a 384-well white plate (greiner784075), 6 μl of TR-FRET detection solution was added to each well. After incubated at room temperature for 1 h, TR-FRET signal was detected using a Envision plate reader (PerkinElmer), using excitation at 337 nm and emissions at 520 nm/486 nm. cGAMP concentration of each well was calculated from standard curve of known concentration of cGAMP. Relative inhibitory activity for each compound-treated sample was calculated using Lipofectamine 3000-treated sample without dsDNA as a negative control and Lipofectamine 3000:dsDNA complex-treated sample without test compound as a positive control, i.e., relative inhibitory activity (%)=$(1-(C_{sample}-C_{negative \ control})/(C_{positive \ control}-C_{negative \ control}))\times 100$ where C indicates concentration of cGAMP. The $IC_{50}$ values were calculated by Excelfit (CTC).

TABLE 6

| Example # | THP1 cGAMP $IC_{50}$ (μM) |
|---|---|
| 1 | 2.5 |
| 67 | 0.14 |
| 68 | 0.33 |

IFNB1 mRNA Expression in Cells:

Cellular activation of cGAS enzyme leads to IFNB1 mRNA expression in THP1 cells, primary human macrophage cells, and human PBMCs. IFNB1 mRNA expression was quantified using qRT-PCR. Total RNA was isolated from $5\times10^5$ THP1 cells per well of a 12-well plate, which were pre-incubated with inhibitors for 1 h. Human primary macrophages were used at $3\times10^5$ cells per well of a 12-well plate. Human PBMCs were used at $1\times10^6$ cells per well of a 12-well plate. Cells were transfected using 100 μl of Opti-MEM transfection solution comprising 2 μg of 100-bp dsDNA complexed with 2 μl of Lipofectamine 2000. Cells were harvested 4 hours post-transfection, and RNA was extracted using 500 μl of Trizol (Ambion). 800 ng of total RNA was reverse-transcribed for cDNA synthesis in 20 μl final reaction volume using oligo$(dT)_{20}$ primer at 2.5 μM and 10 U/μl Superscript III (Thermo-Fisher) for 50 min at 50° C. Quantitative PCR was performed on a Mx3000P qPCR System (Agilent Technologies) using $\frac{1}{20}^{th}$ volume of reverse transcription material as an input for each qPCR reaction. Expression levels of IFNB1 and TUBA1B mRNAs were measured in technical triplicate for each sample. Threshold cycle ($C_T$) values obtained for IFNB1 mRNAs were normalized to TUBA1B $C_T$ values and used to calculate $\Delta C_T$. Relative mRNA expression levels of IFNB1 were calculated using the $\Delta\Delta C_T$ method ($2^{\Delta\Delta C_T}$). The extent of cGAS inhibition was determined by normalizing the IFNB1 mRNA expression level for each sample relative to DMSO only control.

Representative compounds from related application PCT/US2019/016673 were tested in the foregoing cellular assays with the results shown in Table 7 in support of claim scope for representative compounds of the present invention.

TABLE 7

| ID # | THP1, qRT-PCR IC$_{50}$ (μM) | Human Macrophage, qRT-PCR IC$_{50}$ (μM) | Fresh human PBMCs, qRT-PCR IC$_{50}$ (μM) | Freeze-thawed human PBMCs, qRT-PCR IC$_{50}$ (μM) |
|---|---|---|---|---|
| TDI-7445 | 1.44 | 1.2 | n.d. | n.d. |
| TDI-7635 | 2.14 | n.d. | n.d. | n.d. |
| TDI-8077 | 0.93 | 0.86 | 1.15 | n.d. |
| TDI-8087 | 0.95 | 0.62 | n.d. | n.d. |
| TDI-8246 | 1.09 | 0.6 | 1.12 | 1.16 | n.d.-not determined

Early experiments in vivo suggest that compounds described herein penetrate the blood-brain barrier. They would therefore be useful in treating autoimmune disorders within the CNS.

Formulation Example 1

A pharmaceutical composition containing the compound of the present invention as an active ingredient can be produced, for example, according to the following formulation.

1. Capsule

| | |
|---|---|
| (1) compound obtained in Example 1 | 10 mg |
| (2) lactose | 90 mg |
| (3) crystalline cellulose | 70 mg |
| (4) magnesium stearate | 10 mg |
| total of (1)~(4) | 180 mg |

The total amount of the above-mentioned (1), (2) and (3) and 5 mg of (4) are blended, and the mixture is granulated. Thereto is added the remaining 5 mg of (4), and the whole is sealed in a gelatin capsule.

2. Tablet

| | |
|---|---|
| (1) compound obtained in example 1 | 10 mg |
| (2) lactose | 35 mg |
| (3) cornstarch | 150 mg |
| (4) crystalline cellulose | 30 mg |
| (5) magnesium stearate | 5 mg |
| total of (1)~(5) | 230 mg |

The total amount of the above-mentioned (1), (2), and (3), 20 mg of (4) and 2.5 mg of (5) are blended, and the mixture is granulated. Thereto are added the remaining 10 mg of (4), and 2.5 mg of (5), and the mixture is compression-molded to give a tablet.

The invention claimed is:

1. A compound of formula (I):

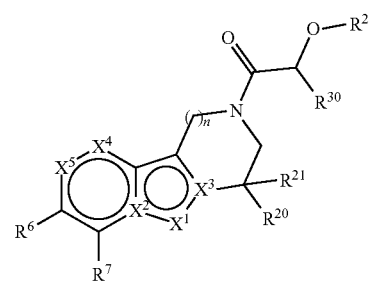

wherein:
the structure

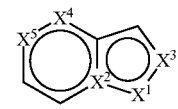

represents a fused 6,5 ring system wherein both rings are aromatic and all backbone atoms are sp$^2$-hybridized;

$X^1$ is N or N—R$^1$;
$X^2$ is C or N;
$X^3$ is N;
$X^4$ is C—R$^4$ or N;
$X^5$ is C—R$^5$ or N;
or
$X^1$ is N or N—R$^1$;
$X^2$ is C or N;
$X^3$ is N or C;
$X^4$ is N;
$X^5$ is C—R$^5$ or N;
or
$X^1$ is N or N—R$^1$;
$X^2$ is C or N;
$X^3$ is N or C;
$X^4$ is C—R$^4$ or N;
$X^5$ is N;
$R^1$ is hydrogen, (C$_1$-C$_3$)alkyl, CH$_2$CH$_2$—OR$^{3a}$, or fluoro(C$_1$-C$_3$)alkyl;
$R^2$ is hydrogen, (C$_1$-C$_3$)alkyl, or CH$_2$CH$_2$—OR$^{3b}$, or, taken together along with the atoms to which they are attached, R$^2$ and R$^{30}$ may form a 4- to 6-membered oxygen-containing non-aromatic heterocyclic ring;
$R^{3a}$ is hydrogen or (C$_1$-C$_3$)alkyl;
$R^{3b}$ is hydrogen or (C$_1$-C$_3$)alkyl;
$R^4$ is chosen from optionally substituted monocyclic heterocyclyl, hydrogen, halogen, (C$_1$-C$_6$)alkyl, (C$_1$-C$_6$)alkoxy, fluoro(C$_1$-C$_6$)alkyl, fluoro(C$_1$-C$_6$)alkoxy, (C$_3$-C$_6$)cycloalkyl, fluoro(C$_3$-C$_6$)cycloalkyl, (C$_3$-C$_6$)cycloalkyloxy, fluoro(C$_3$-C$_6$)cycloalkyloxy, cyano, optionally substituted phenyl, optionally substituted bicyclic heterocyclyl, amino(C$_1$-C$_3$)alkyl, (C$_1$-C$_3$)alkylamino(C$_1$-C$_3$)alkyl, (C$_1$-C$_3$)dialkylamino(C$_1$-C$_3$)alkyl, (C$_1$-C$_3$)alkoxy (C$_1$-C$_3$)alkyl, (C$_1$-C$_6$)hydrocarbyl, heterocyclyl(C$_1$-C$_3$)alkyl, benzyl, heterocyclyl-substituted benzyl, (C$_1$-C$_3$)alkylaminocarbonyl, and (C$_1$-C$_3$) acylamino;

$R^5$ is chosen from hydrogen, $(C_1$-$C_6)$alkoxy, optionally substituted monocyclic heterocyclyl, halogen, $(C_1$-$C_6)$alkyl, fluoro$(C_1$-$C_6)$alkyl, fluoro$(C_1$-$C_6)$alkoxy, $(C_3$-$C_6)$cycloalkyl, fluoro$(C_3$-$C_6)$cycloalkyl, $(C_3$-$C_6)$cycloalkyloxy, fluoro$(C_3$-$C_6)$cycloalkyloxy, cyano, optionally substituted phenyl, optionally substituted bicyclic heterocyclyl, amino$(C_1$-$C_3)$alkyl, $(C_1$-$C_3)$alkylamino$(C_1$-$C_3)$alkyl, $(C_1$-$C_3)$dialkylamino$(C_1$-$C_3)$alkyl, $(C_1$-$C_3)$alkoxy $(C_1$-$C_3)$alkyl, $(C_1$-$C_6)$hydrocarbyl, heterocyclyl$(C_1$-$C_3)$alkyl, benzyl, heterocyclyl-substituted benzyl, $(C_1$-$C_3)$alkylaminocarbonyl, and $(C_1$-$C_3)$acylamino;

wherein:

said optionally substituted monocyclic heterocyclyl may be substituted with one or more substituents chosen from: $(C_1$-$C_3)$alkyl, amino, cyano, $(C_1$-$C_3)$alkylamino, $(C_1$-$C_3)$alkoxy, oxo, fluoro$(C_1$-$C_3)$alkyl, halogen, hydroxy, and hydroxy$(C_1$-$C_3)$alkyl;

said optionally substituted phenyl may be substituted with one or more substituents chosen from: amino, $(C_1$-$C_3)$alkylamino, $(C_1$-$C_3)$dialkylamino, $(C_1$-$C_3)$alkoxy, hydroxy, halogen, cyano, aminocarbonyl, methylenedioxy, ethylenedioxy, $(C_1$-$C_3)$acylamino, fluoro$(C_1$-$C_3)$acylamino, and hydroxy$(C_1$-$C_3)$alkylaminosulfonyl; and said optionally substituted bicyclic heterocyclyl may be substituted with one or more substituents chosen from: $(C_1$-$C_3)$alkyl, hydroxy, and oxo;

$R^6$ and $R^7$ are independently chosen from halogen, hydrogen, cyano, —C≡CH, —CH=CH$_2$, $(C_1$-$C_3)$alkyl, $(C_1$-$C_3)$alkoxy, fluoro$(C_1$-$C_3)$alkyl, fluoro$(C_1$-$C_3)$alkoxy, $(C_3$-$C_4)$cycloalkyl, and fluoro$(C_3$-$C_4)$cycloalkyl;

$R^{20}$ is hydrogen or $(C_1$-$C_3)$alkyl, or, taken together with the carbon to which they are attached, $R^{20}$ and $R^{21}$ may form a 3- to 5-membered aliphatic carbocyclic ring;

$R^{21}$ is hydrogen or $(C_1$-$C_3)$alkyl, or, taken together with the carbon to which they are attached, $R^{21}$ and $R^{20}$ may form a 3- to 5-membered aliphatic carbocyclic ring;

$R^{30}$ is hydrogen, or, taken together along with the atoms to which they are attached, $R^{30}$ and $R^2$ may form a 4- to 6-membered oxygen-containing non-aromatic heterocyclic; and n is 1 or 2.

2. The compound according to claim 1 wherein:
i) $R^{30}$ is hydrogen; and
ii) n is 1.

3. The compound according to claim 2 wherein $X^1$ is N, $X^2$ is C, $X^3$ is N, and $R^2$ is hydrogen or methyl.

4. The compound according to claim 3 wherein:
i) $R^6$ and $R^7$ are independently chosen from halogen, hydrogen, methoxy, cyano, and trifluoromethyl;
ii) $X^5$ is C—$R^5$, wherein $R^5$ is chosen from hydrogen, $(C_1$-$C_3)$alkoxy, halogen, cyano, and trifluoromethyl.

5. The compound according to claim 4 wherein $X^4$ is C—$R^4$ and $R^4$ is chosen from optionally substituted monocyclic heteroaryl, hydrogen, optionally substituted phenyl, and optionally substituted bicyclic heterocyclyl.

6. The compound according to claim 2 wherein $X^1$ is N—$R^1$, $X^2$ is C, $X^3$ is C, and $X^4$ is N.

7. The compound according to claim 6 wherein $X^5$ is C—$R^5$ and $R^5$ is chosen from hydrogen, halogen, $(C_1$-$C_3)$alkyl, and $(C_1$-$C_3)$alkoxy.

8. The compound according to claim 6 wherein $R^6$ and $R^7$ are independently chosen from hydrogen and halogen.

9. The compound according to claim 8 wherein:
i) $R^1$ and $R^2$ are independently chosen from hydrogen and methyl;
ii) $R^{20}$ and $R^{21}$ are independently chosen from hydrogen and $(C_1$-$C_3)$alkyl.

10. The compound according to claim 2 wherein $X^1$ is N—$R^1$, $X^2$ is C; $X^3$ is C, $X^4$ is C—$R^4$, and $X^5$ is N.

11. The compound according to claim 10 wherein $R^4$ is chosen from optionally substituted monocyclic heteroaryl or heterocyclyl, hydrogen, $(C_1$-$C_6)$alkoxy, optionally substituted phenyl, and optionally substituted bicyclic heterocyclyl.

12. The compound according to claim 11 wherein $R^4$ is phenyl, optionally substituted with a substituent chosen from amino, halogen, cyano, methoxy, hydroxy, and aminocarbonyl.

13. The compound according to claim 11 wherein $R^4$ is a monocyclic heteroaryl or heterocyclyl, optionally substituted with a substituent chosen from methyl, amino, halogen, difluoromethyl, methoxy, and cyano.

14. The compound according to claim 13 wherein said optionally substituted monocyclic heteroaryl or heterocyclyl is chosen from pyrazolyl, furanyl, thiophenyl, pyrrolyl, oxazolyl, oxadiazolyl, thiazolyl, isoxazolyl, isothiazolyl, imidazolyl, triazolyl, pyridinyl, pyrimidinyl, pyrazinyl, pyridazinyl, thiophen, phenyl, dihydropyran, tetrahydropyran, tetrahydrofuranyl, oxetane, and azetidinyl.

15. The compound according to claim 14 wherein said optionally substituted monocyclic heteroaryl is pyrazolyl or triazolyl.

16. The compound according to claim 2 wherein:
i) $X^1$ and $X^2$ are N;
ii) $X^3$ is C;
iii) $X^5$ is C—$R^5$ and $R^5$ is chosen from hydrogen, $(C_1$-$C_3)$alkoxy, halogen, cyano, and trifluoromethyl;
iv) $R^2$ is hydrogen or methyl; and
v) $R^6$ and $R^7$ are independently chosen from halogen, hydrogen, methoxy, cyano, and trifluoromethyl.

17. A method of inhibiting inflammation, dsDNA-triggered interferon expression, or cGAS in a patient comprising administering a compound according to claim 1.

18. A method of treating Aicardi Goutières Syndrome, Parkinson's disease, Alzheimer's disease, Systemic lupus erythematosus, or cancer metastasis in a patient comprising administering a compound according to claim 1.

19. A medicament comprising the compound according to claim 1 and optionally a therapeutic agent for Aicardi Goutières Syndrome, Parkinson's disease, Alzheimer's disease, Systemic lupus erythematosus, or cancer metastasis.

20. A pharmaceutical formulation comprising a pharmaceutically acceptable carrier and a compound according to claim 1.

* * * * *